US011855581B2

(12) United States Patent
Schatz et al.

(10) Patent No.: US 11,855,581 B2
(45) Date of Patent: Dec. 26, 2023

(54) SOLAR PANEL SUPPORT AND DRIVE SYSTEM

(71) Applicant: POLAR RACKING INC., Toronto (CA)

(72) Inventors: Kurt M. Schatz, Uxbridge (CA); James J. Ferri, Maple (CA); J. R. Scott Mitchell, Newmarket (CA); Judson Henderson Whiteside, Thornhill (CA); Andrew Mauchlen, London (CA); Mariano Gualtieri D'Angela, London (CA); Gabriele Wayne Sabatini, Keswick (CA)

(73) Assignee: Polar Racking Inc., Toronto (CA)

( * ) Notice: Subject to any disclaimer, the term of this patent is extended or adjusted under 35 U.S.C. 154(b) by 86 days.

(21) Appl. No.: 16/037,061

(22) Filed: Jul. 17, 2018

(65) Prior Publication Data

US 2019/0052224 A1  Feb. 14, 2019

Related U.S. Application Data

(60) Provisional application No. 62/555,927, filed on Sep. 8, 2017, provisional application No. 62/533,877, filed on Jul. 18, 2017.

(51) Int. Cl.
*H02S 20/30*  (2014.01)
*F24S 25/12*  (2018.01)
(Continued)

(52) U.S. Cl.
CPC .............. *H02S 20/30* (2014.12); *F24S 25/12* (2018.05); *F24S 30/425* (2018.05); *H02S 20/10* (2014.12);
(Continued)

(58) Field of Classification Search
CPC .......... Y02E 10/47; Y02E 10/50; Y02E 10/52; F24S 30/425; F24S 2030/136;
(Continued)

(56) References Cited

U.S. PATENT DOCUMENTS 1,371,836 A * 3/1921 Antz .................... F03B 17/061
 416/10
2,366,734 A * 1/1945 Lear ........................ B64C 25/24
 244/102 R (Continued)

FOREIGN PATENT DOCUMENTS

CH          693244 A5 *  4/2003 ............. F16M 11/10
CN       206302370 U     7/2017
(Continued)

*Primary Examiner* — Taylor Morris

(57) ABSTRACT

A solar panel support apparatus comprising: a support frame for holding the solar panel; a support post pivotally connected to the support frame at a post pivot connection and anchored to an adjacent supporting surface, the support post for positioning the support frame above the supporting surface; and a linear actuator coupled at a proximal end to the support post by a support pivot connection and at a distal end by a frame pivot connection with the support frame, the post pivot connection and the frame pivot connection spaced apart from one another on the support frame; wherein a change in a length of the linear actuator results in pivoting of the support frame about the post pivot connection.

22 Claims, 40 Drawing Sheets

(51) Int. Cl.
  *H02S 20/10* (2014.01)
  *F24S 30/425* (2018.01)
  *H02S 20/32* (2014.01)
  *F24S 25/00* (2018.01)
  *F24S 30/00* (2018.01)
  *H02S 30/10* (2014.01)

(52) U.S. Cl.
  CPC ......... *H02S 20/32* (2014.12); *F24S 2025/019* (2018.05); *F24S 2030/115* (2018.05); *F24S 2030/13* (2018.05); *F24S 2030/136* (2018.05); *H02S 30/10* (2014.12); *Y02E 10/47* (2013.01); *Y02E 10/50* (2013.01)

(58) Field of Classification Search
  CPC ........... F24S 2030/134; F24S 2030/115; F24S 23/70; F24S 2023/832; F24S 23/71; F24S 2025/019; F24S 2030/13; H02S 20/32; H02S 20/30; H02S 30/10; H02S 20/10; F16C 3/03; F16H 2025/209; F16H 2025/2093; F16H 2025/2084; F16H 2025/2096; F16H 2025/2445; F16H 2025/204; F16H 2025/2081
  USPC .............................................. 248/371, 178.1
  See application file for complete search history.

(56) References Cited

U.S. PATENT DOCUMENTS

| | | | | |
|---|---|---|---|---|
| 2,695,504 A * | 11/1954 | Magee | ................. | A01B 61/025 464/162 |
| 2,704,005 A * | 3/1955 | Clayson | .............. | B25B 23/0021 81/177.6 |
| 2,859,640 A * | 11/1958 | Geyer | .................... | F16H 25/20 74/625 |
| 2,938,402 A * | 5/1960 | Willmore | ................ | F16H 25/20 74/89.41 |
| 3,026,850 A * | 3/1962 | Clifton | ...................... | B66F 3/30 60/406 |
| 3,055,310 A * | 9/1962 | Griffiths | ................... | B61K 5/00 104/32.1 |
| 3,316,034 A * | 4/1967 | Wanlass | .................. | F16C 33/20 384/125 |
| 3,335,617 A * | 8/1967 | Reed | ......................... | F16C 1/06 74/421 R |
| 3,419,434 A * | 12/1968 | Colehower | ......... | H01L 31/0547 136/246 |
| 3,523,599 A * | 8/1970 | Denkowski | ............... | B66F 3/18 192/150 |
| 3,559,499 A * | 2/1971 | Profet | ..................... | F16H 25/20 74/89.41 |
| 3,873,066 A * | 3/1975 | Opyrchal | .................. | B66F 3/44 254/103 |
| 4,063,543 A * | 12/1977 | Hedger | ................... | G02B 7/183 126/579 |
| 4,149,523 A * | 4/1979 | Boy-Marcotte | ......... | F24S 40/80 126/589 |
| 4,153,039 A * | 5/1979 | Carroll | .................... | F24S 23/74 126/605 |
| 4,249,514 A * | 2/1981 | Jones | .................... | F24S 30/425 126/605 |
| 4,306,540 A * | 12/1981 | Hutchison | ............ | F24S 30/425 126/607 |
| 4,340,812 A * | 7/1982 | Mori | ....................... | F21S 11/00 250/203.1 |
| 4,345,582 A * | 8/1982 | Aharon | .................. | F24S 23/70 126/574 |
| 4,360,182 A * | 11/1982 | Titus | ...................... | G01D 11/30 248/371 |
| 4,365,618 A * | 12/1982 | Jones | .................... | F24S 30/455 126/576 |
| 4,424,045 A * | 1/1984 | Kulischenko | ............. | F16C 1/26 464/170 |
| 4,522,358 A * | 6/1985 | Dinger | ..................... | F02K 1/76 244/110 B |
| 4,541,160 A * | 9/1985 | Roberts | ..................... | F16C 1/02 29/401.1 |
| 4,968,355 A * | 11/1990 | Johnson | .............. | H01L 31/0547 136/246 |
| 4,995,377 A | 2/1991 | Eiden | | |
| 5,085,407 A * | 2/1992 | Lonon | ...................... | B66F 3/44 254/103 |
| 5,253,637 A * | 10/1993 | Maiden | ................... | F24S 23/74 126/696 |
| 5,373,838 A * | 12/1994 | Ho | .......................... | F24S 80/30 126/569 |
| 5,413,066 A * | 5/1995 | Spencer, Jr. | ............. | B63B 7/082 114/354 |
| 5,632,823 A * | 5/1997 | Sharan | .................... | H02S 20/32 136/246 |
| 5,655,968 A * | 8/1997 | Burton | ..................... | F16D 3/84 464/133 |
| 5,669,264 A * | 9/1997 | Sakura | .................... | F16H 25/20 74/89.38 |
| 5,943,919 A * | 8/1999 | Babinski | ................... | B66F 3/08 254/101 |
| 6,058,930 A * | 5/2000 | Shingleton | ............ | F24S 30/425 126/600 |
| 6,079,408 A * | 6/2000 | Fukuda | .................... | F24S 30/40 126/578 |
| 6,082,207 A * | 7/2000 | Babinski | ............. | F16H 25/2204 211/1.51 |
| 6,155,376 A * | 12/2000 | Cheng | ................... | B62D 5/0421 180/444 |
| 6,193,612 B1 * | 2/2001 | Craig | ....................... | F16C 3/03 180/337 |
| 6,217,178 B1 * | 4/2001 | Drumheller | ............. | F24S 25/60 359/849 |
| 6,464,588 B1 * | 10/2002 | Rupp | ....................... | F16C 1/08 464/58 |
| 6,533,235 B1 * | 3/2003 | Dymerski | ............ | B60N 2/0232 248/421 |
| 6,662,801 B2 * | 12/2003 | Hayden | ................... | H02S 20/00 126/571 |
| 7,203,004 B2 * | 4/2007 | Zhang | ..................... | F21S 11/00 359/593 |
| 7,240,674 B2 * | 7/2007 | Patterson | .............. | G01S 3/7861 126/573 |
| 7,343,913 B2 * | 3/2008 | Niedermeyer | .......... | F24S 23/74 126/696 |
| 7,388,146 B2 * | 6/2008 | Fraas | ...................... | H01L 31/02 136/246 |
| 7,474,013 B2 * | 1/2009 | Greenspan | ........... | F03B 13/1865 290/53 |
| 7,531,741 B1 * | 5/2009 | Melton | ................... | H02S 20/32 136/246 |
| 7,554,030 B2 * | 6/2009 | Shingleton | .............. | H02S 20/32 136/246 |
| 7,744,474 B2 * | 6/2010 | Valovick | .................. | F16C 3/03 277/912 |
| 7,836,879 B2 * | 11/2010 | Mackamul | ............. | F16M 11/10 126/600 |
| 7,884,279 B2 * | 2/2011 | Dold | ....................... | H02S 20/23 136/246 |
| 7,938,473 B2 * | 5/2011 | Paton | ..................... | E05F 15/622 296/146.8 |
| 8,042,337 B2 * | 10/2011 | Hong | .................... | F24S 30/425 60/641.11 |
| 8,052,100 B2 | 11/2011 | Zante et al. | | |
| 8,066,573 B2 * | 11/2011 | Wagner | ..................... | F16D 3/06 464/16 |
| 8,156,834 B2 * | 4/2012 | Chiang | .................... | F16H 25/20 74/89.39 |
| 8,161,962 B2 * | 4/2012 | Kuo | ....................... | F24S 30/425 126/600 |
| 8,188,415 B2 * | 5/2012 | Kats | ....................... | F24S 30/455 250/203.4 |

(56) References Cited

U.S. PATENT DOCUMENTS

| | | | | |
|---|---|---|---|---|
| 8,197,179 | B2* | 6/2012 | Selsam | F03D 7/0204 415/4.5 |
| 8,203,110 | B2* | 6/2012 | Silvestre Mata | F24S 30/455 136/246 |
| 8,273,978 | B2* | 9/2012 | Thompson | H02S 20/00 136/244 |
| 8,281,782 | B2* | 10/2012 | Simon | H01L 31/0547 126/621 |
| 8,312,783 | B2* | 11/2012 | McKay | F16H 25/2021 74/89.39 |
| 8,322,333 | B2* | 12/2012 | Marcotte | F24S 30/42 126/694 |
| 8,381,464 | B2* | 2/2013 | Conger | F24S 25/50 52/173.3 |
| 8,407,950 | B2* | 4/2013 | Hartelius | F24S 30/425 52/645 |
| 8,459,249 | B2 | 6/2013 | Corio | |
| 8,597,131 | B2* | 12/2013 | Pisinger | F16C 3/026 464/162 |
| 8,616,080 | B2* | 12/2013 | Flatt | F16H 1/16 74/425 |
| 8,640,562 | B2* | 2/2014 | Pettersson | F16H 25/2015 74/89.37 |
| 8,669,462 | B2* | 3/2014 | Almogy | F24S 23/74 136/246 |
| 8,671,930 | B2* | 3/2014 | Liao | F24S 25/12 126/576 |
| 8,671,931 | B2* | 3/2014 | Curtis | F24S 30/425 126/704 |
| 8,720,431 | B2* | 5/2014 | Kufner | F24S 25/12 126/569 |
| 8,763,601 | B2* | 7/2014 | Doyle | F24S 25/70 126/604 |
| 8,783,640 | B2* | 7/2014 | Goodbred, III | F16C 1/08 248/429 |
| 8,807,129 | B2* | 8/2014 | Mackamul | H02S 20/32 126/600 |
| 8,878,112 | B2* | 11/2014 | Lee | F24S 50/20 250/203.4 |
| 8,881,720 | B2* | 11/2014 | Currier | F24S 30/452 126/576 |
| 8,939,648 | B2* | 1/2015 | Schneider | F16M 11/18 384/428 |
| 8,993,870 | B2* | 3/2015 | Eom | F24S 30/45 136/246 |
| 9,021,903 | B2* | 5/2015 | Elliott | B64C 9/02 244/99.2 |
| 9,078,672 | B1* | 7/2015 | Rosse | A61B 17/1671 |
| 9,134,045 | B2 | 9/2015 | Ashmore et al. | |
| 9,140,241 | B2* | 9/2015 | Bootello | H01L 31/054 |
| 9,249,993 | B2 | 2/2016 | Kotagiri et al. | |
| 9,281,778 | B2* | 3/2016 | Corio | F24S 25/12 |
| 9,425,731 | B2* | 8/2016 | Durney | F24S 25/65 |
| 9,453,899 | B2* | 9/2016 | Paponneau | F16H 19/08 |
| 9,523,517 | B2 | 12/2016 | Warpup et al. | |
| 9,581,678 | B2* | 2/2017 | Corio | F24S 40/00 |
| 9,640,695 | B2* | 5/2017 | Fischer | F24S 30/425 |
| 9,654,052 | B2* | 5/2017 | Paponneau | F24S 25/70 |
| 9,777,812 | B2* | 10/2017 | Vaughan | F16H 25/2204 |
| 9,905,717 | B2 | 2/2018 | Au | |
| 9,976,332 | B2 | 5/2018 | Scheuring et al. | |
| 10,148,219 | B2* | 12/2018 | Sun | F24S 30/425 |
| 10,222,446 | B2* | 3/2019 | Au | H02S 20/10 |
| 10,557,646 | B1 | 2/2020 | Ma et al. | |
| 10,601,364 | B1 | 3/2020 | Au | |
| 10,928,100 | B2 | 2/2021 | Au | |
| 11,159,120 | B2* | 10/2021 | Kresse | F16H 37/04 |
| 11,211,896 | B1* | 12/2021 | LoBue | F16F 9/185 |
| 2003/0083136 | A1* | 5/2003 | Park | F16C 29/123 464/162 |
| 2004/0134297 | A1* | 7/2004 | West | F16K 1/221 74/425 |
| 2005/0035261 | A1* | 2/2005 | Goodbred | B60N 2/067 248/429 |
| 2005/0161073 | A1 | 7/2005 | Head et al. | |
| 2006/0217210 | A1* | 9/2006 | Gibson | F16D 3/06 464/183 |
| 2007/0062317 | A1* | 3/2007 | Nagai | F16D 35/005 74/89 |
| 2007/0225082 | A1* | 9/2007 | Valovick | F16C 3/03 464/183 |
| 2008/0040990 | A1* | 2/2008 | Vendig | F24S 50/60 52/173.3 |
| 2008/0250720 | A1 | 10/2008 | Oxley et al. | |
| 2008/0251115 | A1* | 10/2008 | Thompson | H02S 20/00 136/251 |
| 2008/0295624 | A1* | 12/2008 | Oberle | F16H 25/20 74/89.34 |
| 2008/0308091 | A1* | 12/2008 | Corio | F24S 30/422 126/606 |
| 2009/0133689 | A1* | 5/2009 | Conchy | F24S 25/617 126/684 |
| 2009/0159075 | A1* | 6/2009 | Mackamul | F24S 30/425 126/600 |
| 2009/0200830 | A1* | 8/2009 | Paton | B60J 5/101 296/146.8 |
| 2009/0256046 | A1* | 10/2009 | Hausner | F24S 25/70 248/398 |
| 2009/0301466 | A1* | 12/2009 | Humanes Asensio | F24S 30/452 126/600 |
| 2009/0320826 | A1* | 12/2009 | Kufner | H02S 20/00 126/573 |
| 2010/0051016 | A1* | 3/2010 | Ammar | F24S 20/20 126/600 |
| 2010/0065039 | A1* | 3/2010 | Chang | F24S 30/425 126/573 |
| 2010/0071768 | A1* | 3/2010 | Liu | F24S 23/79 136/259 |
| 2010/0078608 | A1* | 4/2010 | Somerfield | F16H 25/20 254/103 |
| 2010/0101630 | A1* | 4/2010 | Kats | H02S 20/30 136/246 |
| 2010/0139647 | A1* | 6/2010 | Silvestre Mata | F24S 30/455 126/604 |
| 2010/0175741 | A1* | 7/2010 | Thorne | H02S 20/10 136/251 |
| 2010/0180883 | A1* | 7/2010 | Oosting | F24S 30/455 126/604 |
| 2010/0180884 | A1* | 7/2010 | Oosting | F24S 25/617 126/574 |
| 2010/0192942 | A1* | 8/2010 | Jones | F24S 30/458 126/602 |
| 2010/0193009 | A1* | 8/2010 | Wells | H01L 31/02167 136/246 |
| 2010/0199479 | A1* | 8/2010 | Kolb | B24B 29/04 29/426.1 |
| 2010/0218807 | A1* | 9/2010 | Arbore | F24S 25/13 136/246 |
| 2010/0223865 | A1* | 9/2010 | Gonzalez Moreno | F24S 30/425 52/173.3 |
| 2010/0229852 | A1* | 9/2010 | Buckley | F24S 30/425 126/696 |
| 2010/0236626 | A1* | 9/2010 | Finot | H01L 31/0547 136/259 |
| 2010/0237216 | A1* | 9/2010 | Napau | B60N 2/0232 248/422 |
| 2010/0282315 | A1* | 11/2010 | Gilbert | H02S 20/10 136/259 |
| 2010/0294265 | A1* | 11/2010 | Baer | F24S 25/50 126/680 |
| 2010/0319684 | A1* | 12/2010 | Almogy | H01L 31/0521 126/714 |
| 2011/0005573 | A1* | 1/2011 | Chang | H02S 20/30 136/245 |
| 2011/0041834 | A1* | 2/2011 | Liao | F24S 30/452 126/605 |

(56) References Cited

U.S. PATENT DOCUMENTS

| | | | |
|---|---|---|---|
| 2011/0079214 A1* | 4/2011 | Hon | F24S 30/452 126/573 |
| 2011/0108090 A1* | 5/2011 | Lance | F24S 30/425 136/246 |
| 2011/0108112 A1* | 5/2011 | Hong | F24S 30/425 136/259 |
| 2011/0157733 A1* | 6/2011 | Werner | F24S 30/425 359/871 |
| 2011/0163222 A1* | 7/2011 | Moser | G01S 3/7861 250/203.4 |
| 2011/0174295 A1* | 7/2011 | Clavijo Lumbreras | F24S 30/452 126/605 |
| 2011/0179893 A1* | 7/2011 | Elliott | B64C 9/02 74/25 |
| 2011/0240007 A1* | 10/2011 | Currier | F24S 30/452 126/606 |
| 2011/0308572 A1 | 12/2011 | Woodward | |
| 2012/0012101 A1* | 1/2012 | Trujillo | F24S 30/452 126/601 |
| 2012/0073565 A1* | 3/2012 | Grant | F24S 25/617 126/606 |
| 2012/0125399 A1* | 5/2012 | Schatz | F16H 25/20 136/246 |
| 2012/0162972 A1* | 6/2012 | Visser | F21S 8/08 362/184 |
| 2012/0285506 A1* | 11/2012 | Kuo | F24S 30/452 136/246 |
| 2012/0318325 A1* | 12/2012 | Liu | G05D 3/105 136/246 |
| 2013/0048048 A1* | 2/2013 | Flanery | F24S 40/20 136/246 |
| 2013/0098425 A1* | 4/2013 | Amin | H02S 20/32 136/246 |
| 2013/0152915 A1 | 6/2013 | Marten et al. | |
| 2013/0153519 A1* | 6/2013 | Ashmore | F24S 25/12 211/1.54 |
| 2013/0155535 A1 | 6/2013 | Woodward | |
| 2013/0206712 A1* | 8/2013 | Magalhaes | F24S 25/12 29/428 |
| 2013/0213455 A1* | 8/2013 | Matalon | F24S 40/52 126/634 |
| 2013/0319148 A1* | 12/2013 | Alfano | H02K 7/06 74/89.32 |
| 2014/0048121 A1* | 2/2014 | Schwartz | F24S 30/425 126/694 |
| 2014/0054433 A1* | 2/2014 | Reisch | F24S 25/10 248/371 |
| 2014/0083480 A1* | 3/2014 | Gerwing | F24S 40/85 136/246 |
| 2014/0102514 A1* | 4/2014 | Park | H02S 20/30 136/246 |
| 2014/0117190 A1 | 5/2014 | Werner et al. | |
| 2014/0166843 A1* | 6/2014 | Bertocchi | H01Q 3/08 248/550 |
| 2014/0192186 A1* | 7/2014 | Wang | F24S 23/70 348/135 |
| 2014/0196764 A1* | 7/2014 | Clavelle | F24S 25/50 136/246 |
| 2014/0216531 A1 | 8/2014 | Werner | |
| 2014/0230583 A1* | 8/2014 | Vaughan | F16H 25/2204 74/89.23 |
| 2014/0230886 A1 | 8/2014 | Werner et al. | |
| 2014/0261632 A1* | 9/2014 | Clavelle | F24S 23/74 136/246 |
| 2014/0338659 A1* | 11/2014 | Corio | H02S 20/32 126/714 |
| 2015/0040964 A1* | 2/2015 | Matalon | H02S 40/22 136/246 |
| 2015/0126293 A1* | 5/2015 | Becker | B60N 2/067 464/181 |
| 2015/0128930 A1* | 5/2015 | Chang | F24S 30/45 126/605 |
| 2015/0167747 A1* | 6/2015 | Honda | F16D 3/20 403/378 |
| 2015/0207452 A1 | 6/2015 | Werner et al. | |
| 2015/0214885 A1* | 7/2015 | Wu | F24S 30/428 136/246 |
| 2015/0234031 A1* | 8/2015 | Corio | F24S 30/425 250/203.4 |
| 2015/0372640 A1* | 12/2015 | Yang | H02S 20/30 136/248 |
| 2016/0001351 A1* | 1/2016 | Gunther | B21D 53/84 464/183 |
| 2016/0013751 A1* | 1/2016 | Michotte De Welle | H02S 20/32 136/246 |
| 2016/0020725 A1* | 1/2016 | Miyahara | F24S 30/422 136/246 |
| 2016/0118930 A1* | 4/2016 | Chun | H02S 40/22 136/246 |
| 2016/0154082 A1* | 6/2016 | Plourde | F24S 50/20 250/203.4 |
| 2016/0169560 A1* | 6/2016 | Leberer | F24S 40/57 126/714 |
| 2016/0218663 A1 | 7/2016 | Werner et al. | |
| 2016/0261224 A1* | 9/2016 | Madrone | H02S 20/32 |
| 2016/0329860 A1* | 11/2016 | Kalus | F24S 30/425 |
| 2016/0356367 A1* | 12/2016 | Hogberg | F16H 57/0406 |
| 2016/0365830 A1* | 12/2016 | Bailey | H02S 20/32 |
| 2017/0025989 A1* | 1/2017 | Shaw | H02S 20/32 |
| 2017/0070052 A1* | 3/2017 | Fishler | H02S 20/30 |
| 2017/0074547 A1* | 3/2017 | DiFiglia | F24S 23/71 |
| 2017/0093330 A1* | 3/2017 | Castellucci | B08B 3/10 |
| 2017/0095897 A1* | 4/2017 | Moraru | B23Q 15/0075 |
| 2017/0102056 A1* | 4/2017 | Wang | G02B 7/183 |
| 2017/0133979 A1* | 5/2017 | Asbeck | H02S 20/30 |
| 2017/0317640 A1* | 11/2017 | Sanap | H02S 20/32 |
| 2017/0317641 A1* | 11/2017 | Rainer | F24S 25/65 |
| 2017/0353146 A1* | 12/2017 | Praca | F16C 11/0609 |
| 2018/0013380 A1* | 1/2018 | Childress | F24S 30/425 |
| 2018/0091088 A1* | 3/2018 | Barton | F16H 19/001 |
| 2018/0175784 A1* | 6/2018 | Lange | H02S 30/00 |
| 2018/0238072 A1* | 8/2018 | McKinion | F24S 25/12 |
| 2018/0257951 A1* | 9/2018 | Shahriari | F24S 10/45 |
| 2019/0020302 A1* | 1/2019 | Chen | F24S 50/20 |
| 2019/0024764 A1* | 1/2019 | Plesniak | F16H 19/025 |
| 2019/0296686 A1 | 9/2019 | Kresse et al. | |
| 2019/0296688 A1* | 9/2019 | Kresse | F16H 57/038 |
| 2019/0379323 A1 | 12/2019 | Au et al. | |
| 2020/0388915 A1* | 12/2020 | Xu | H01Q 1/246 |
| 2021/0297038 A1* | 9/2021 | Maldonado Ferreira | H02S 40/34 |

FOREIGN PATENT DOCUMENTS

| | | | | |
|---|---|---|---|---|
| DE | 102008030747 A1 | * | 12/2009 | F24J 2/542 |
| DE | 202016103981 U1 | * | 9/2016 | H02S 20/32 |
| DE | 102017111621 B3 | * | 6/2018 | H02S 20/10 |
| DE | 102018117228 A1 | * | 1/2019 | H02S 20/10 |
| ES | 1271451 U | * | 6/2021 | H02S 20/32 |
| JP | 2014081154 A | * | 5/2014 | |
| KR | 20100071728 A | * | 6/2010 | F24S 30/48 |
| KR | 20120132724 A | | 12/2012 | |
| WO | WO-2013170718 A1 | * | 11/2013 | H02S 20/10 |
| WO | WO-2015017951 A1 | * | 2/2015 | F24S 30/425 |
| WO | WO-2015051267 A1 | * | 4/2015 | F24J 2/541 |
| WO | 2015061885 A1 | | 7/2015 | |
| WO | 2017007983 A1 | | 1/2017 | |
| WO | 2018009634 A8 | | 1/2018 | |
| WO | WO-2018170936 A1 | * | 9/2018 | F16M 11/10 |

\* cited by examiner

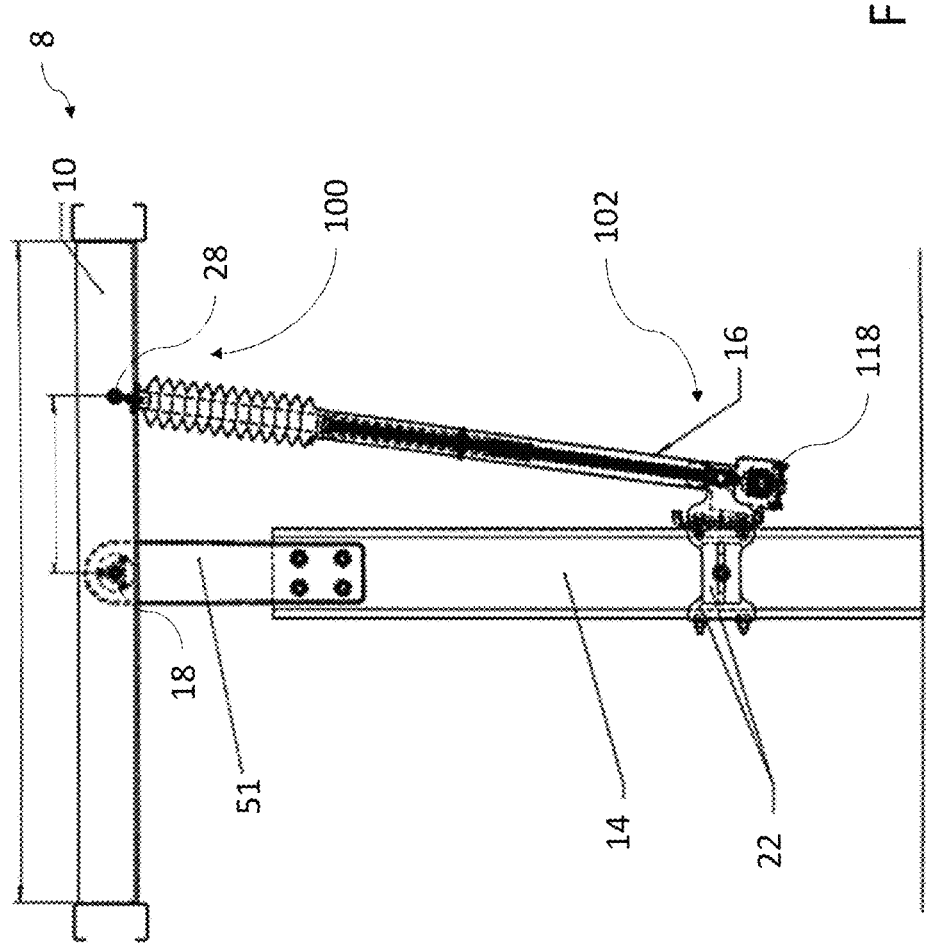

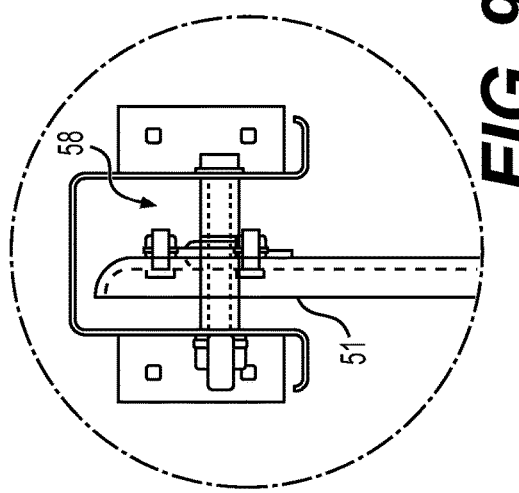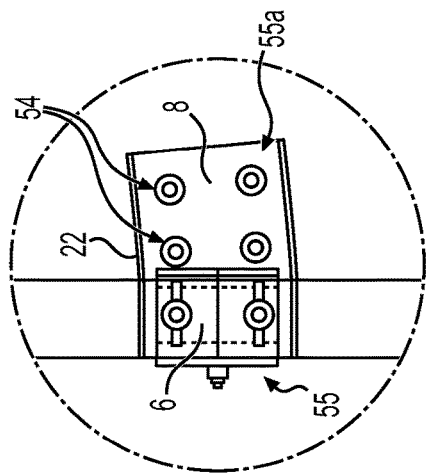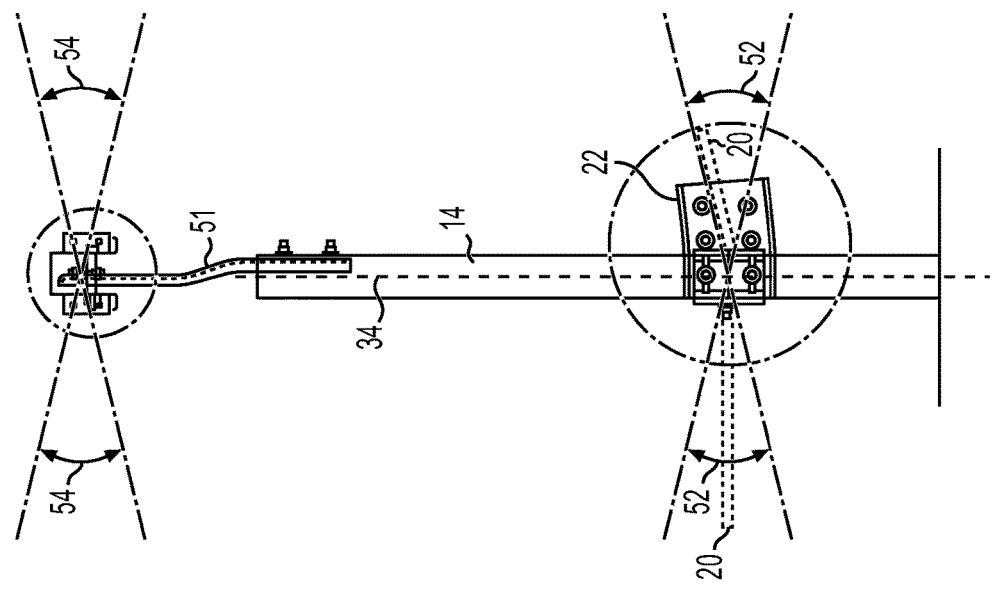

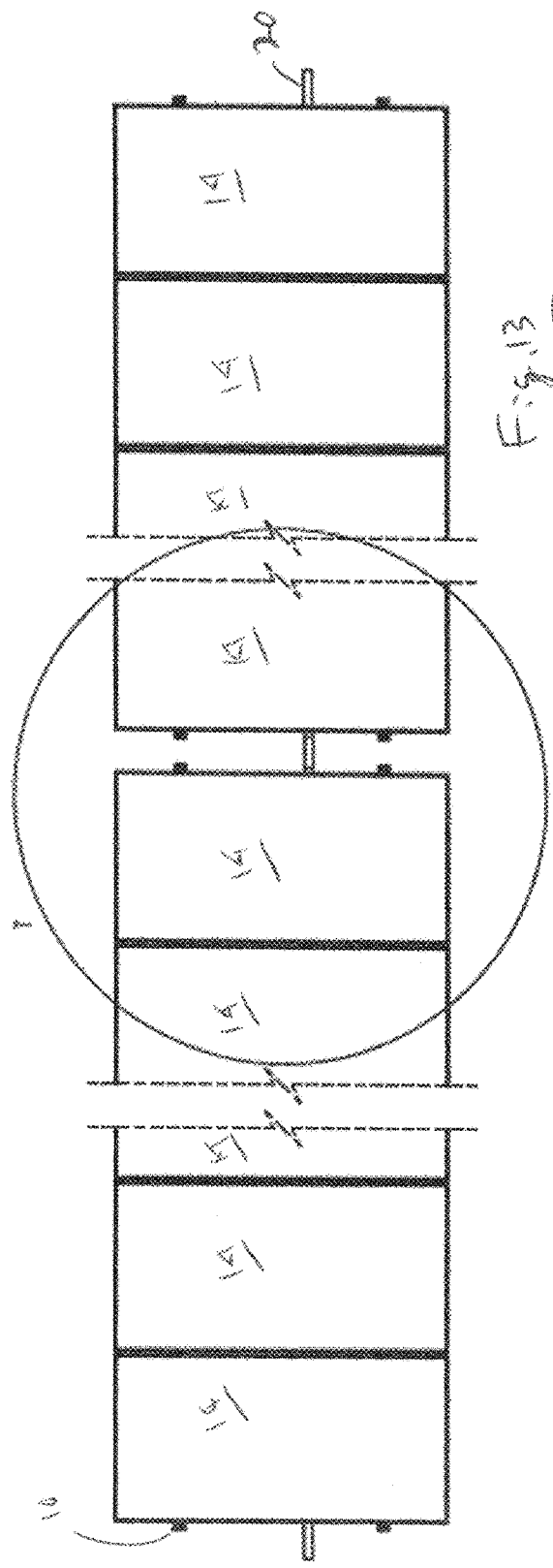
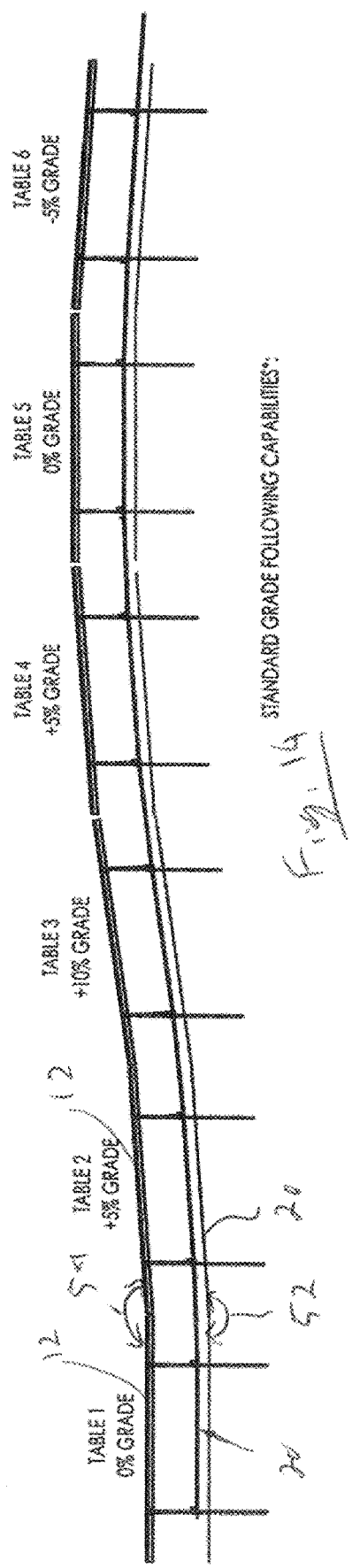

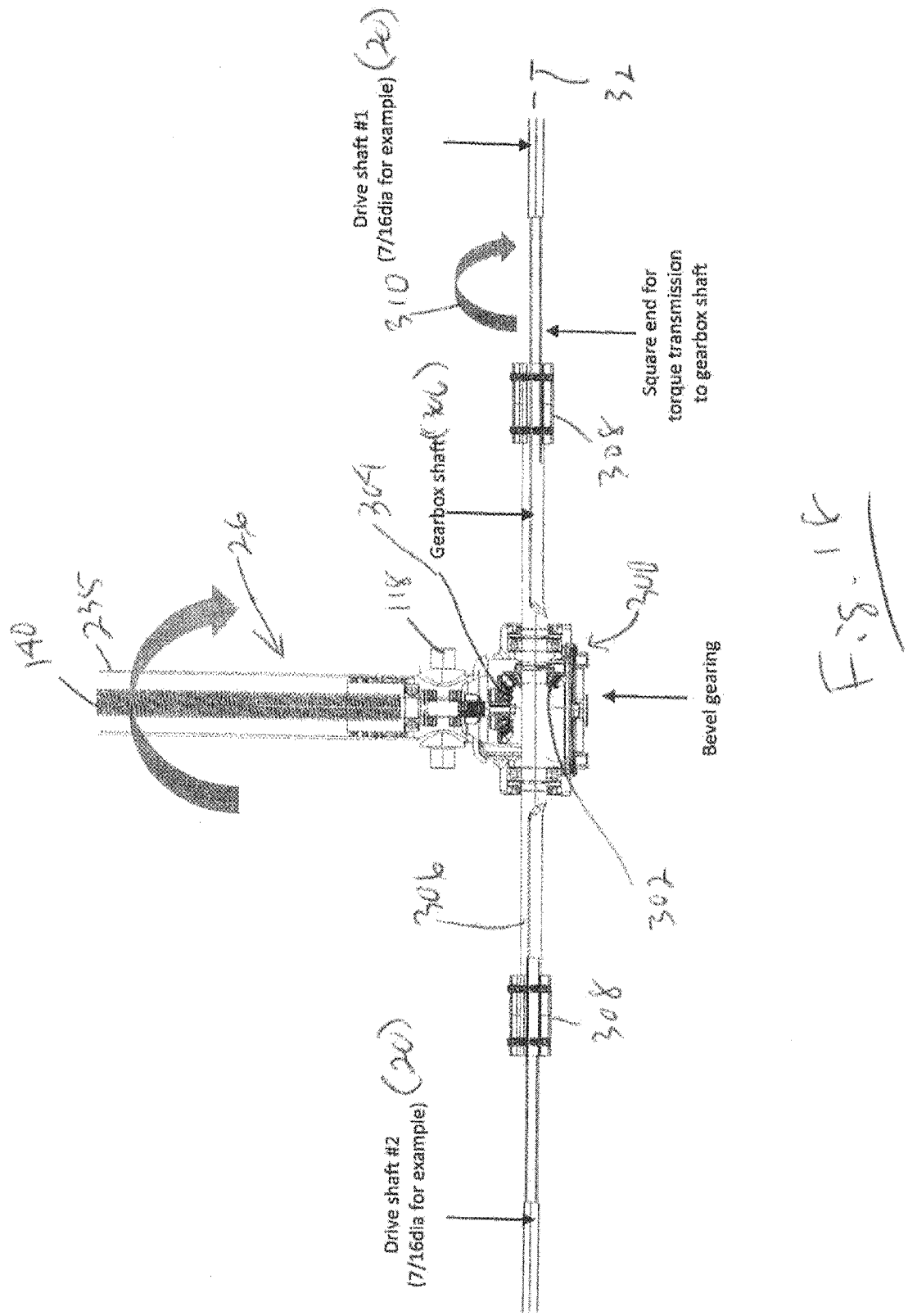

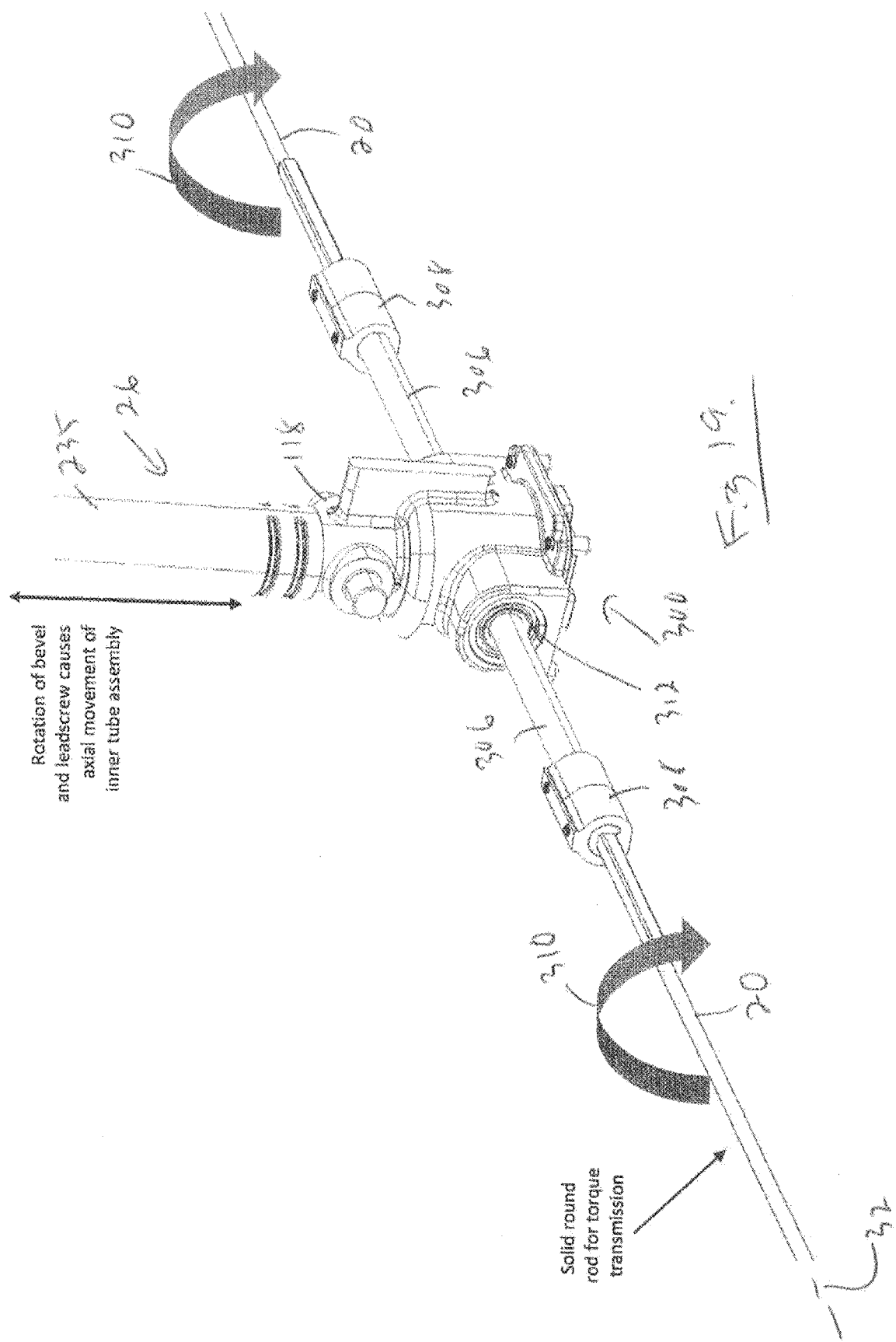

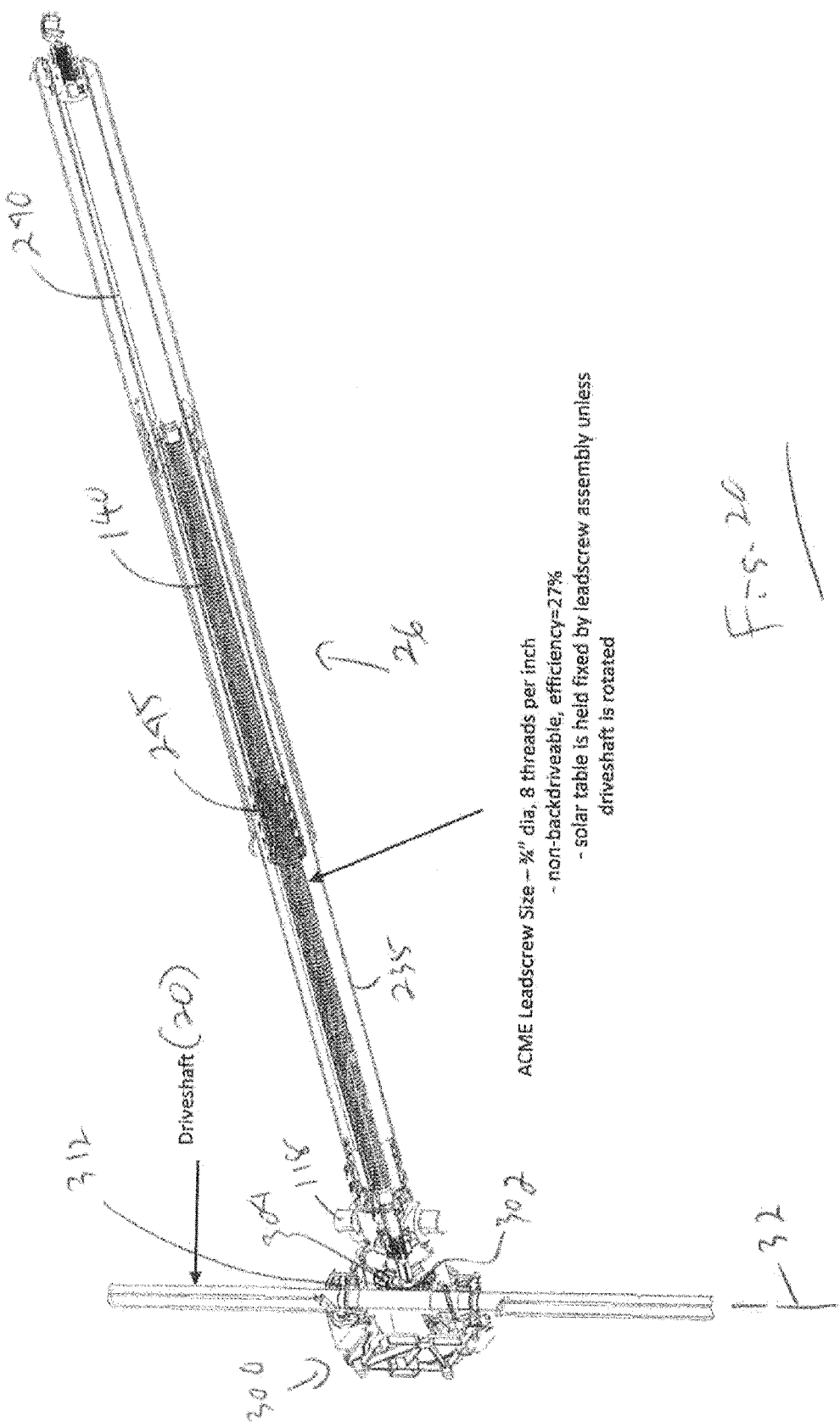

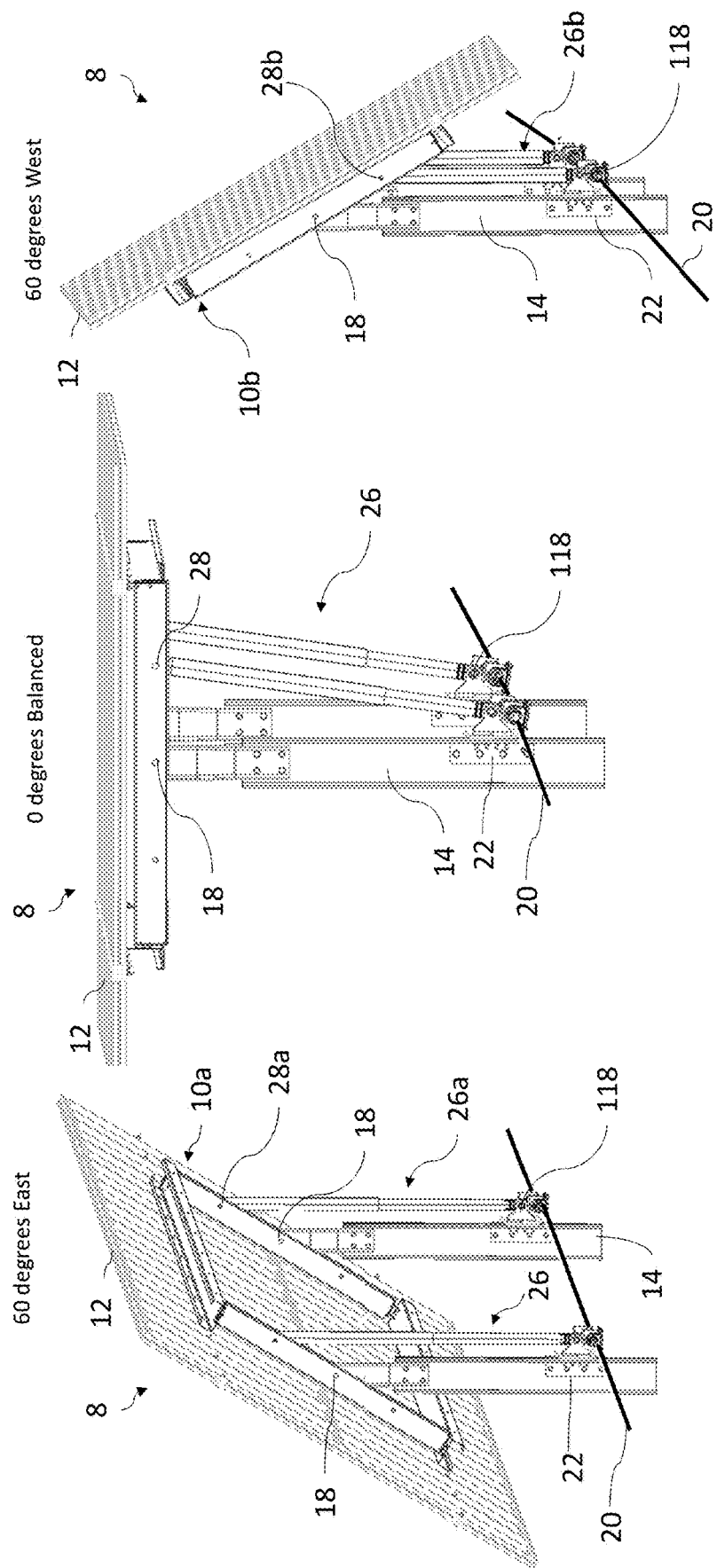

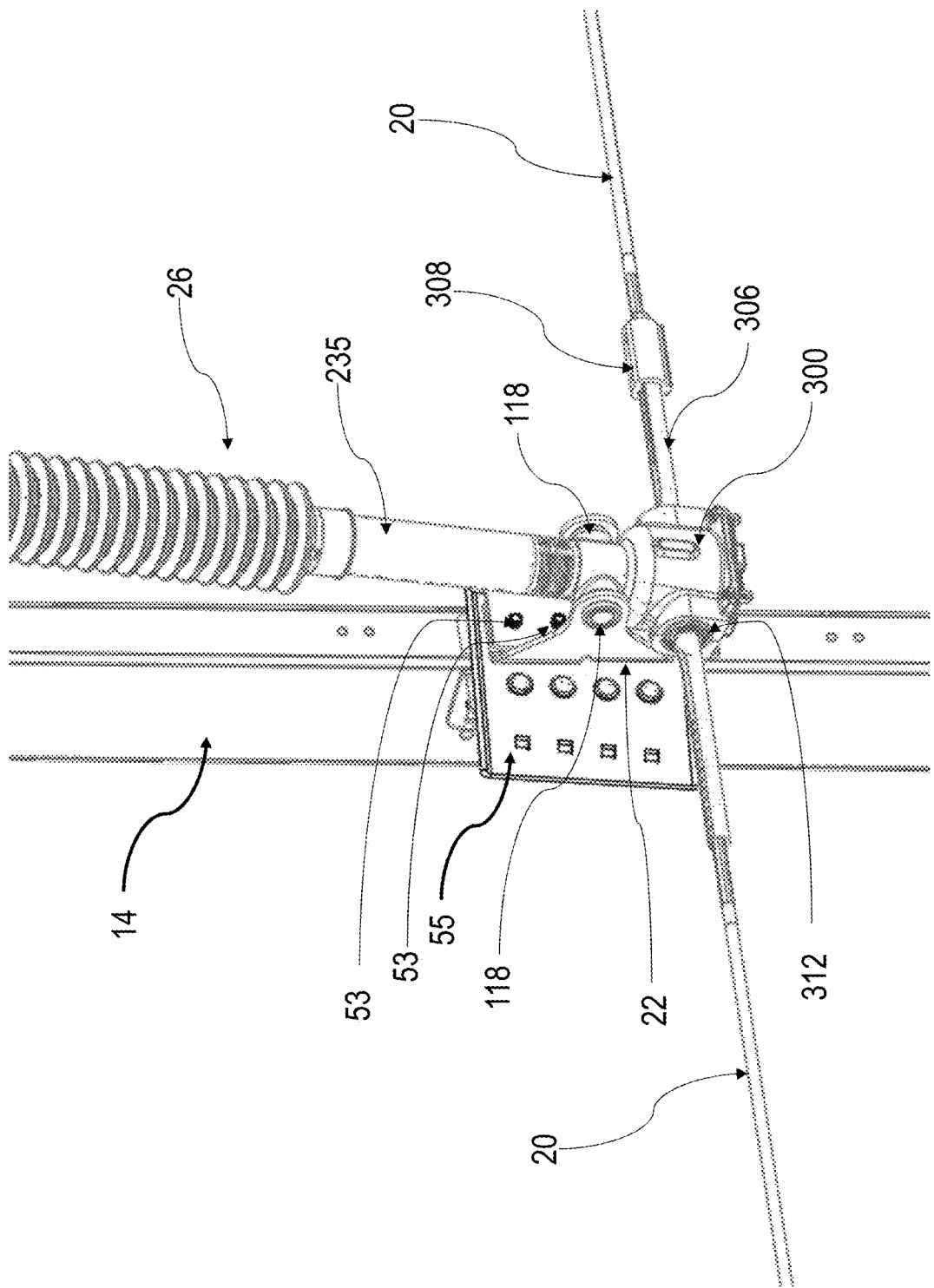

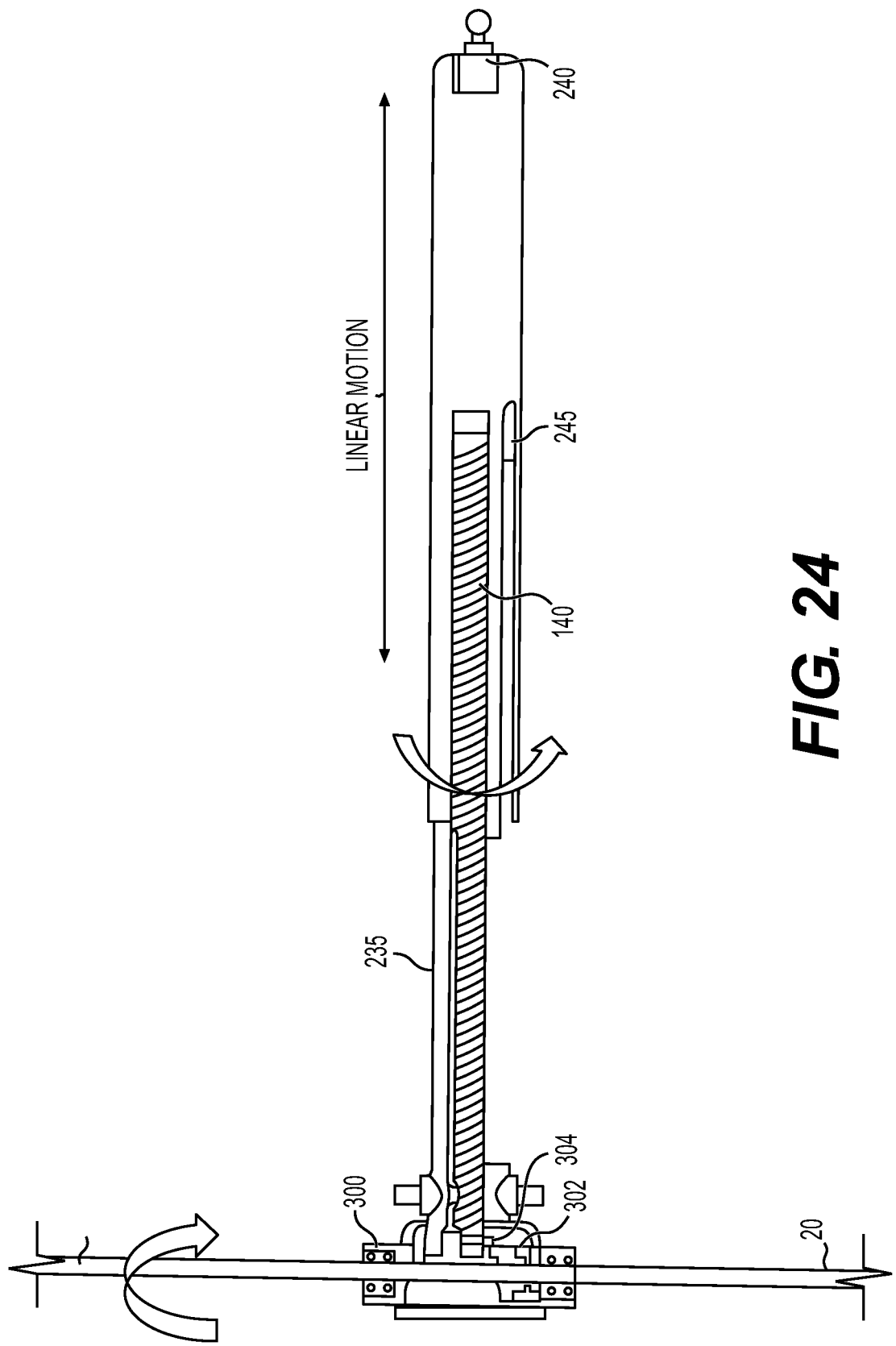

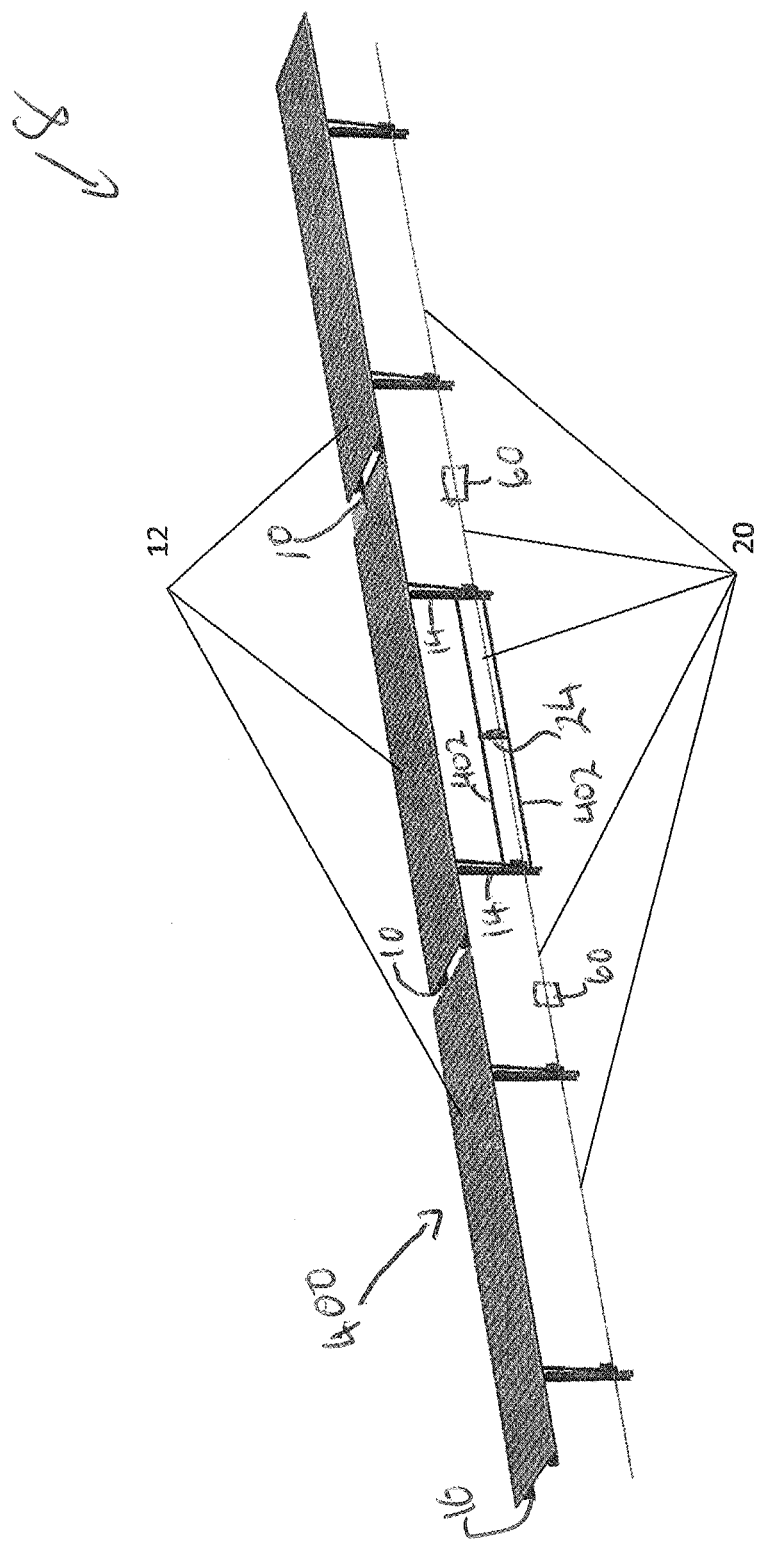

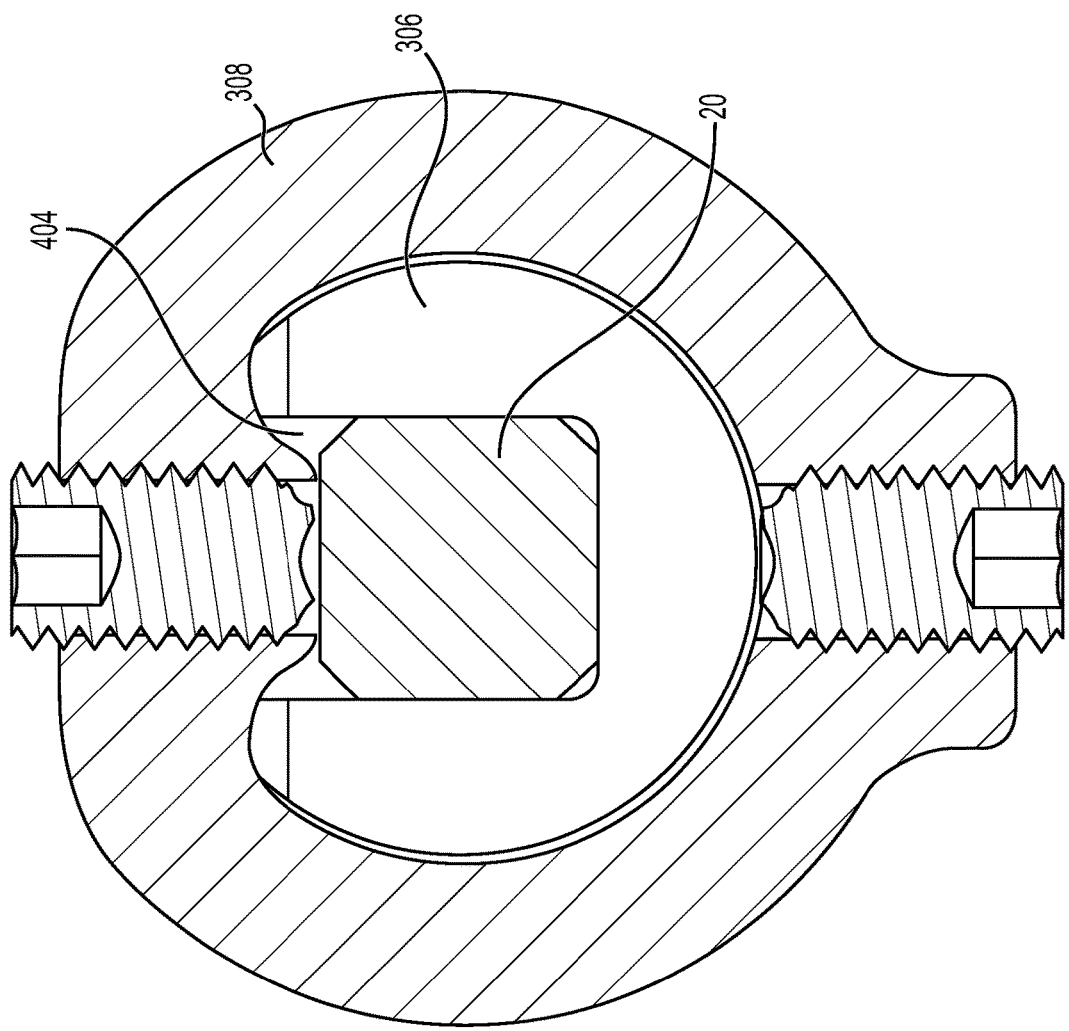

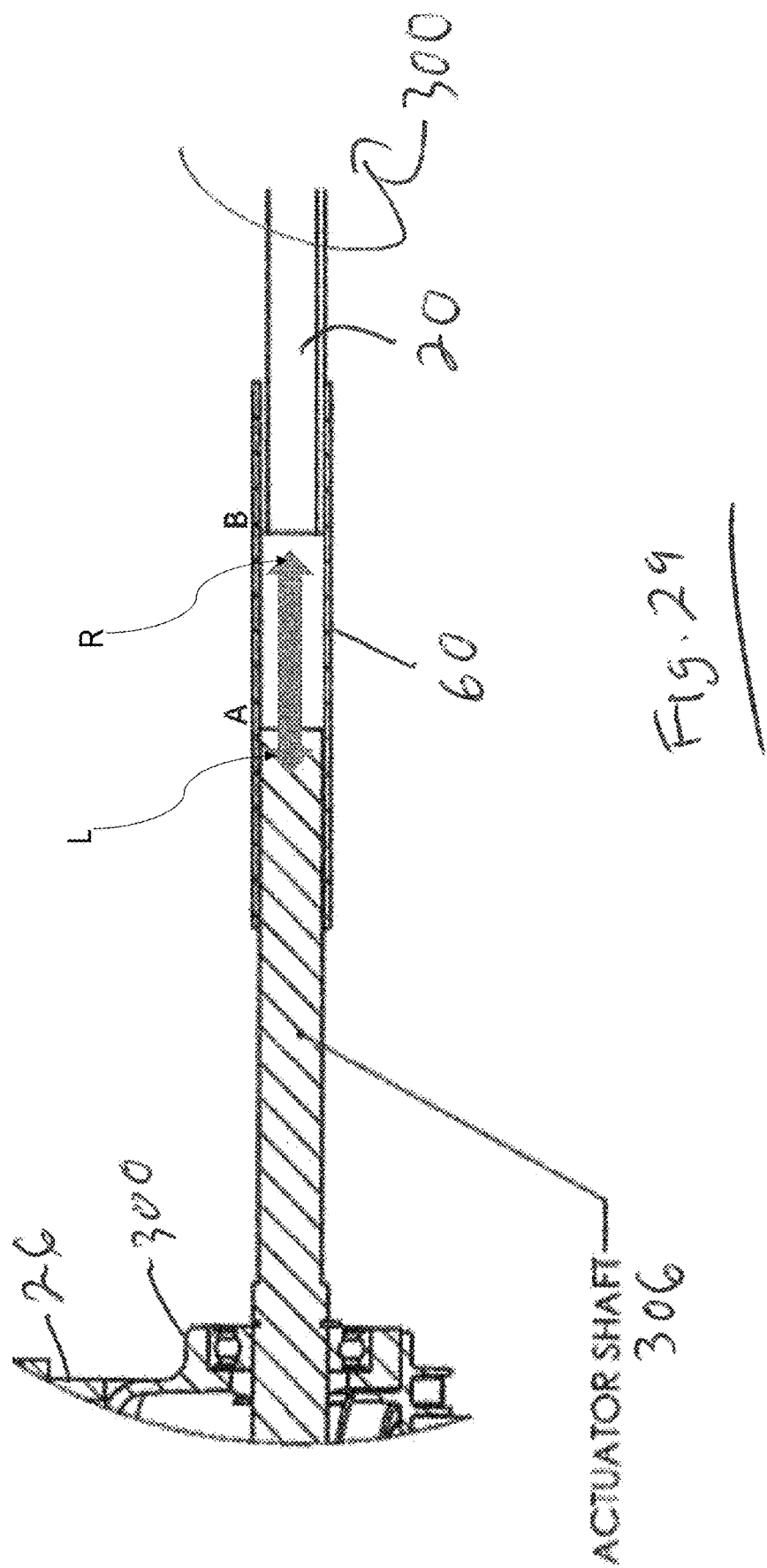

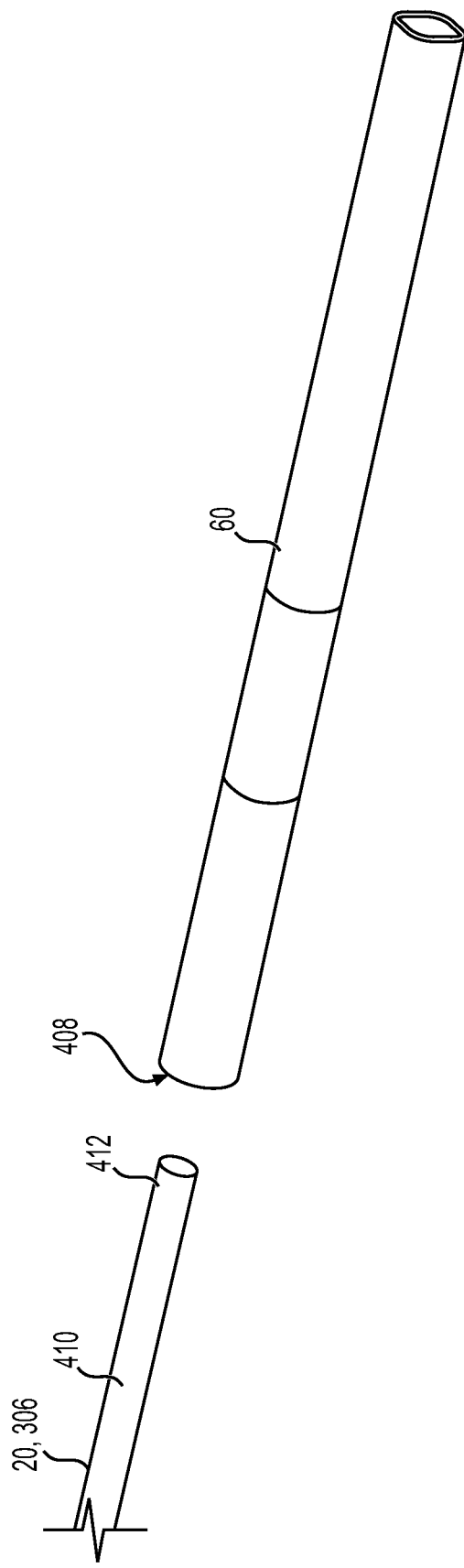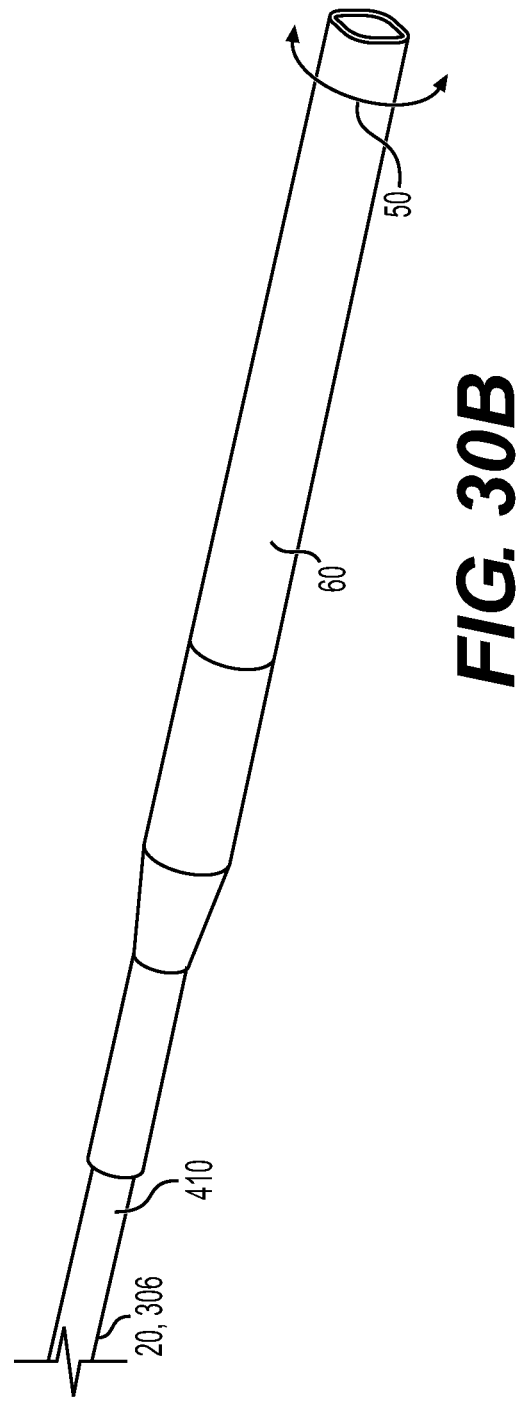

SOLAR PANEL SUPPORT AND DRIVE SYSTEM

CROSS-REFERENCE TO RELATED APPLICATIONS

The present application claims priority from U.S. provisional patent application No. 62/533,877 filed on Jul. 18, 2017, and U.S. provisional patent application No. 62/555,927 filed on Sep. 8, 2017; the entire contents of which are hereby incorporated by reference herein.

FIELD

The present invention relates to solar panel support and drive systems for attitude adjustment.

BACKGROUND

Photovoltaic solar panels absorb sunlight as a source of energy to generate electricity. Photovoltaic systems typically contain an array of photovoltaic solar panels that generate and supply solar electricity in commercial and residential applications. Solar panels also use metal frames that can consist of racking components, brackets, reflector shapes, and troughs to better support the solar panel structure. The solar panel support structure provides racks or frames that are attached to ground-based mounting supports, which can include; pole mounts driven directly into the ground or embedded in concrete, foundation mounts such as concrete slabs or poured footings, and ballasted footing mounts such as concrete or steel bases that use weight to secure the solar module system in position and do not require ground penetration. Due to the desire to maximize operating efficiencies of the solar panel performance, angle of incidence of the sunlight on the solar panel surface is important. For example, solar tracker support systems can increase the amount of energy produced per solar panel at a cost of mechanical complexity and need for maintenance. Solar tracker support systems can sense the direction of the sun light and tilt or rotate the solar panels as needed for maximum exposure to the light. Alternatively, fixed racks can hold the solar panels stationary as the sun moves across the sky, however the fixed rack permanently sets the angle at which the module is held.

In terms of efficiencies, it is important to use support systems as a means to change the attitude of solar panel arrays to the sun over the course of a given day. Support systems can use drive motors coupled to panel support structures via a driveshaft, in order to change the solar panel array attitude. Current support structures can include torque tubes used as drive shafts to carry deflection (i.e. bending between adjacent panels) and torque forces (i.e. provided by the drive motor), such that the size and complexity of the torque tube can increase for larger arrays and/or increased incidence of wind loading. As such, current support systems for solar panels must accommodate bending and torsion forces exerted on their driveshaft due to misalignments between supports due to grading differences of the supporting terrain, wind and weight loading of the solar panels being transferred to the driveshaft, which can result in increased material costs and design in order to provide for adequate resistance to deflection and torsion loading.

SUMMARY

It is an object of the present disclosure to obviate or mitigate at least one of the above presented disadvantages.

It is an object of the present invention to decrease the size and complexity of solar panel support systems.

An aspect provided is a solar panel support apparatus comprising: a support frame for holding the solar panel; a support post pivotally connected to the support frame at a post pivot connection and anchored to an adjacent supporting surface, the support post for positioning the support frame above the supporting surface; and a linear actuator coupled at a proximal end to the support post by a support pivot connection and at a distal end by a frame pivot connection with the support frame, the post pivot connection and the frame pivot connection spaced apart from one another on the support frame; wherein a change in a length of the linear actuator results in pivoting of the support frame about the post pivot connection.

A further aspect provided is a solar panel support and drive system 8 including a support frame for holding a solar panel, such that a pair of support posts pivotally connect to the support frame at respective post pivot connections and anchored to an adjacent supporting surface. The support posts are utilized for positioning the support frame above the adjacent supporting surface. The solar panel support and drive system also includes a corresponding pair of linear actuators coupled at their proximal ends to the respective support posts by respective support pivot connections and at their distal ends by the respective frame pivot connections with the support frame, such that the post pivot connections and the frame pivot connections are spaced apart from one another on their portions of the support frame, wherein a change in a length of the linear actuators results in pivoting of the support frame about the post pivot connections.

BRIEF DESCRIPTION OF THE DRAWINGS

Reference is made, by way of example only, to the attached figures, wherein:

FIG. 7 is a side view of the linear drive unit of FIG. 6;

FIGS. 8-12 show example brackets of the system of FIG. 1;

FIGS. 13-15 show example multiple panel configurations of the system of FIG. 1;

FIG. 18 shows a cross sectional view of a linear drive unit and drive shaft of the system of FIG. 1;

FIG. 19 shows a perspective view of the linear drive unit and drive shaft of FIG. 18;

FIG. 20 shows a further cross sectional view of a linear drive unit and drive shaft of the system of FIG. 1;

FIGS. 22a,b,c show further attitude positions of the system of FIG. 6;

FIG. 24 shows operation of the drive system of FIG. 1;

FIG. 25 is a further embodiment of the system of FIG. 15;

FIG. 28 is a cross sectional view of the coupling of FIG. 27;

FIG. 29 is a still further embodiment of the coupling of FIG. 15;

FIGS. 30a and 30b show examples of the coupling embodiment of FIG. 29;

DETAILED DESCRIPTION OF EXAMPLE EMBODIMENTS

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments. Likewise, use of a plural form in reference to an item is not intended to exclude the possibility of including one of the item in some embodiments. It will be apparent to one skilled in the art in at least some instances in this specification and the attached claims that it would be possible to include one of the item in at least some embodiments.

Figure 1:
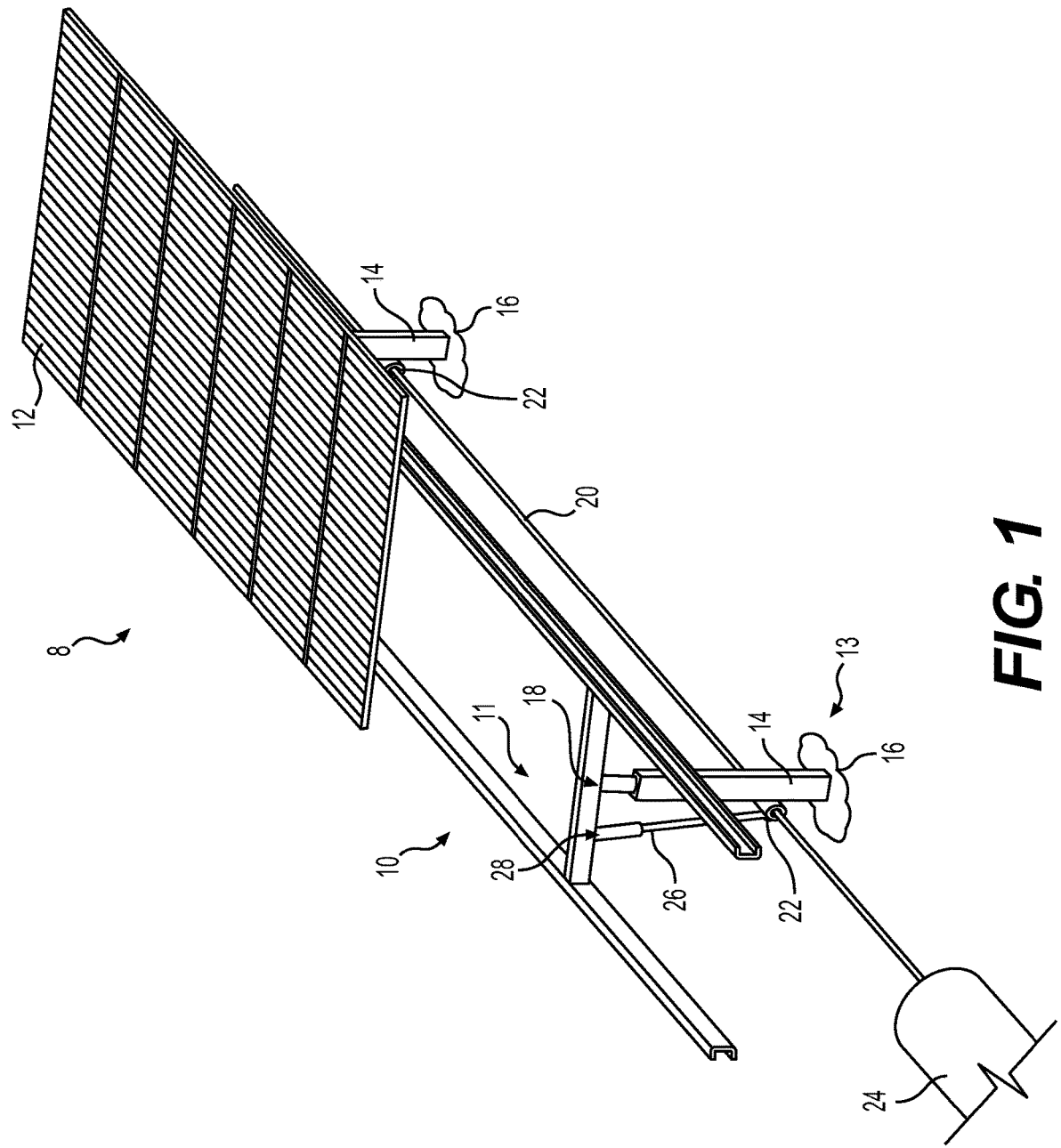
FIG. 1 is a front perspective view of a panel support and drive system.
Figure 2:
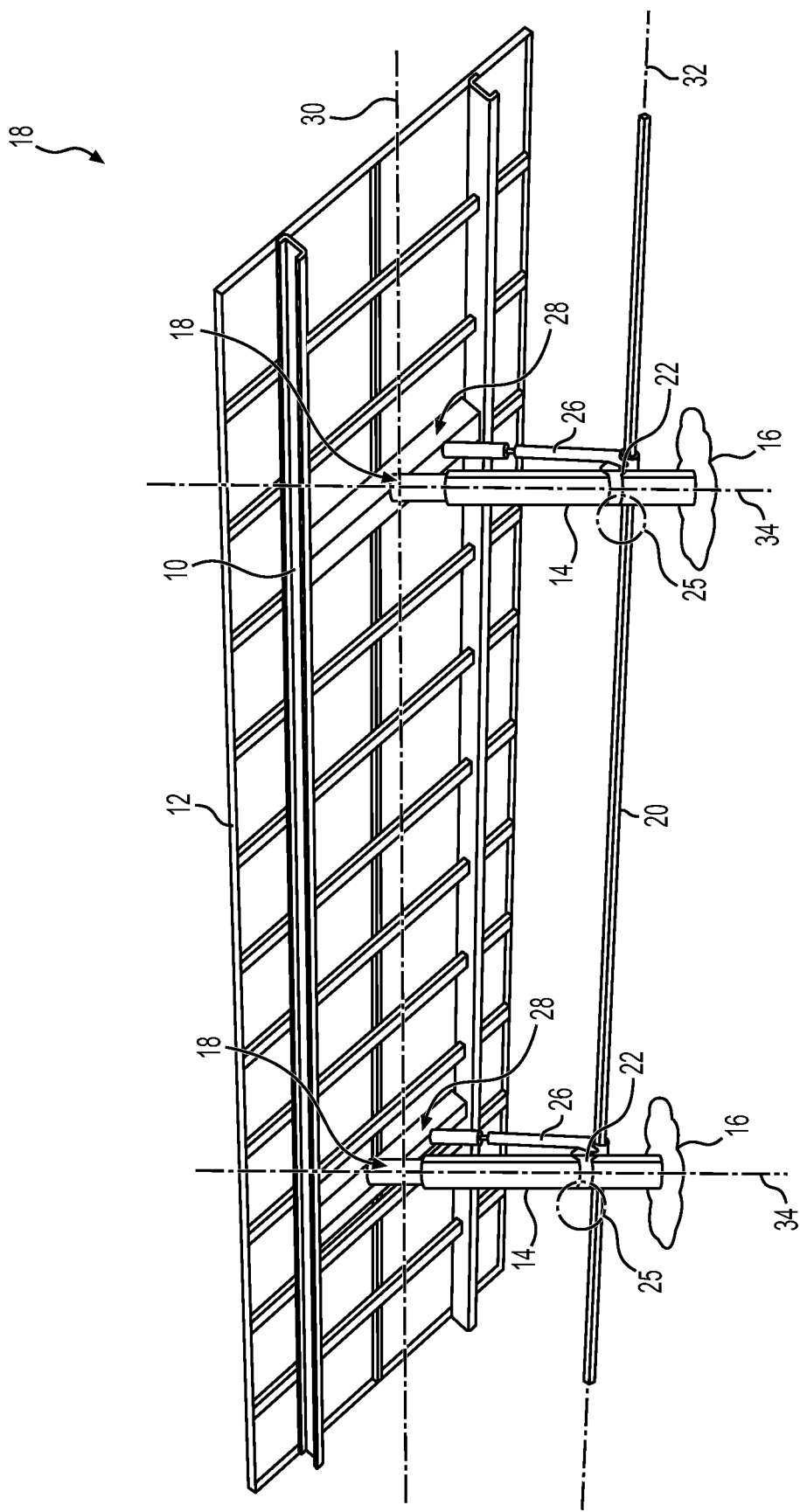
FIG. 2 is a rear perspective view of the system of FIG. 1.
Figure 3:
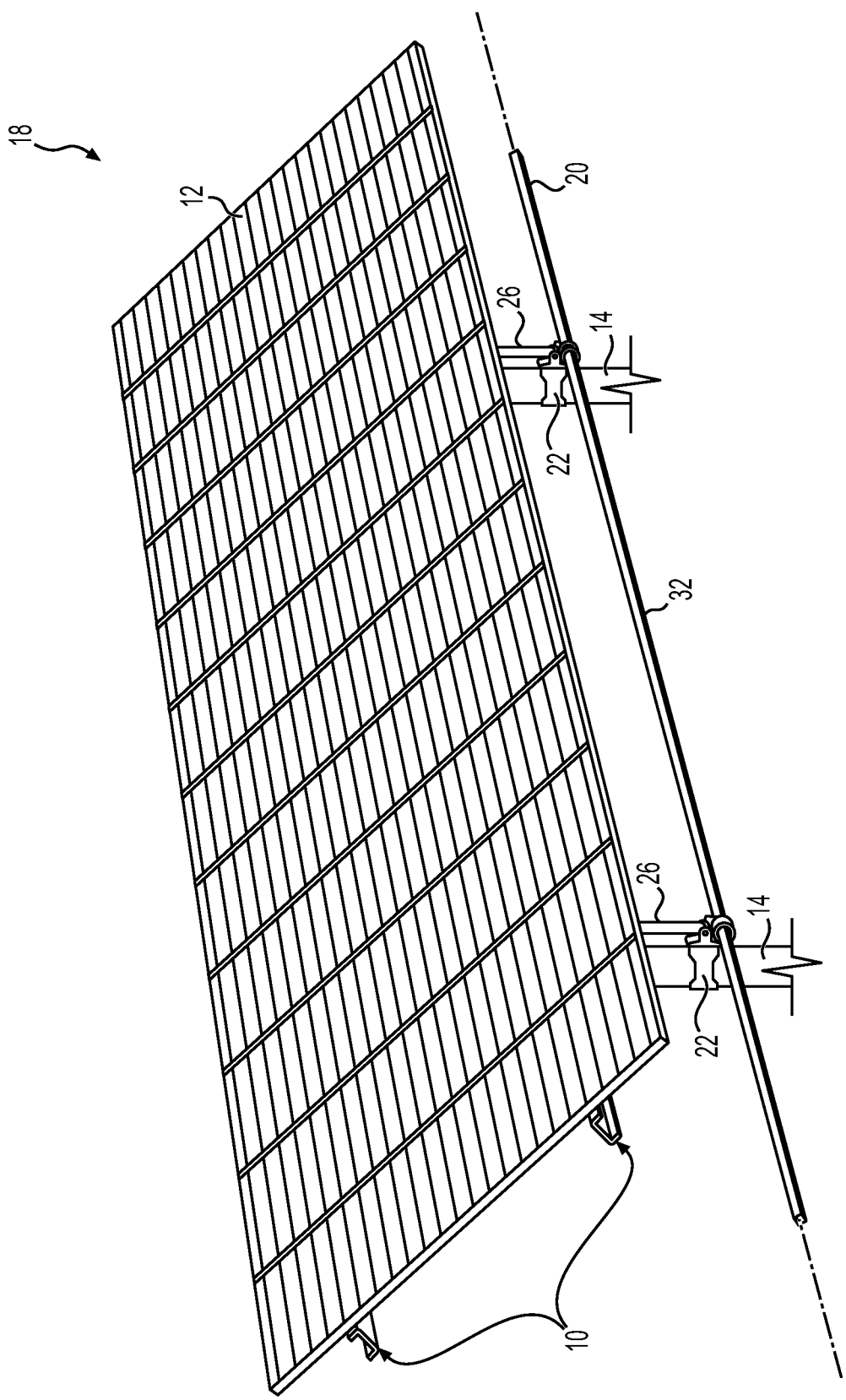
FIG. 3 is a further front perspective view of the system of FIG. 1.

Referring to FIGS. 1, 2, and 3, shown is a panel support and drive system 8 having a support frame 10 for a photovoltaic (e.g. solar) panel 12, such that each support frame 10 is supported by a pair of support posts 14 mounted to an adjacent supporting surface (e.g. ground) 16. The support posts 14 are situated along a support axis 34, extending (e.g. vertically) from the supporting surface 16. The role of the support post 14 is to position and support the support frame 10 and respective panel 12 above the supporting surface 16 (e.g. ground). Each support post 14 has a distal end 11 coupled to the support frame 10 and a proximal end 13 mounted to the supporting surface 16 (e.g. ground). The support posts 14 are coupled to the support frame 10 at a post pivot connection 18 further described below. A drive shaft 20 is connected at each support post 14 by a drive shaft support bracket 22, the support bracket 22 mounted to each support post 14, such that the drive shaft 20 can be free to rotate within the support bracket 22. The drive shaft 20 can be driven by a system drive unit 24 (e.g. electric drive motor), in order to rotate the drive shaft 20 for providing a drive system for each linear actuator 26 (for example of a plurality of linear actuators 26 further described below) also coupling (e.g. indirectly) the support frame 10 to each respective support post 14. Each linear actuator 26 is pivotally coupled to the support frame 10 at frame pivot connection 28 at a distal end 100 and to the drive shaft 20 via the support bracket 22 at a proximal end 102 via a support pivot connection 118 (see FIG. 7). It is recognized that the frame pivot connection 28 is spaced apart from the post pivot connection 18 on the support frame 10, in order to provide for actuated rotation 50 of the support frame 10 about post pivot connection 18 (see FIG. 6) by the linear actuator 26, as the linear actuator 26 is either extended or retracted as further discussed below. It is also recognized that rather than having the drive unit 24 for driving multiple linear actuators 26 via the common drive shaft 20, each of the linear actuators 26 can have a respective drive unit 25 (shown in ghosted view) for driving the respective linear actuator 26, such that each of the respective drive units 25 would work in tandem when mounted on the common drive shaft 20. It is also recognized that the drive system 8 could have both the drive units 24, 25 or any combination thereof, as desired.

The solar panel support and drive system 8 (e.g. apparatus) can include the support frame 10 for holding the solar panel 12, such that one or more support posts 14 pivotally connect to the support frame 10 at the post pivot connection 18 and are anchored to the adjacent supporting surface 16. The support post 14 is utilized for positioning the support frame 10 above the adjacent supporting surface 16. The solar panel support and drive system 8 also includes one or more linear actuators 26 coupled at their proximal end 102 to the support post 14 by a support pivot connection 118 and at the distal end 100 by the frame pivot connection 28 with the support frame 10, the post pivot connection 18 and the frame pivot connection 28 spaced apart from one another on the support frame 10, wherein a change in a length as shown in FIG. 24 of the linear actuator 26 results in pivoting of the support frame 10 about the post pivot connection 18. It is recognized that the post pivot connection 18 can be referred to as pivot 18, the support pivot connection 118 can be referred to as pivot 118, and the frame pivot connection 28 can be referred to as pivot 28.

For example, as shown in FIG. 2, the solar panel support and drive system 8 can include the support frame 10 for holding the solar panel 12, such that a pair of support posts 14 pivotally connect to the support frame 10 at the post pivot connections 18 and anchored to the adjacent supporting surface 16. The support posts 14 are utilized for positioning the support frame 10 above the adjacent supporting surface 16. The solar panel support and drive system 8 also includes a corresponding pair of linear actuators 26 coupled at their proximal ends 102 to the respective support posts 14 by respective support pivot connections 118 and at their distal ends 100 by the respective frame pivot connections 28 with the support frame 10, the post pivot connections 18 and the frame pivot connections 28 spaced apart from one another on their portions of the support frame 10, wherein a change in a length of the linear actuators 26 results in pivoting of the support frame 10 about the post pivot connections 18.

It is recognized that the support frame 10 is pivotally coupled to each support post 14 at a pair of locations, one location being the pivot 18 coupling (e.g. directly) the support frame 10 to the distal end 11 of the support post 14 and the other location being the pivot 28 coupling (e.g. indirectly) the support frame 10 to the support bracket 22 via the linear actuator 26, such that the support bracket 22 is positioned between the proximal end 13 and the distal end 11 of the support post 14. It is recognized that the pivots 18, 28 are spaced apart from one along the support frame 10, such that the pivot 18 is on a support table longitudinal pivot axis 30 (approximately horizontal or otherwise approximately parallel to and distanced from the adjacent supporting surface 16) and the pivot 28 is offset from the pivot axis 30. It is recognized that the support axis 34 and the pivot axis 30 are transverse to one another. As such, it is also recognized that the drive shaft 20 is situated along a longitudinal drive axis 32, which for example can be positioned as offset and therefore adjacent to the support axis 34, recognizing in this example the pivot axis 30 and the support axis 34 can intersect one another while the drive axis 32 and the support axis 34 do not intersect (e.g. as the drive axis 32 can be positioned offset from the support post 14 via the support bracket 22). As such, pivots 18, 118, 28 can be positioned at vertices of a triangular shape structure, such that the linear actuator 26 and the support frame 10 and the support post 14 make up the sides of the triangular shape structure.

Figure 23B:
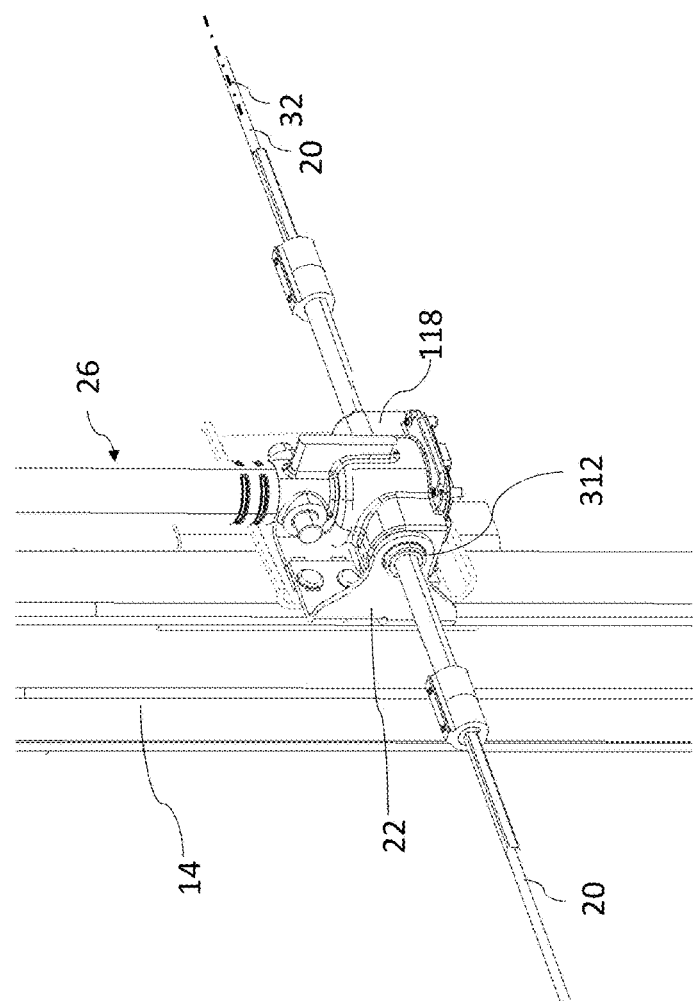
FIGS. 23a,b show alternative embodiments of the linear drive unit of FIG. 1.
FIGS. 23c,e show enlarged perspective views of the alternative embodiments of the linear drive unit of FIGS. 23a,b.
FIGS. 23d,f show the transfer of forces from the linear drive units of FIGS. 23a,b to the support posts.
Figure 23A:
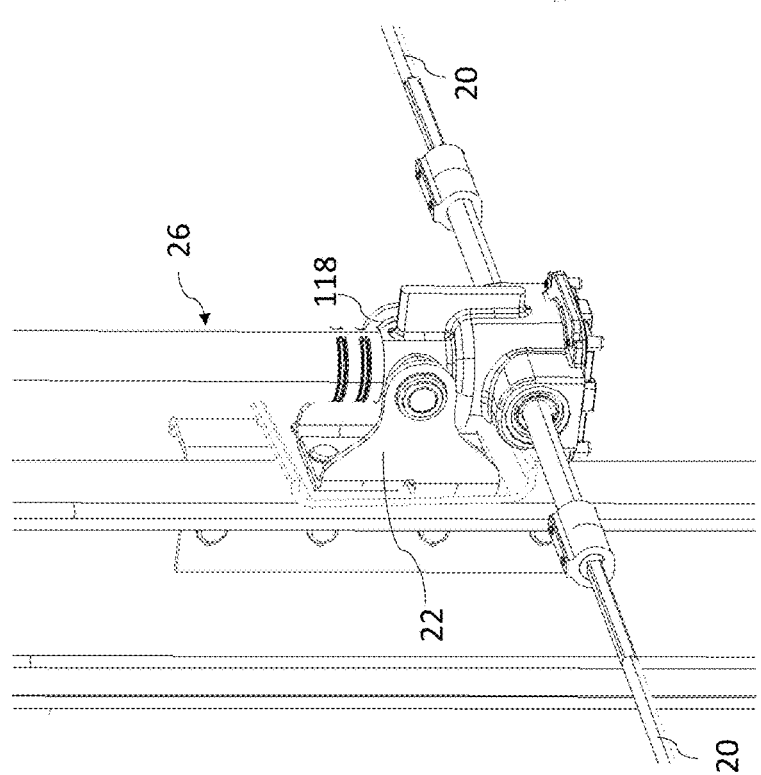

At the other end of the linear actuator 26, as shown by example in FIGS. 23*a,b*, there is the pivot 118, such that linear actuator 26 is pivotally connected at one end to the support frame 10 at pivot 28 and at the other end of the linear actuator 26 at pivot 118 to the support post 14 (e.g. via support bracket 22). Further, the support post 14 is connected adjacent to one end pivotally to the linear actuator 26 at pivot 118 and is connected adjacent at the other end pivotally to the support frame 10 at pivot 18. As can be seen in FIG. 22*b*, the support frame 10 (or support table 10) extends between pivot 28 and pivot 18, the linear actuator 26 extends between pivot 28 and pivot 118, and the support post 14 extends between the pivot 118 and the pivot 18. It is recognized that support bracket 22 can be optional, as the pivot 118 can be positioned directly on the support post 14, rather than adjacent to the support post 14 via the support bracket 22 as shown.

Figure 4:
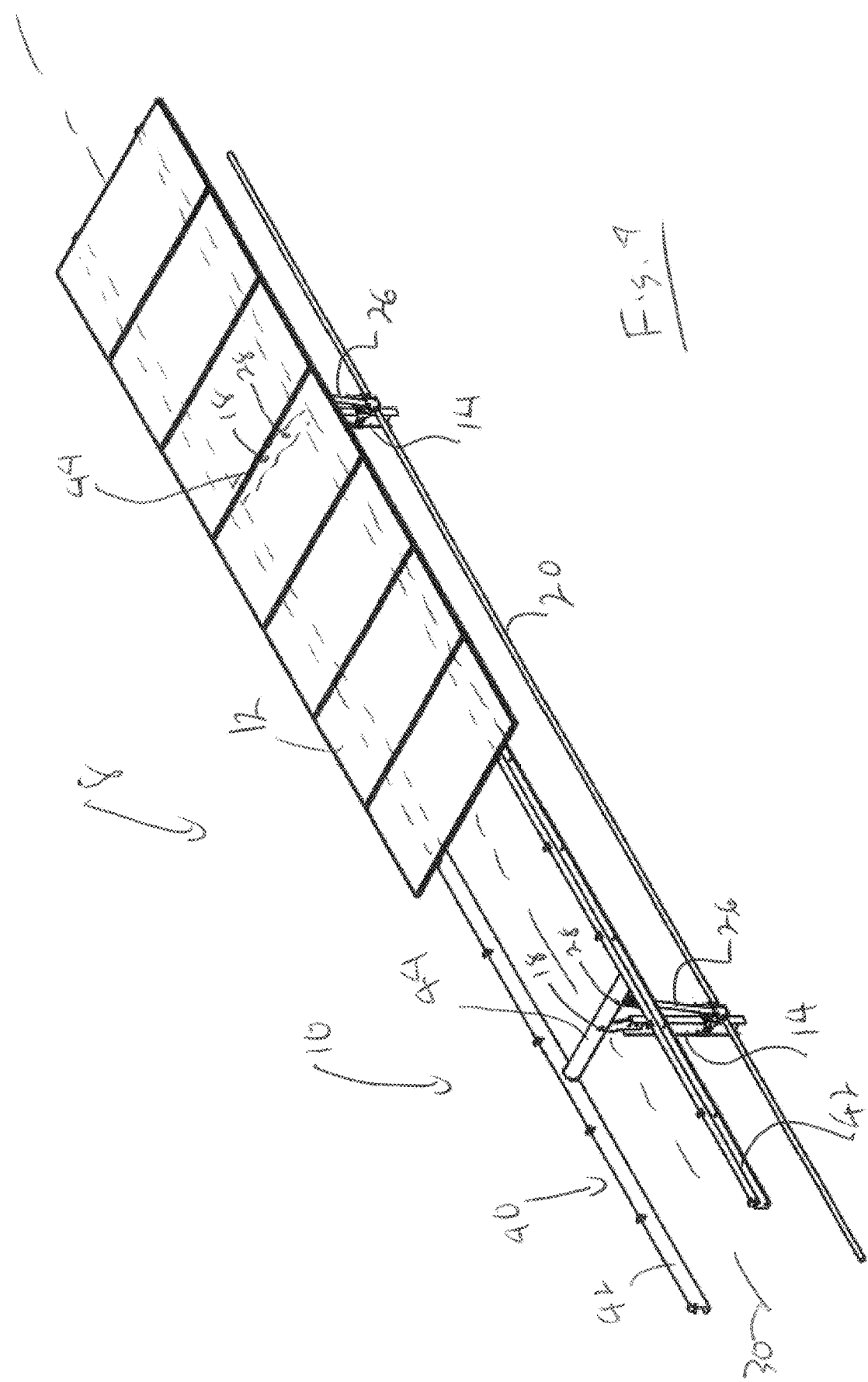
FIG. 4 is a view of the system of FIG. 1.
Figure 5:
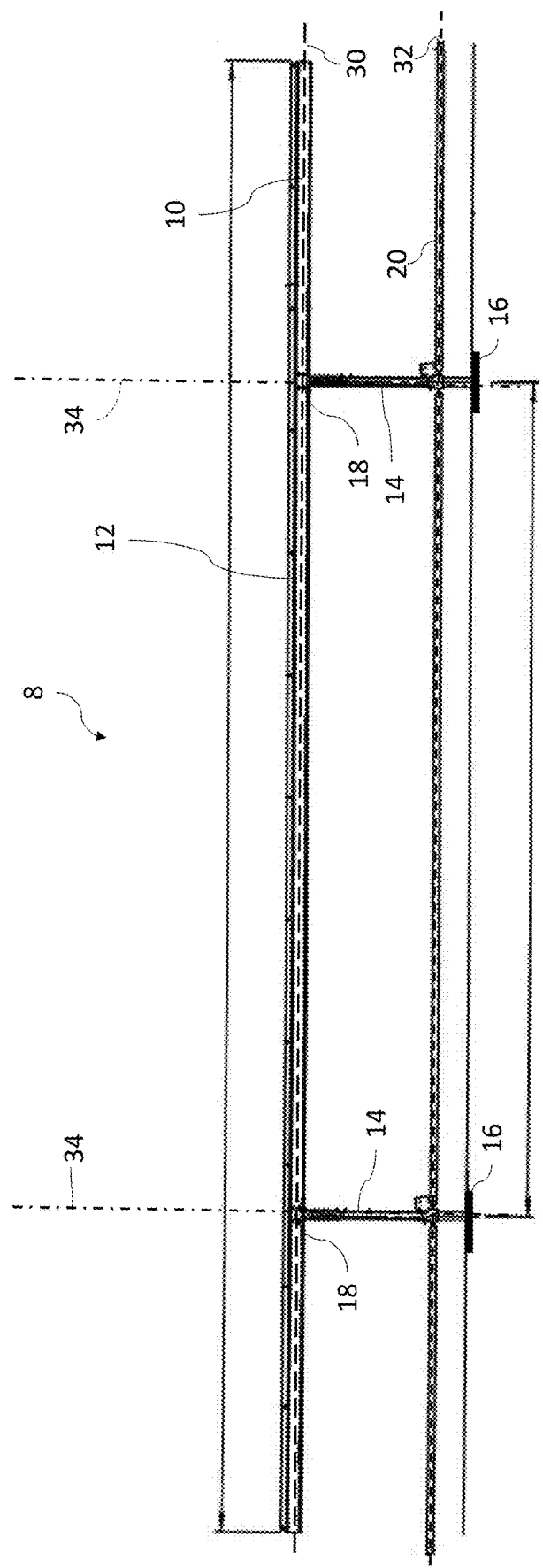
FIG. 5 is a side view of the system of FIG. 1.

Referring to FIGS. 4 and 5, the support frame 10 can be comprised of multiple support members 40, for example such as but not limited to: a pair of longitudinal members 42 extending along, and spaced apart from either side of the pivot axis 30; and a pair of lateral support members 44 extending transverse to the pivot axis 30 and connecting the longitudinal members 42 to one another. As described, the lateral support members provide the pivots 18, 28 for connecting the support frame 10 to the support posts 14 (e.g. directly by the pivot 18 and indirectly by the pivot 28 via the linear actuator 26).

Referring to FIG. 6, shown is a side view of the support frame 10 pivotally attached to support post 14, showing three example operational positions of the panel 12, 14*a*, 14*b* representing different representative states of the rotation/pivoting 50 provided for by operation of the linear actuator 26 (depicted neutral state of linear actuator 26), 26*a* (ghosted view—depicted extended state of linear actuator 26), 26*b* (ghosted view—depicted retracted state of linear actuator 26) via the drive unit 24 (see FIG. 1). It is recognized that the different operational states are used by the drive system 8 to adjust the attitude (about pivot 18) of the panel 12 (e.g. to track the angle of the sun with respect to the supporting surface 16 in order to optimize the efficiency of solar energy collection by the panel 12).

Figure 6A:
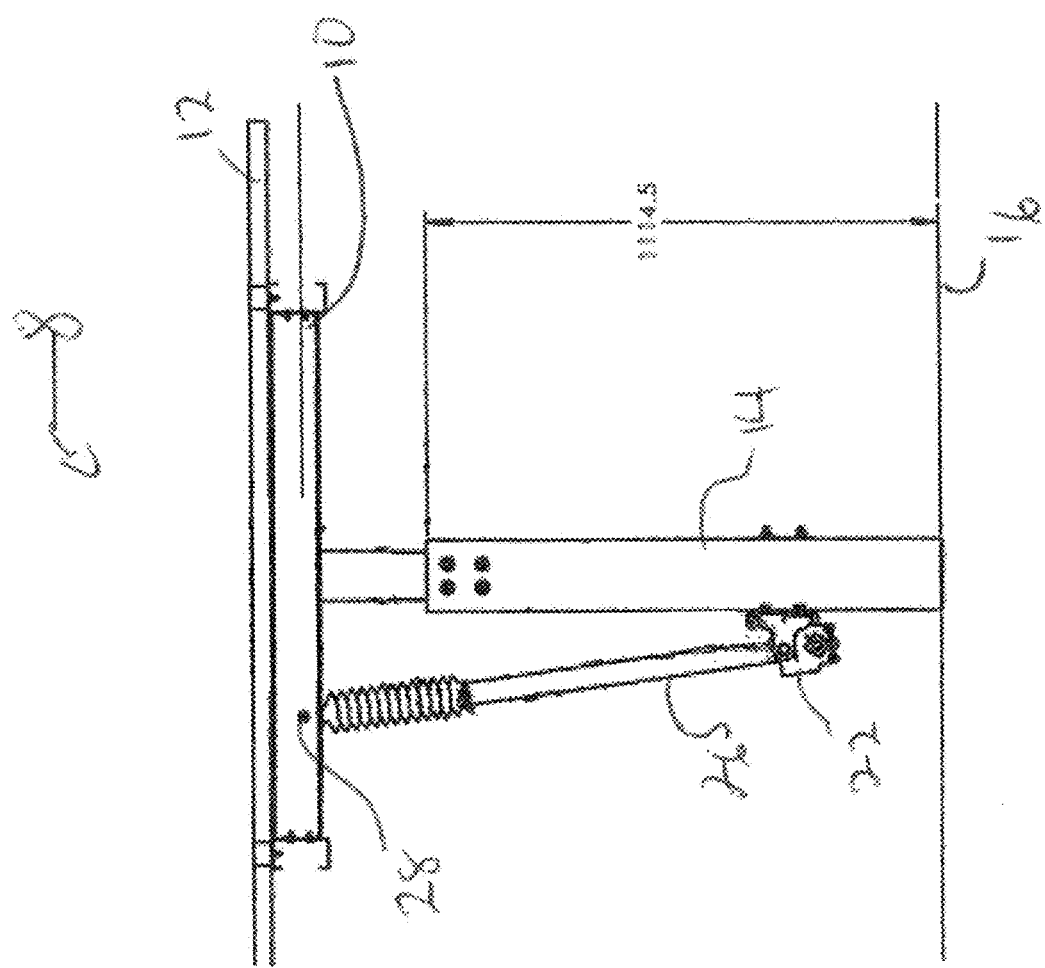
FIGS. 6a to 6c show operational examples for attitude adjustment of the panel of FIG. 1 via a linear drive unit.
Figure 6C:
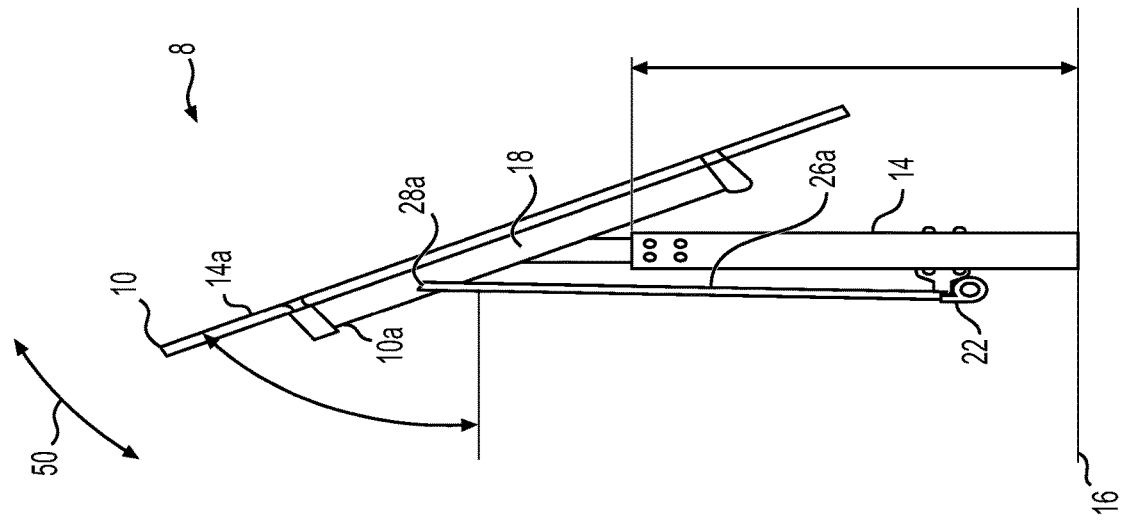
Figure 6B:
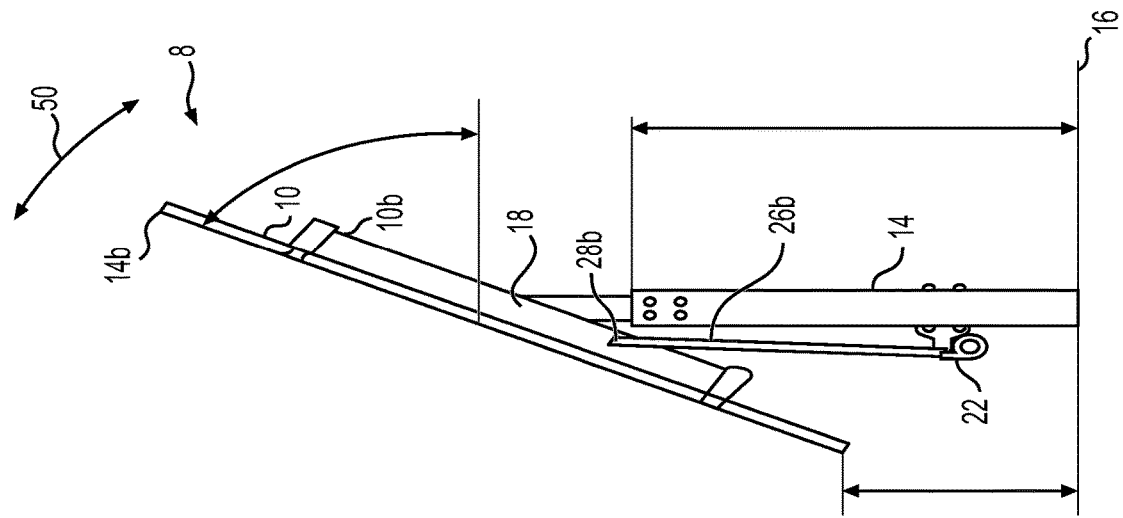

As such in FIGS. 6A to 6C, the representative positions of the support frame 10 (neutral), 10*a* (retracted), 10*b* (extended) are also shown, as the support frame 10 pivots about pivot 18. It is recognized that the linear actuator 26 is extensible/retractable, thus providing for pivoting/rotation of the support frame 10 about the pivot 18, as either end of the linear actuator 26 pivots about their respective pivot 28,118. For example, depicted linear actuator 26 represents the linear actuator 26 in the neutral state (see FIG. 6A) such that the support frame 10 is approximately coplanar (e.g. horizontal) with the supporting surface 16 (e.g. ground). Depicted linear actuator 26*b* represents the linear actuator 26 in the retracted state (see FIG. 6B) (e.g. the length of the representative depicted linear actuator 26*b* between the pivot 28 and the support bracket 22 is less than the length of the representative linear actuator 26 between the pivot 28 and the support bracket 22), such that the rotation 50 of the support frame 10 about pivot 18 in the retracted state is in a counterclockwise direction with respect to the neutral state (e.g. being neither retracted or extended). Further, depicted linear actuator 26*a* represents the linear actuator 26 in an extended state (see FIG. 6C) (e.g. the length of the representative linear actuator 26*a* between the pivot 28 and the support bracket 22 is greater than the length of the representative linear actuator 26 between the pivot 28 and the support bracket 22), such that the rotation 50 of the support frame 10 about pivot 18 in the extended state is in a clockwise direction with respect to the neutral state. Further, it is recognized that depicted linear actuator 26*a* state pivots on support bracket 22 and pivot 28*a*, depicted linear actuator 26*b* state pivots on support bracket 22 and pivot 28*b*, and depicted linear actuator 26 state pivots on support bracket 22 and pivot 28. As such, it is recognized that the coupling of the linear actuator 26 with the support bracket 22 is pivotal, in order to accommodate the extension and retraction geometry changes (e.g. angles) between the support frame 10, the linear actuator 26, and the support post 14. FIG. 7 shows the drive system 8 with a table bracket 51 connecting the support frame 10 to the support post 14 and the linear drive unit 24 to the support post 14 via the support bracket 22.

Figures 11, 12:
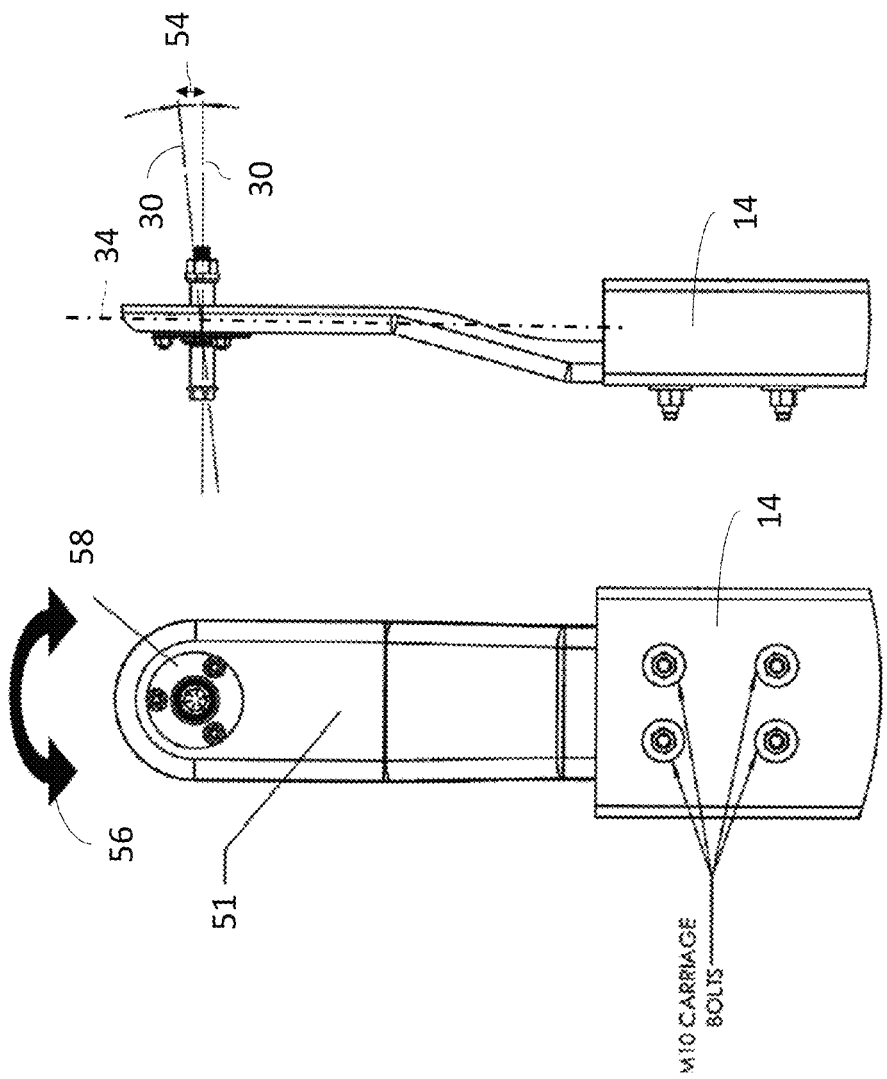
Figure 15:
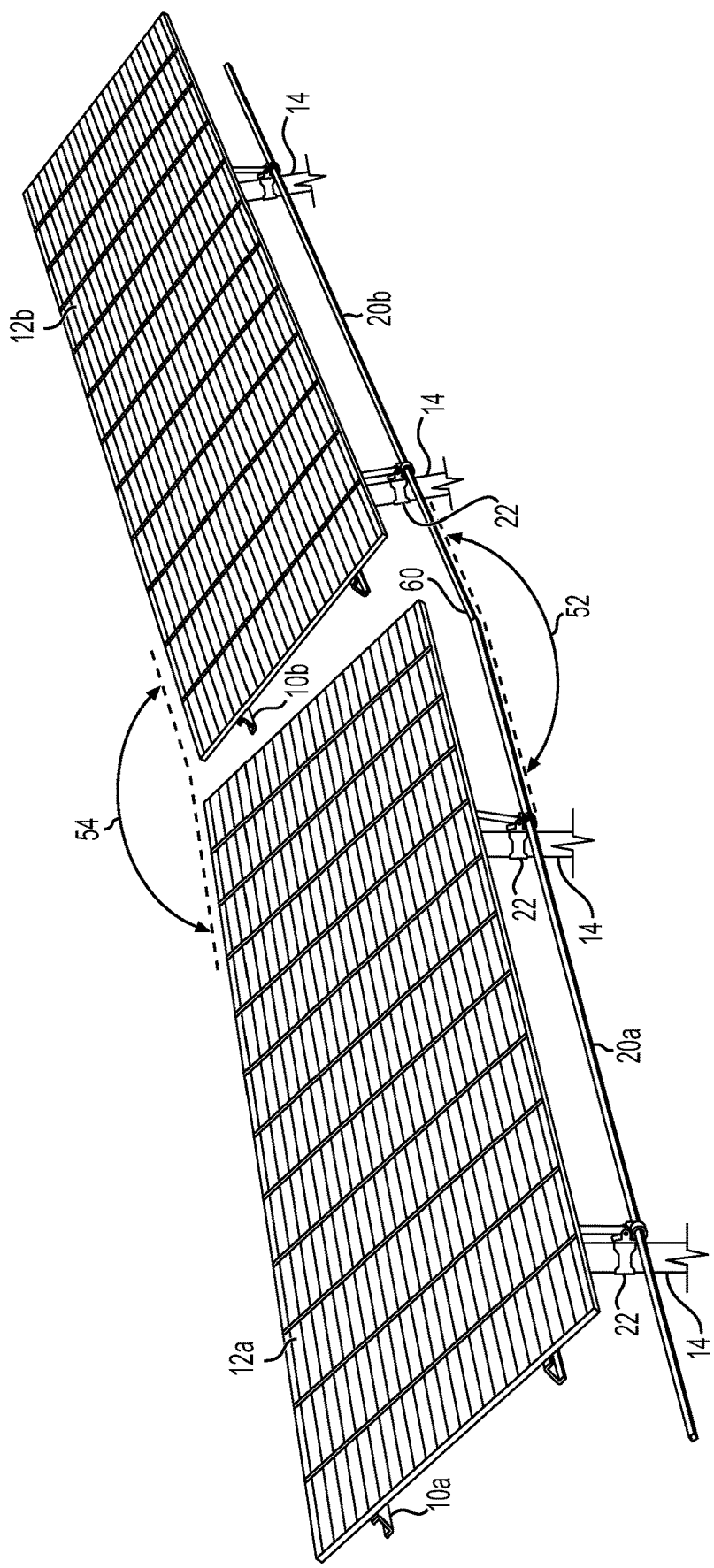

Referring to FIG. 8, shown is the support post 14, with brackets 22,51, such that the brackets 22, 51 provide for respective angular adjustment 52,54 of the attached drive shaft 20 sections between one side of the support post 14 and the other side (i.e. on either side of the support axis 34) as well as for respective angular adjustment 52,54 of the attached adjacent panels 12 on separate adjacent support tables 10. FIG. 10, and FIG. 23*c* illustratively show connectors 54, such as nut and bolt fasteners, for mounting the brackets 22 to a mounting assembly illustratively including a plate 55 mounted to the support 14. Illustratively the plate 55 includes an inclined portion 55*a* for providing the angular adjustment 52 e.g. the brackets 22 will be angularly adjusted relative to the post 14 when mounted to the plate 55. FIG. 15 shows example support frame 10*a* with panel 12*a* at an angle 54 with respect to support frame 10*b* with panel 12*b*, as facilitated by bracket 51 angular adjustments. Similarly, shown is drive shaft section 20*a* at an angle 52 with respect to drive shaft section 20*b*, as facilitated by support bracket 22 angular adjustments. FIG. 9 shows further details of the table bracket 51 concerning angular adjustment to accommodate angles between adjacent panels 12 (see FIG. 15). FIG. 10 shows further details of the support bracket 22 concerning angular adjustment to accommodate angles between adjacent drive shaft 20 sections (see FIG. 15). FIGS. 11, 12 shows bracket 51 with pivot support coupling 58 (e.g. ball and socket joint, pin bushing coupling), having multiple degrees of freedom to provide for both pivot/rotation 50 of the support frame 10 about pivot axis 30 (see FIG. 4) as well as pivot/rotation of the angle between pivot axis 30 and support axis 34.

Referring to FIG. 13, shown are multiple panels 12 mounted adjacent to each other on respective support tables 10 along a common drive shaft 20 extending along the length of the panels 12 (i.e. panel assembly) in multiple drive shaft sections (e.g. drive shaft sections 20$a,b$—by example see FIG. 15). It is recognized that each panel 12 can have its own drive shaft 20 section extending at least between the pair of support posts 14 for the support frame 10 supporting the panel 12. For example, drive shaft 20 section can extend between and beyond the pair of support posts 14 for the support frame 10 supporting the panel 12 The drive shaft section 20$a$ can also be connected to an adjacent drive shaft section 20$b$ by an intermediate drive shaft coupling 60 member, see FIG. 15. In an embodiment, a single drive shaft 20 section can extended between more than a pair of support posts 14, for example such as three, four, or more.

Referring to FIG. 14, shown by example are the different angles 52,54 for the adjacent drive shafts 20, panels 12, as facilitated by the angular adjustment afforded by the brackets 22,51.

Figure 16:
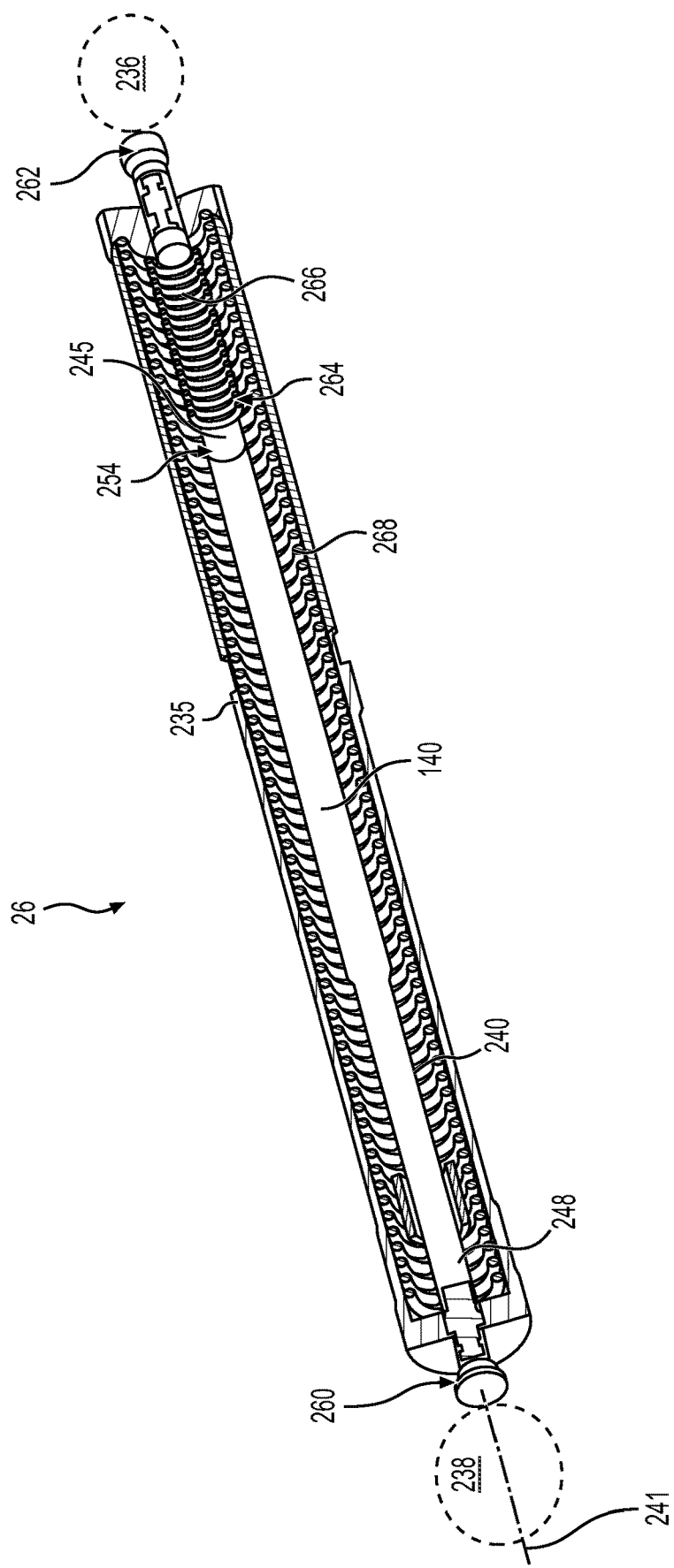
FIGS. 16 and 17 show an example linear drive unit configuration for the linear drive unit of FIG. 1.

Referring to FIG. 16, shown is an example linear actuator 26, for example a drive member 26 such as a spring loaded strut 26. A housing 235 also contains an extension member 240 used to extend from, or retract within, the housing 235 to effect the resulting location of the panel 12 with respect to the support post 14. For example, an extended extension member 240 results in positioning the panel 12 in the extended state, while a retracted extension member 240 results in positioning the panel 12 in a retracted state with respect to the support post 14. It is recognized that the drive member 26 can be implemented as a strut (see FIG. 17 as an example type of strut). The strut 26 can be of a biasing type (e.g. spring and/or gas charge supplying the bias). In one example, see FIG. 17, the extension member 240 is actively driven by via a lead screw 140. The extension member 240 is either extended from, or retracted into, the housing 235. It is recognized that the linear actuator 26 can have the lead screw 140 (e.g. rotary output member—see FIG. 17) operated actively (i.e. driven) by the drive unit 24 (e.g. electrical—see FIG. 1).

Referring to FIGS. 2, 16, 20, shown is the linear actuator 26 with the housing 235 (e.g. body) having a first end 260 for connecting to the support frame 10 (or the support post 14) and a second end 262 for connecting to the support post 14 (or the support frame 10), depending upon the configuration orientation of the linear actuator 26 when installed in the drive system 8 (see FIG. 1). In this configuration, the linear actuator 26, by example only, has the extension member 240 (e.g. a stator member slideably engageable with the rotary output member such as via mated threads) positioned in an interior 264 of the housing 235 (e.g. body). A distal end of 254 the extension member 240 is coupled to the second end 262 (for example via an optional element—kicker spring 266) and the proximal end 248 of the extension member 240 is coupled to the first end 260. The extension member 240 is coupled to the lead screw 140 via the travel member 245 (for example as an integral part of or separate to the extension member 240), such that rotation of the lead screw 140 causes travel of the travel member 245 along the lead screw 140, to result in extension or retraction of the extension member 240 with respect to the housing 235. As discussed in relation to FIG. 17, the travel member 245 and the lead screw 140 are coupled to one another via mated threads. As shown, the linear actuator 26 can be a strut having a resilient element of the power spring 268 for providing the counterbalance torque (T) during operation of the panel 12 in moving between the extended and retracted positions (see FIG. 6). As such, the proximal end 248 of the extension member 240 is located towards the proximal end 102 of the linear actuator 26 while the distal end 254 of the extension member 240 is located at the distal end 100 of the linear actuator 26.

Referring again to FIGS. 16, 20 the travel member 245 is positioned at one end of the extension member 240. The extension member 240 is coupled (in this example case via a mounted kicker spring 266) to the support frame 10 (see FIG. 1) at the distal end 100. Complimentary, the extension member 240 is coupled to the support frame 10 or the support post 14 at the proximal end 102 of the liner actuator 26. As such, as the extension member 240 is displaced along the longitudinal axis 241, the attached travel member 245 is displaced along the lead screw 140. As such, as the panel 12 is moved between the extended and retracted positions (see FIG. 6), the position of the travel member 245 along the lead screw 140 varies, thereby providing for reciprocation of the travel member 245 along the longitudinal axis 241 of the lead screw 140.

Figure 17:
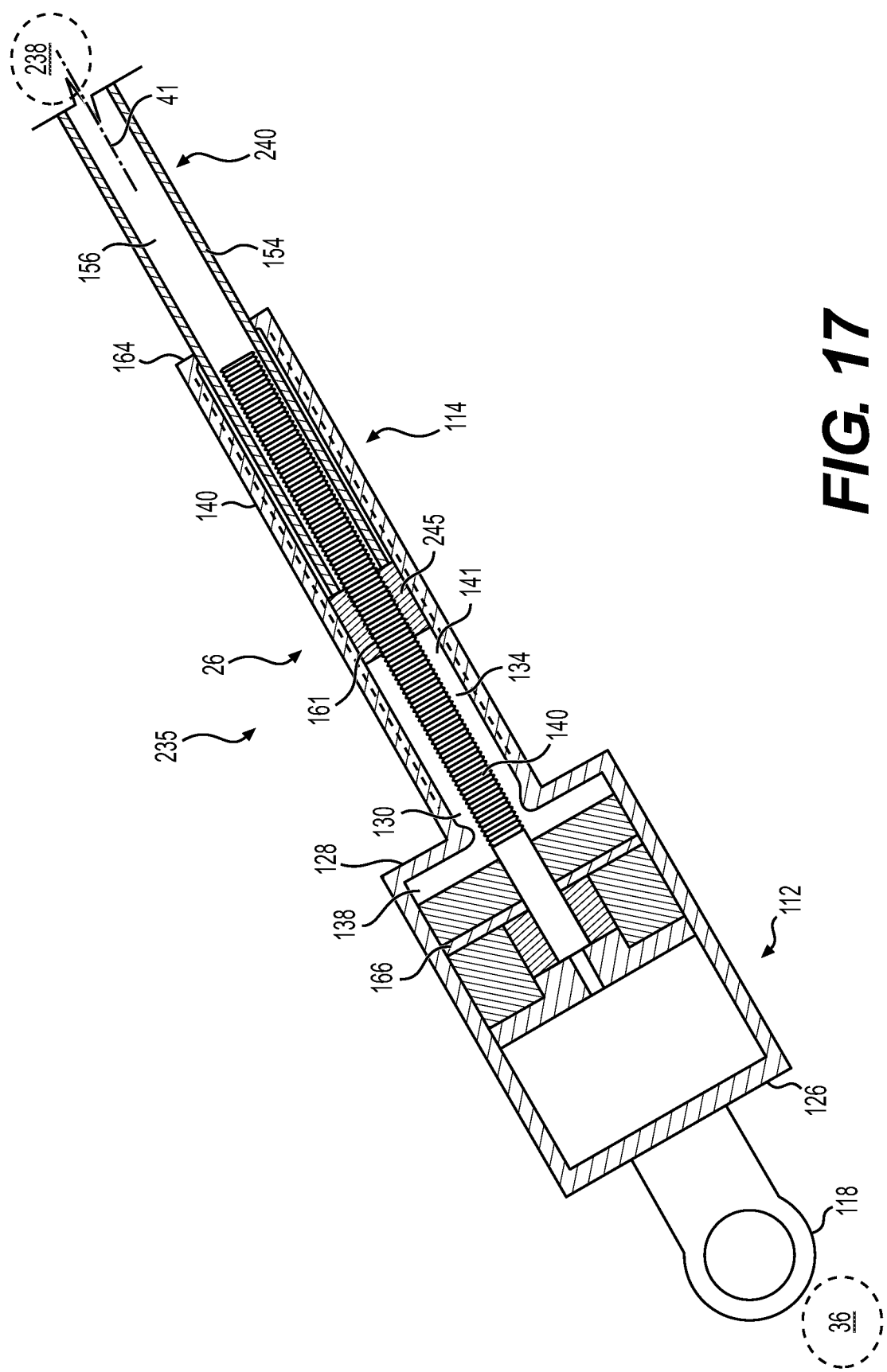
Figure 17A:
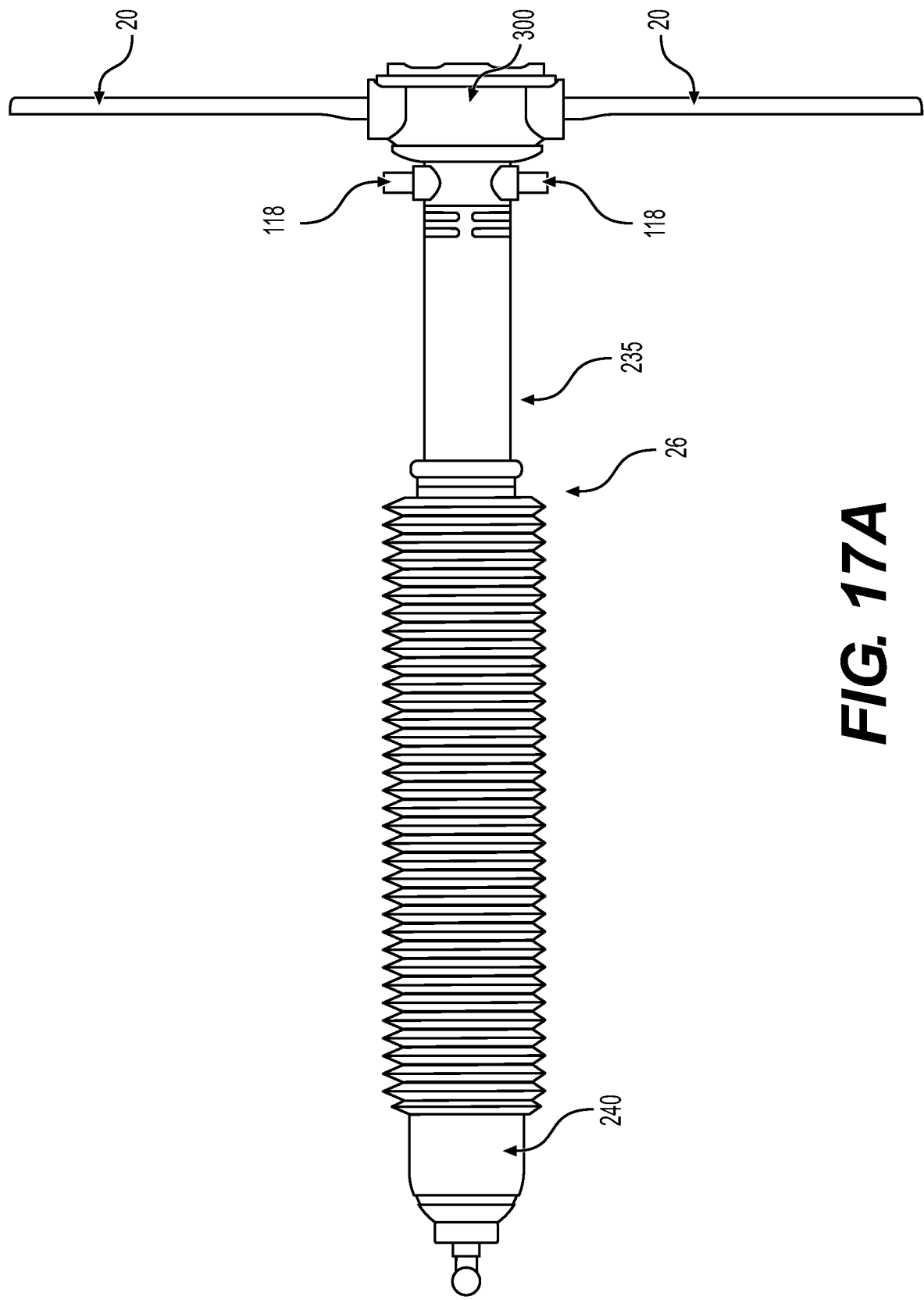
FIG. 17A shows an example linear drive unit configuration for the linear drive unit of FIG. 1, in accordance with an illustrative embodiment.
Figure 17B:
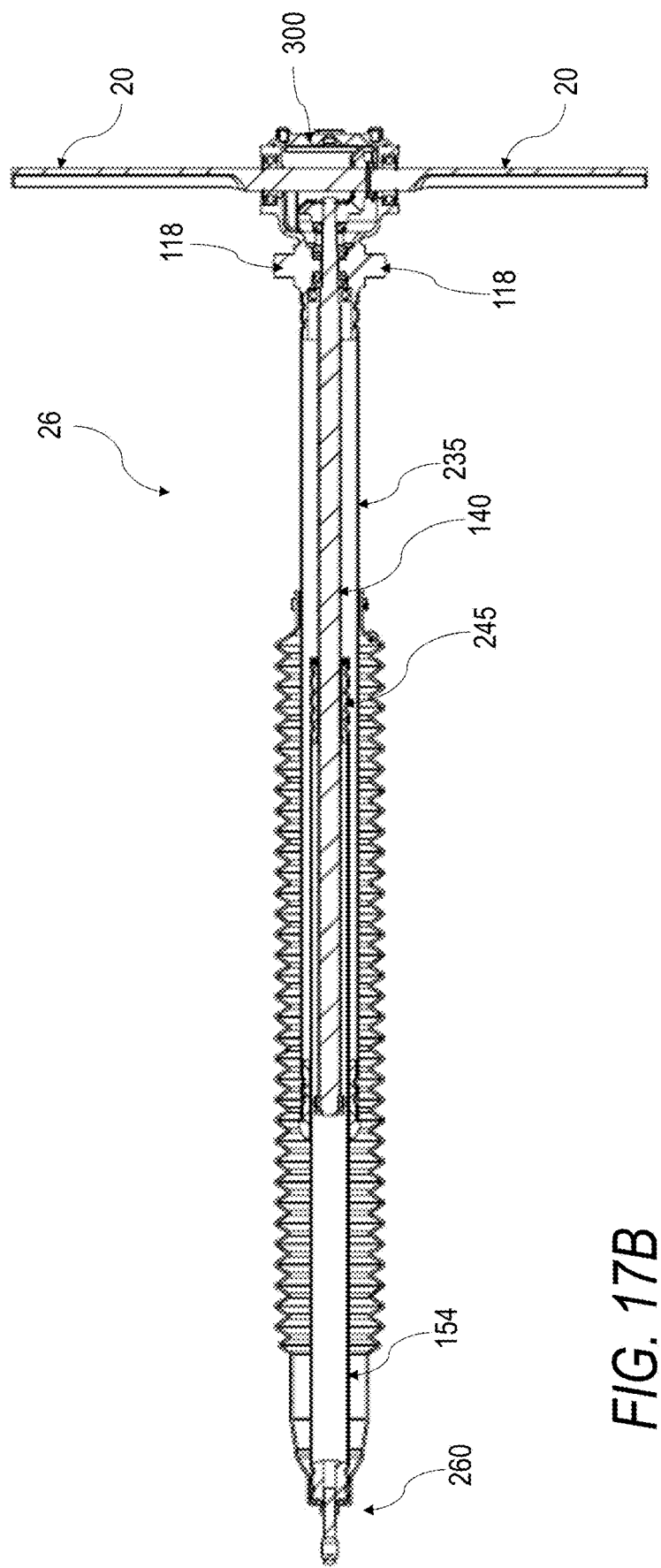
FIG. 17B shows a cross-sectional view of the linear drive unit configuration of FIG. 17A.
Figure 18B:
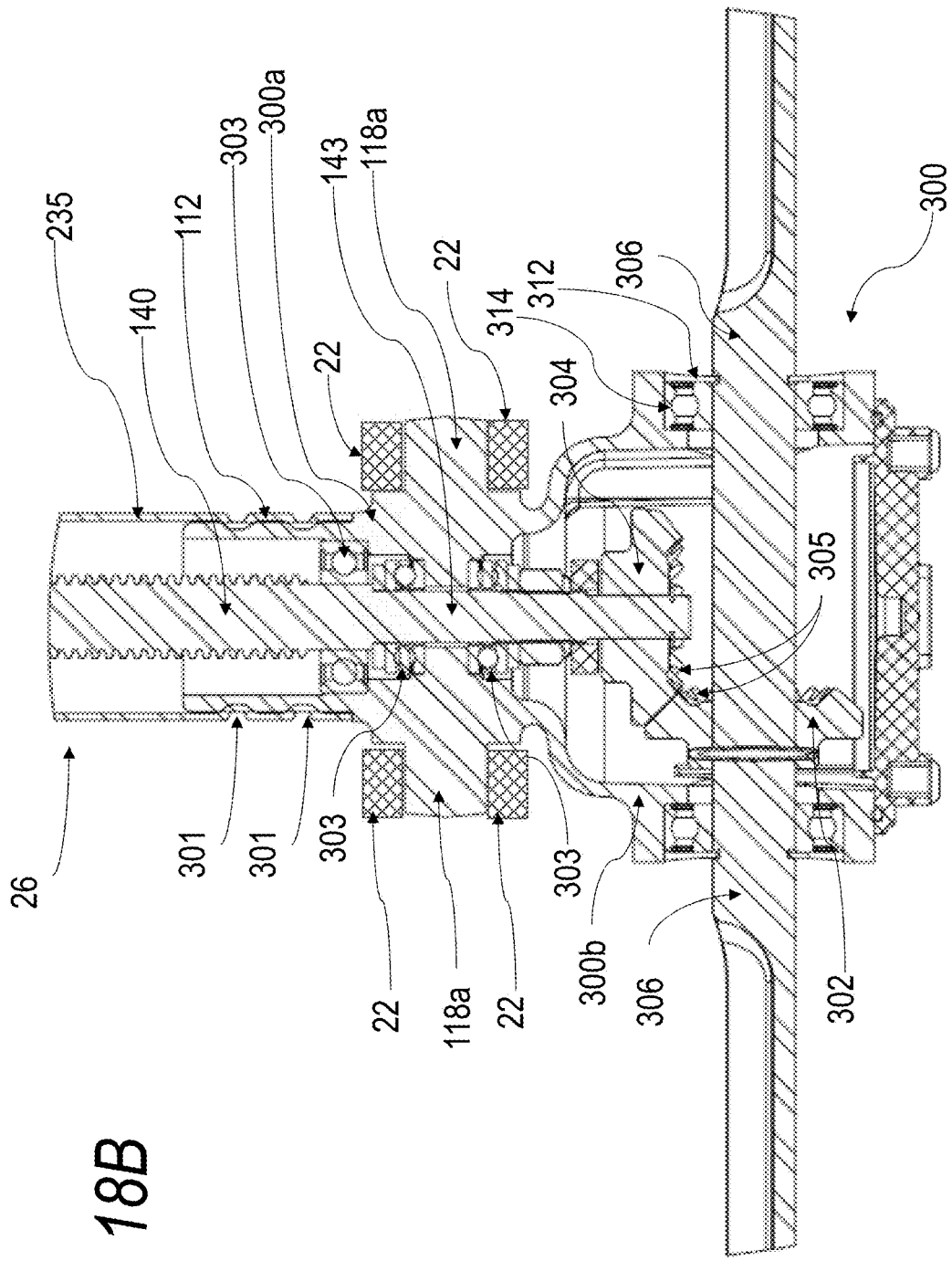
FIG. 18B shows an enlarged cross sectional view of the linear drive unit and drive shaft of the system of FIG. 18, in accordance with an illustrative embodiment.

Referring now to FIG. 17, an embodiment of the linear actuator 26 is shown including the housing 235 having a lower housing 112 and an upper housing 114 for containing the extension member 240 (e.g. extensible shaft/rod). Pivot mount 118 is attached to an end wall 126 of lower housing 112 proximal to the support post 14. In accordance with an illustrative embodiment as shown in FIG. 18B, the pivot mount 118 includes two opposed protruding pivot members 118$a$ extending from an upper portion 300$a$ of the housing 300, the pivot members 118$a$ optionally being integrally formed with the housing 300. The upper housing 300$a$ is connected, as an example, to the lower housing 112 of the housing 235 by a crimp connection 301, for example formed by the crimping of the lower housing 112 deformed into receiving indentations formed on the upper housing 300$a$. Upper housing 114 provides a (e.g. cylindrical) sidewall 141 defining a chamber 134 that is open at both ends. A distal end wall 128 of lower housing 112 includes an aperture 130. The lead screw 140 (or referred to as a lead screw 140 or rotary output member powered by rotary motion of the drive unit 24 (e.g. a motor) via the drive shaft 20) which can be used to transport or otherwise guide a travel member 245 (connected to the extension member 240) along the longitudinal axis 241. For example, the travel member 245 contains an internally facing series of threads in bore 161 that are mated to an externally facing series of threads on the lead screw 140, as desired. Extensible member 240 provides a cylindrical sidewall 154 defining a chamber 156 and can be concentrically mounted between upper housing 114 and lead screw 140. As described earlier, pivot mount 238 is attached to the distal end 254 of extensible member 240. The proximal end 248 of extensible member 240 can be open. The travel member 245 (also referred to as the travel member 245) is mounted around the proximal end 248 of extensible member 240 relative to lower housing 112 and is coupled with lead screw 140 in order to convert the rotational movement of lead screw 140 into the linear motion of the extensible member 240 along the longitudinal axis 241 of lead screw 140. The travel member 245 can include splines that extend into opposing coaxial slots provided on the inside of upper housing 114 to inhibit travel member 245 from rotating as the travel member 245 (e.g. a nut) travels along the longitudinal axis 241. Alternatively, the travel member 245 may be configured without the splines and thus be free to rotate as the travel member 245 travels along the longitudinal axis 241, without departing from the scope of the description. An integrally-formed outer lip 164 in upper housing 114 can provide an environmental seal between chamber 134 and the outside.

A spring housing 138 can be provided in lower housing 112 and defined by cylindrical sidewall 122, distal end wall 128, and a flange 166. Within spring housing 138, a power spring (not shown in FIG. 17) similar to the power spring 268 as seen in FIG. 16 can be optionally coiled around lead screw 140, providing a mechanical counterbalance to the weight of the panel 12 support frame 10. One end of power spring 268 is positioned or otherwise attached to the travel member 245 and the other is secured to a portion of cylindrical sidewall 122. When extensible member 240 is in its retracted position, power spring 268 is tightly coiled around lead screw 140 and therefore applies bias against the travel member 245. As lead screw 140 rotates to extend extensible member 240, in concert with travel of the travel member 245 along the upper housing 114, power spring 268 uncoils, releasing its stored energy and transmitting an axial force through extensible member 240. When lead screw 140 (or power screw) rotates to retract extensible member 240, in concert with travel of the travel member 245 along the upper housing 114, power spring 268 recharges by recoiling around lead screw 140.

Also shown in FIG. 17 are the mating threads between those of the travel member 245 and those of the lead screw 140. As such, it is recognized that thread profile (e.g. thread angle and/or helix angle) can be designed in order to provide for a selected amount (e.g. predefined) of friction between the mating threads in order to result in a locking feature of the linear actuator 26 once extended or retracted (i.e. the magnitude of friction force between the mating threads—due to weight of the support frame 10 and panel 12 supported by the linear actuator 26 between pivots 28,118—can be used to maintain the position of the support frame 10 about the pivot 18). For example, decreasing the thread angle will result in an increase in the friction force between the mating threads. For example, increasing the thread angle will result in a decrease in the friction force between the mating threads. For example, decreasing the helix angle will result in an increase in the friction force between the mating threads. For example, increasing the helix angle will result in a decrease in the friction force between the mating threads. Various locked positions of the support frame 10 can be seen in FIGS. 22a,b,c. It is also recognized that locking of the support frame 10 position about pivot 18 can be done by a locking mechanism (e.g. pin) provided between the gears 302,304 in the housing 300 (or gearbox) (see FIG. 21). Further, locking can be provided by maintaining the drive unit 24,25 in a selected rotational position, such that inhibiting rotating of the drive shaft 20 by the drive unit 24,25 would also result in holding the pivot position of the support frame 10 about the pivot 18. Further locking can be provided by providing a locking thread angle, for example 8 inches per inch resulting in a non-back driveable lead screw and travel member (nut) configuration that will not result in rotation of the lead screw 140 due to a linear force by the travel member 245 acting on the lead screw 140. As such, the linear actuator 26 via mating threads can hold the support frame 10 and support post 14 in fixed relation to one another (locked) when the linear actuator 26 is not being driven (i.e. extended or retracted).

As discussed above, it is recognized the drive shaft 20 rotation is converted into rotation of the linear actuator 26 to cause extension or retraction of the linear actuator 26. The linear actuator 26 operates by rotation of the lead screw 140 within a housing (nut) (e.g. travel member 245) that is prevented from rotating as it is connected to the housing 235, or alternatively rotation of the housing (nut) (e.g. travel member 245) about the lead screw 140 that is prevented from rotating as it is connected to the housing 235. The drive shaft 20 is rotating about its drive axis 32, while the lead screw 140 (or travel member 245) rotates about its own axis (e.g. of the linear actuator 26 itself extending between the pivots 28, 118) which can be transverse to one another (e.g. perpendicular).

Figure 18C:
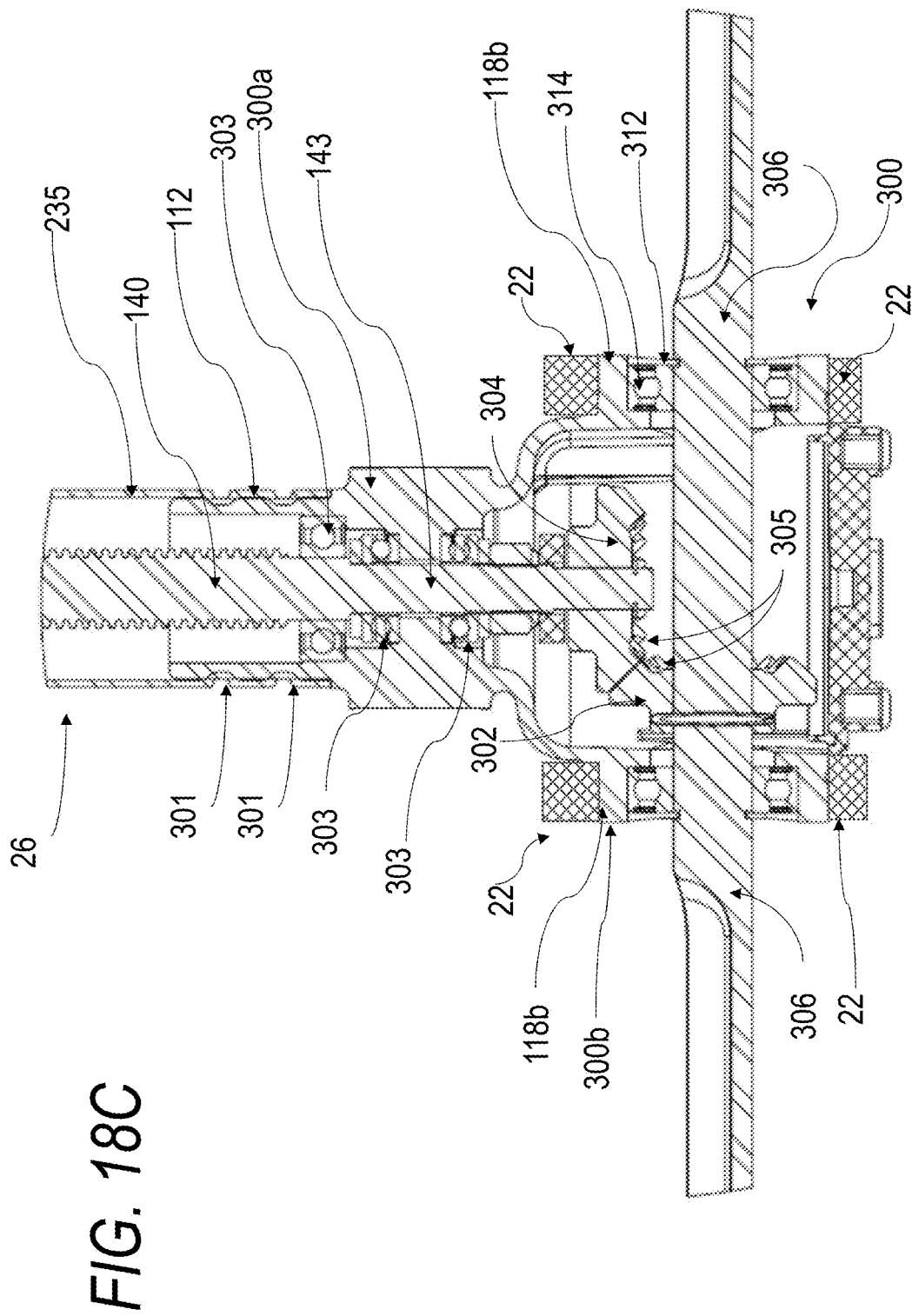
FIG. 18C shows an enlarged cross sectional view of the linear drive unit and drive shaft of the system of FIG. 18, in accordance with an illustrative embodiment.
Figure 21:
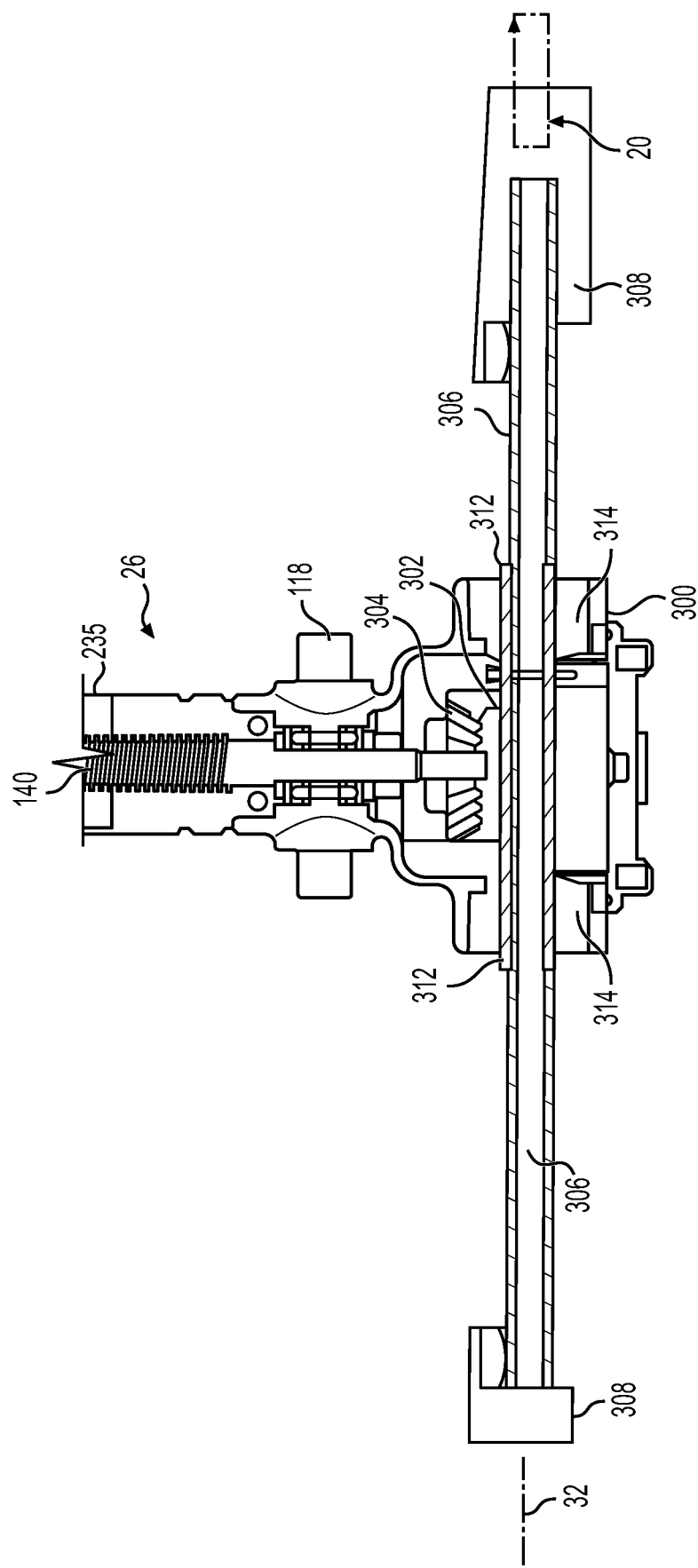
FIG. 21 shows a cross sectional view of a gearbox of FIG. 18.

Referring to FIGS. 18, 19, 21 shown is housing 300 (or gearbox) having one gear 302 coupled to the drive shaft 20 for co-rotation with the drive shaft 20 and a second gear 304 meshed (via teeth 305) with the first gear 302, such that co-rotation of the gears 302,304 is provided as the drive shaft 20 is rotated 310 by the drive unit 24 (see FIG. 1). Second gear 304 is connected to one end of the lead screw 140, such that rotation of the second gear 304 results in co-rotation of the lead screw 140. As shown in FIG. 18B, a tapered lead screw end 143 of lead screw 140 may be received within an aperture formed in the second gear 304, the aperture of the gear 304 and the tapered lead screw end 143 having mating locking features to ensure the gear 304 and the tapered lead screw end 143 do not rotate relative to one another. For example splines formed on the lead screw end 143 that extend into opposing coaxial slots provided on the inside walls of the aperture of the second gear 304 may provide such an anti-rotation function. Other types of anti-rotation connections may be provided, such as matching non-circular cross-sections, such as a D shaped aperture for receiving a D shaped tapered lead screw end 143. As another example the lead screw end 143 and the gear 304 may be welded together to formed a permanent connection. Tapered lead screw end 143 is illustratively rotatably supported within the upper housing 300a by ball bearings 303. The housing 300 (or gearbox) can have intermediate shafts 306, such that the first gear 302 is connected to the intermediate shaft 306 and the intermediate shaft 306 is coupled via coupling 308 to the drive shaft 20, in order to accommodate for any misalignment 52 (see FIGS. 14,15). The shafts 306, 20 can be positioned through apertures 312 of the housing 300 (or gearbox) and facilitated in rotation by bearings 314. In the present embodiments shown in FIGS. 18, 19, 20, 21, the apertures 312 are aligned with the drive axis 32 of the drive shaft 20, such that the drive axis 32 is spaced apart from the pivot 118 of the linear actuator 26. As shown in FIGS. 18, 20, 21, the lead screw 140 is transverse (e.g. at 90 degrees) to the drive axis 32.

Figure 23D:
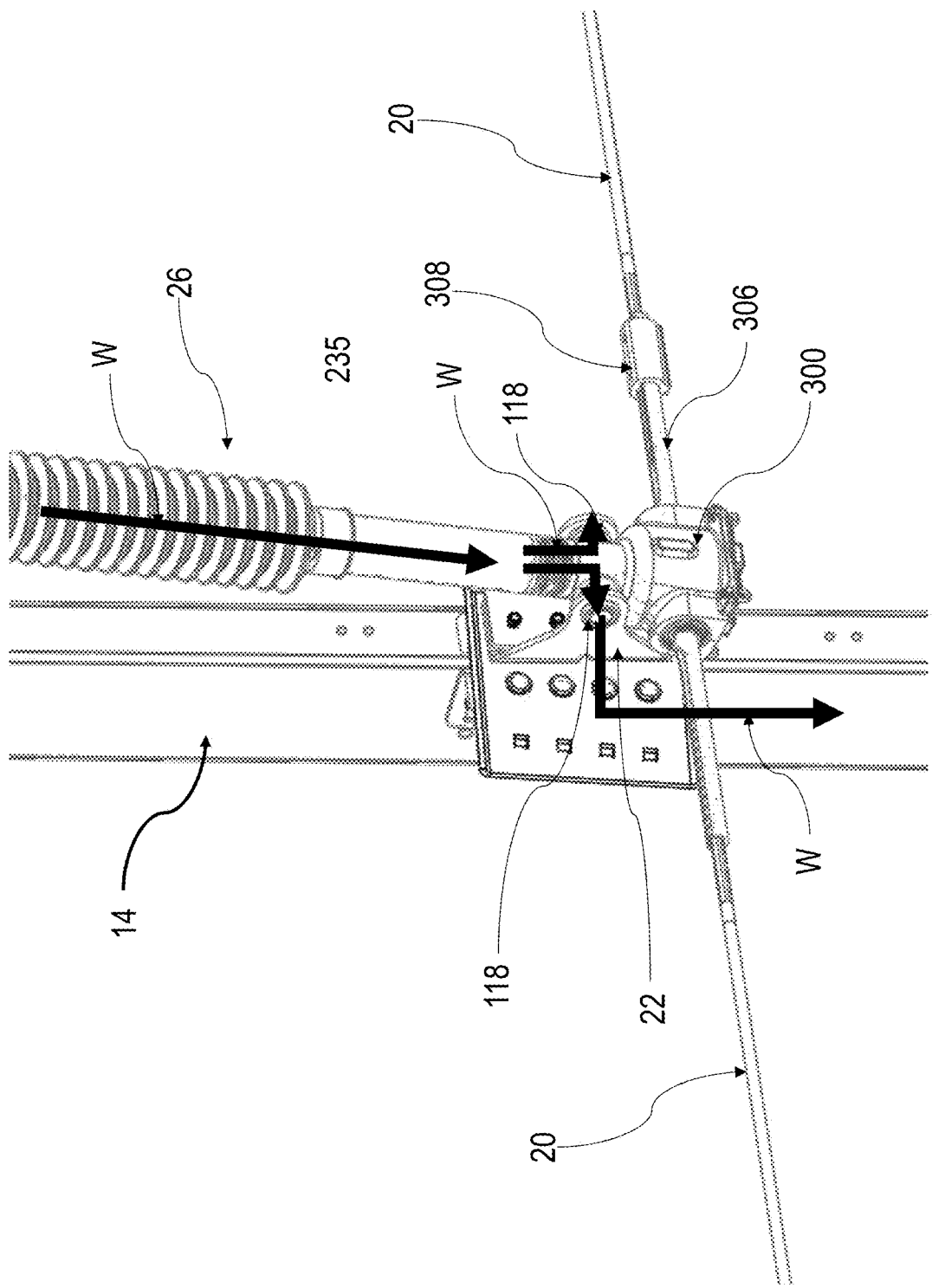
Figure 23E:
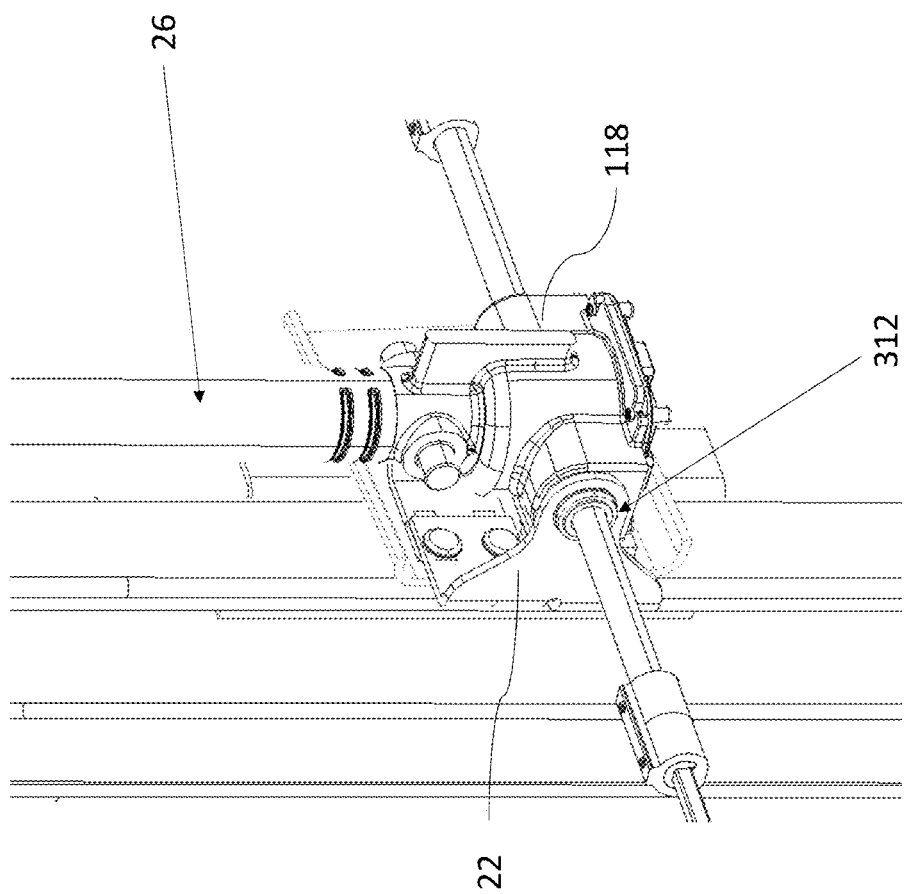
Figure 23F:
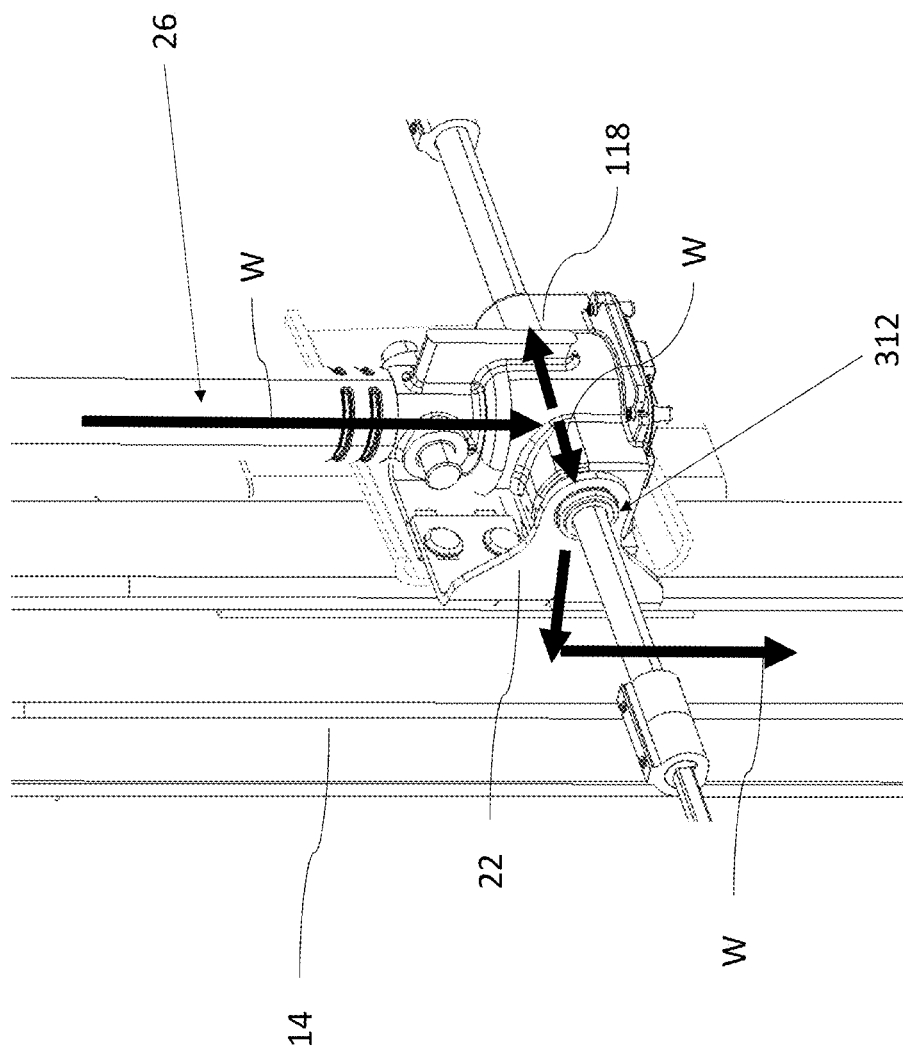

Referring to FIGS. 23a,b, shown are various embodiments of the support bracket 22. FIG. 23a has the pivot 118 of the linear actuator 26 supported by the support bracket 22 and thus spaced apart from apertures 312 holding the drive shaft 20. As such, the actuator mounting axis (i.e. pivot 118) is not concentric with the drive axis 32. For example pivot 118 may be formed as a projecting pivots 118a extending from the upper housing 300a of housing 300. In FIGS. 23a, and 23c, as well as FIG. 18b the pivot 118 is spaced part and therefore adjacent to the drive axis 32, such that the pivot 118 is between the extension member 240 (see FIG. 20) and the housing 300 (or gearbox). Alternatively, it is recognized that the pivot 118 can be spaced part but not adjacent to the drive axis 32, such that the housing 300 (or gearbox) is between the extension member 240 (see FIG. 20) and the pivot 118. Alternatively, as shown in FIGS. 23b and 23f, as well as 18c, the pivot 118 of the linear actuator 26 can be aligned with the apertures 312, such that the pivot 118 is in alignment with the drive axis 32. As such, the actuator mounting axis (i.e. pivot 118) is concentric with the drive axis 32. For example pivot 118 may be formed as a projecting pivot 118b extending from the lower housing 300b of housing 300.

In the embodiments wherein the pivot 118 is spaced apart from the drive axis 32, these embodiments can be advantageous as the weight of the support frame 10 and panel 12 (see FIG. 1) are supported by the support bracket 22 connected to the support post 14. Transference of the weight W of the support frame 10 and panel 12 to the pivots 118 through the housing 235 and onto the support post(s) 14, and thus off of the drive shaft 20, as illustrated in FIG. 23d,f can provide for the benefit of bending stiffness, strength, and/or weight reduction of the drive shaft 20 itself, as the drive shaft 20 does not need to support any weight of the drive system 8 other than the drive shaft 20 itself, for example. The weight of the interface mechanism (e.g. gears 302,304) for torque transmission provided in the lower housing 300b of housing 300 are also supported by the pivots 118 and onto the support post(s) 14.

As discussed above, it is recognized that the linear actuators 26 are pivotally connected and supported at one end to the support posts 14 at pivot 18 and at the other end to the support frame 10 at pivot 28, such that extension and contraction of the linear actuator 26 (via travel of the travel member 245 along the lead screw 140—see FIG. 17) causes the support frame 10 to pivot about the post pivot connection 18. The support post 14 also supports the drive shaft 20 (e.g. through the post/actuator pivot 118 such that the linear actuator 26 and the drive shaft 20 can swing/pivot together about the pivot/actuator pivot 118 as the linear actuator 26 extends and contracts—see FIG. 23a) while allowing the drive shaft 20 to be rotated (presumably on a bearing or the like). Having the support post 14 act as the support mechanism for the drive shaft 20 can be advantageous as the drive shaft 20 only has to be designed structurally to support its own weight and transmit rotary force. As a result the drive shaft 20 flexibility/bendability can be improved therefore allowing the shaft 20 to follow changes in grading between the supports 14, as illustrated in FIG. 14, as well as the strength and weight can be reduced resulting in costs savings.

Referring to FIGS. 15 and 25, the panel support and drive system 8 can have a plurality of individual panels 12, with associated support tables 10, having individual sections of drive shaft 20 serially coupled to one another by couplings 60 (one example being coupling 308—see FIG. 18). As such, operation (i.e. rotation 50 about pivot 18—see FIG. 6) of the multiple support tables 10 are linked together by the coupled drive shafts 20, in order to form a row 400 of panels 12 driven by the common (or shared) system drive unit 24. As shown by example, the drive unit 24 can be supported by support members 402 connected to adjacent support posts 14.

As discussed above, within a support table 10 (supporting the respective panel 12), the drive shaft 20 is used to mechanically drive (i.e. induce the rotation 50—see FIG. 6) a pair of linear actuators 26 at the same time in the same rotational direction about pivot 18 (see FIG. 6). Further, another drive shaft 20 of adjacent support tables 10 are used to mechanically link one adjacent support table 10 to the next so that all of the support tables 10 connected to one another (via the coupled drive shafts 20) rotate 50 at the same time in the same direction.

It is recognized that the drive shafts 20 of the row 400 can be driven by a common or shared drive unit 24, which can be positioned anywhere along the length of the drive shafts 20 (i.e. as desired along the longitudinal drive axis 32—see FIG. 2). The drive unit 24 is used by the panel support and drive system 8 to provide torque to the drive shaft(s) 20, which in turn drives the linear actuators 26, which in turn rotates 50 the support table(s) 10 and the supported panel(s) 12. It is recognized that the drive unit 24 can be used to provide the torque at anywhere along the length of the longitudinal drive axis 32, for example as determined during configuration of the panel support and drive system 8 for a specific site installation.

Figure 26:
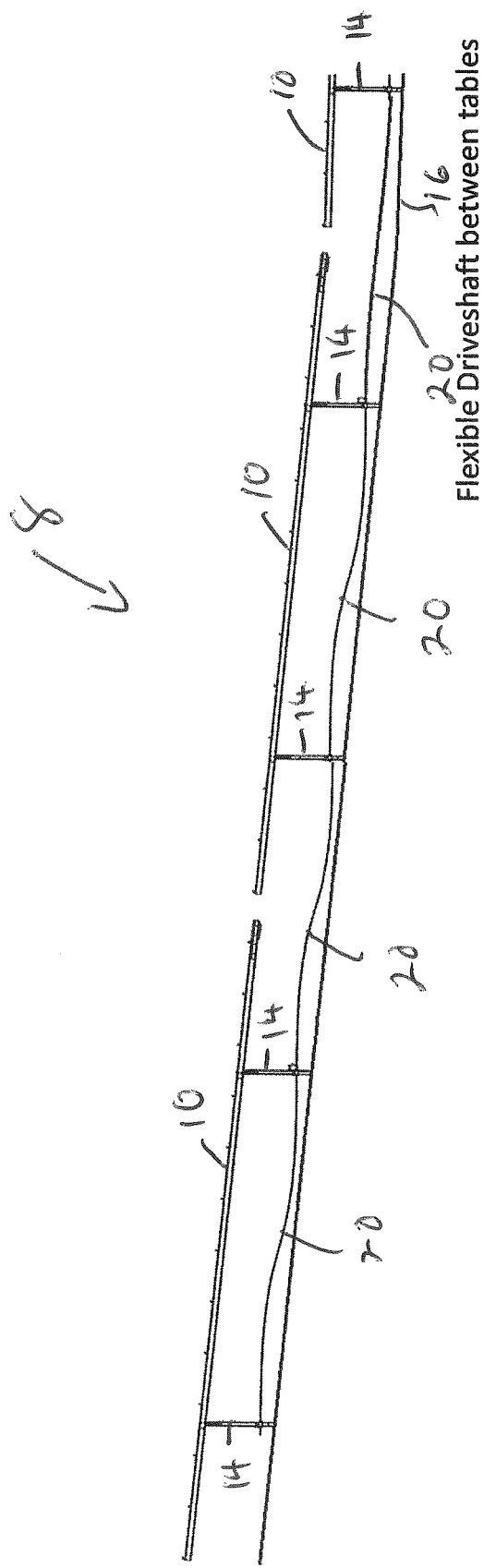
FIG. 26 is a still further embodiment of the system of FIG. 15.

Referring to FIG. 26, shown is an embodiment of the panel support and drive system 8 having one or more flexible drive shafts 20 coupled to one another (e.g. via couplings 60 as shown in FIG. 15). For example, the drive shaft 20 is sized such that it is strong enough to transmit the torque but still flexible enough to allow for variations in installation tolerances and grade following (e.g. adjacent support post 14 which are installed in the supporting surface 16 at different elevations to one another). The ends of the drive shaft 20 are rigidly held to the linear actuator 26 (for example rigidly connected to shaft 306 (see FIG. 18). Further, a cross section (shape and area) of the flexible drive shaft 20 is sized such that it is able to transmit the required torque for the entire row 400 but still remain flexible enough to accommodate variations in grade between support tables 10 or due to misalignment caused by installation (e.g. positional and/or twist). An example of misalignment is indicated by reference numeral 52 in FIG. 15.

Figure 27:
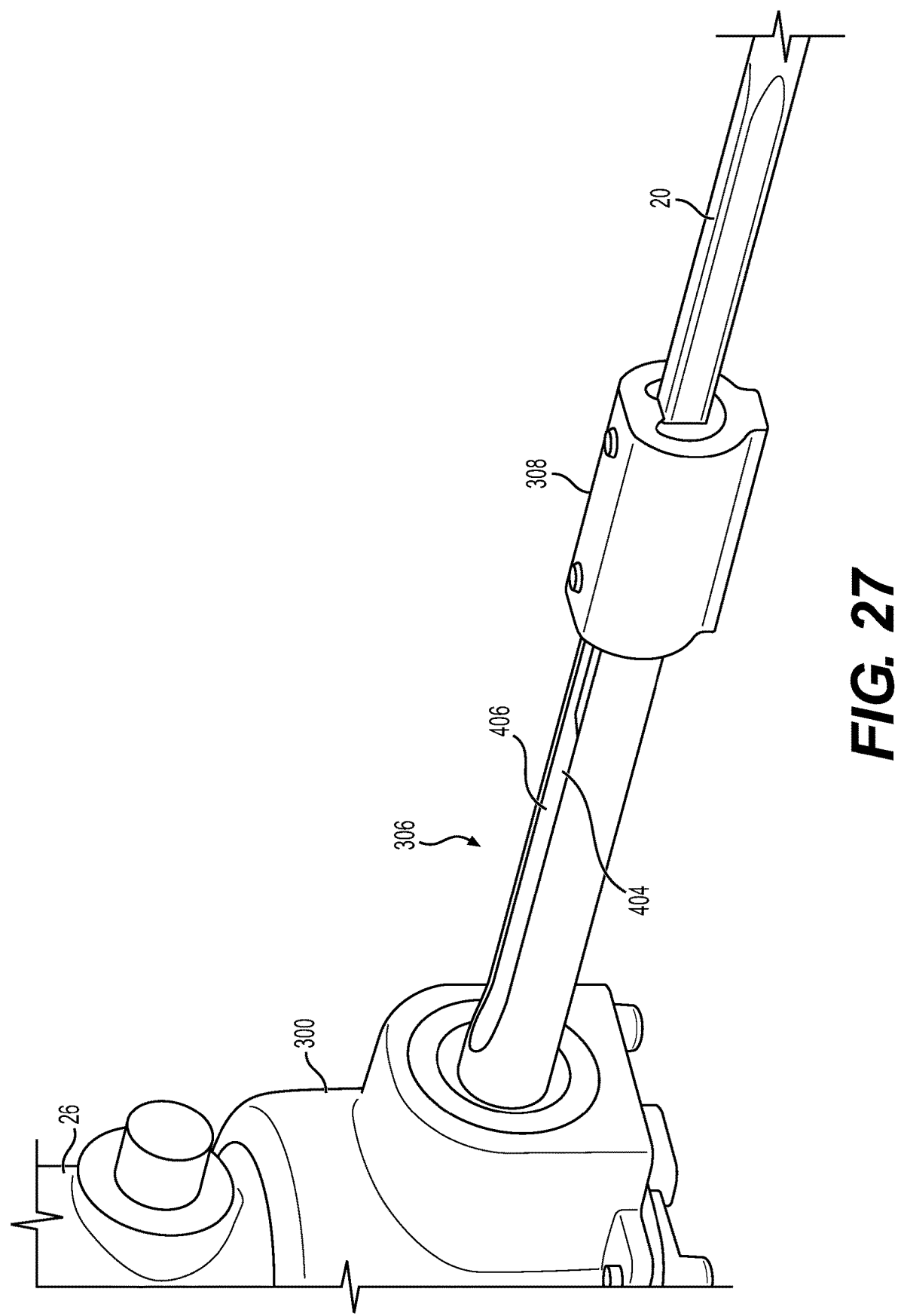
FIG. 27 is a further embodiment of the coupling of FIG. 15.

Referring to FIGS. 19, 27 and 28, a flexible drive shaft 20 with rigid connection via coupling 308 (e.g. a clamp) is shown. In this design the connection between the drive shaft 20 and intermediate shaft 306 (e.g. shaft connected to gears 302,304) is rigid. The drive shaft 20 mates to the intermediate shaft 306 (coupled to the linear actuator 26) and is clamped in place (e.g. Zero Degrees of Freedom). Prior to clamping, the drive shaft 20 is able to slide along its axis relative to the intermediate shaft 306 (e.g. via utilizing gap 406) to accommodate any variations in the distance between adjacent linear actuators 26 within a support table 10 or row 400. Once in place, the drive shaft 20 and intermediate shaft 306 are clamped together using the coupling 308. For example, one end of the drive shaft 20 can be received within a groove 404 (or recess) of the intermediate shaft 306, such that a cross sectional shape (e.g. square) of the drive shaft 20 matches a cross sectional shape of the groove 404 so as to enable coupling of rotational movement between the drive shaft 20 to the intermediate shaft 306. It is recognized that there can be alternate ways to rigidly mate the drive shaft 20 to the intermediate shaft 306, for example using a spline, a D-shape, etc, such that mating of the shafts 20,306 is sufficient to transmit toque between adjacent shafts 20.

Referring to FIG. 29, another example embodiment of the flexible drive shaft 20 with rigid coupling 60 is shown, such that the coupling 60 is a sliding connection 60. As such, the ends of the flexible drive shaft 20 and of intermediate shaft 306 are allowed to translate T (e.g. 1 degree of freedom) with respect to each other during operation (i.e. rotation 50—see FIG. 6) of the panel support and drive system 8 induced by the rotation 310 of the drive shaft 20. The cross section of the flexible drive shaft 20 (e.g. shape and area) can be sized such that it is able to transmit the required torque for the entire row 400 but still remain flexible enough to accommodate variations in grade between support tables 10 or due to misalignment caused by installation. The drive shaft 20 to intermediate shaft 306 connection via coupling 60 is such that the drive shaft 20 is able to slide along its axis (i.e. longitudinal drive axis 32—see FIG. 2) relative to the intermediate shaft 306 (which is connected to the support post 14 via the housing 300 (i.e. gear box). It is recognized that the sliding connection (i.e. coupling 60) could be rigidly connected to either the intermediate shaft 306 or drive shaft 20, as desired. It is recognized that a length of the sliding connection (i.e. coupling 60) can be oversized so that if the coupling 60 translates 'left' L or 'right' R during the rotation 50, the flexible drive shaft 20 would not disengage from the adjacent intermediate shaft(s) 306. FIGS. 30*a* and 30*b* show an example of the coupling 60 as a tube 60 sized to have the intermediate shaft 306 and/or the drive shaft 20 received within the tube interior 408, with a subsequent crimping of the tube 60 to effect a clamping of the tube 60 to an exterior surface 410 of the shafts 20,306 as shown in FIG. 30*b*. In this example, the exterior surface 410 has present D cuts to facilitate torque transfer between the shafts 20,306 and the tube 60 during the rotation 50.

Figure 31:
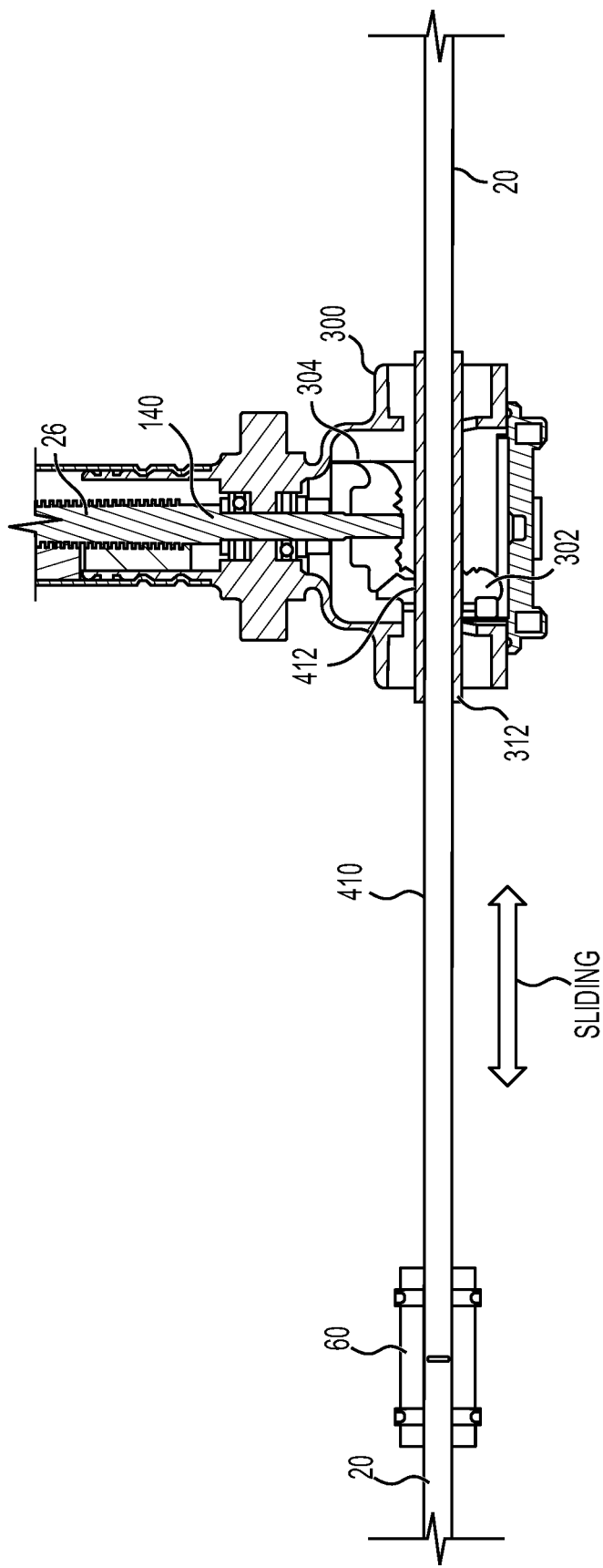
FIG. 31 is a still further embodiment of the coupling of FIG. 15.

Referring to FIG. 31, shown is another example embodiment of the flexible drive shaft 20 with rigid coupling 60, such that the flexible drive shaft 20 is configured to slide through the housing 300 (e.g. gear box coupling the drive shaft 20 to the linear actuator 26). The drive shaft 20 is sized such that it is strong enough to transmit the torque but still flexible enough to allow for installation tolerances and grade following. The drive shaft 20 is inserted in the aperture 312 (e.g. through the rotational drive axis 32—see FIG. 2) of the housing 300, such that the interface (e.g. gears 302,304—see FIG. 18) between the drive shaft 20 and the linear actuator 26 provides for the transmission of torque from the flexible drive shaft 20 to the linear actuator shaft (e.g. lead screw 140—see FIG. 20) but also provides an ability for the flexible drive shaft 20 to translate through the housing 300 (1 degree of freedom with respect to the housing 300) and therefore the leadscrew 140 as well. It is recognized that the cross section of the flexible drive shaft 20 (e.g. shape and area) can be sized such that it is able to transmit the required torque for the entire row 400 but still remain flexible enough to accommodate variations in grade between adjacent support tables 10 or due to misalignment caused by installation. As such, this embodiment has the coupling between the drive shaft 20 and the housing 300 (and the lead screw 140) having one degree of freedom. The drive shaft 20 to actuator shaft (i.e. lead screw 140) is such that the drive shaft 20 is able to slide along its longitudinal drive axis 32 (see FIG. 2) through the housing 300 via aperture(s) 312. For example, the drive shaft 20 is sized such that its exterior surface 410 profile interfaces with an interior surface 412 of an interface mechanism (e.g. gears 302,304) for torque transmission. Example surface profiles for mating the exterior surface 410 of the drive shaft 20 with the surface 412 of the drive mechanism (e.g. gears 302,304) in the housing 300 can be mating profiles such as but not limited to: Square, D, Spline, etc. Irrespective of the mating profile design, once mated, the drive shaft 20 remains able to slide along its longitudinal drive axis 32 with respect to the housing 300. Also shown is a coupling 60 between adjacent drive shafts 20, such that neighboring flexible drive shafts 20 can be linked together using a rigid coupler 60 to provide zero degrees of freedom between neighboring flexible drive shafts 20.

In view of the above embodiments, it is recognized that each section of the flexible drive shaft 20 could be a long continuous length that links multiple (i.e. more than two) linear actuators 26 together (e.g. 40 ft) or a shorter length linking just a pair of linear actuators 26 together (e.g. 20 ft).

Figure 35A:
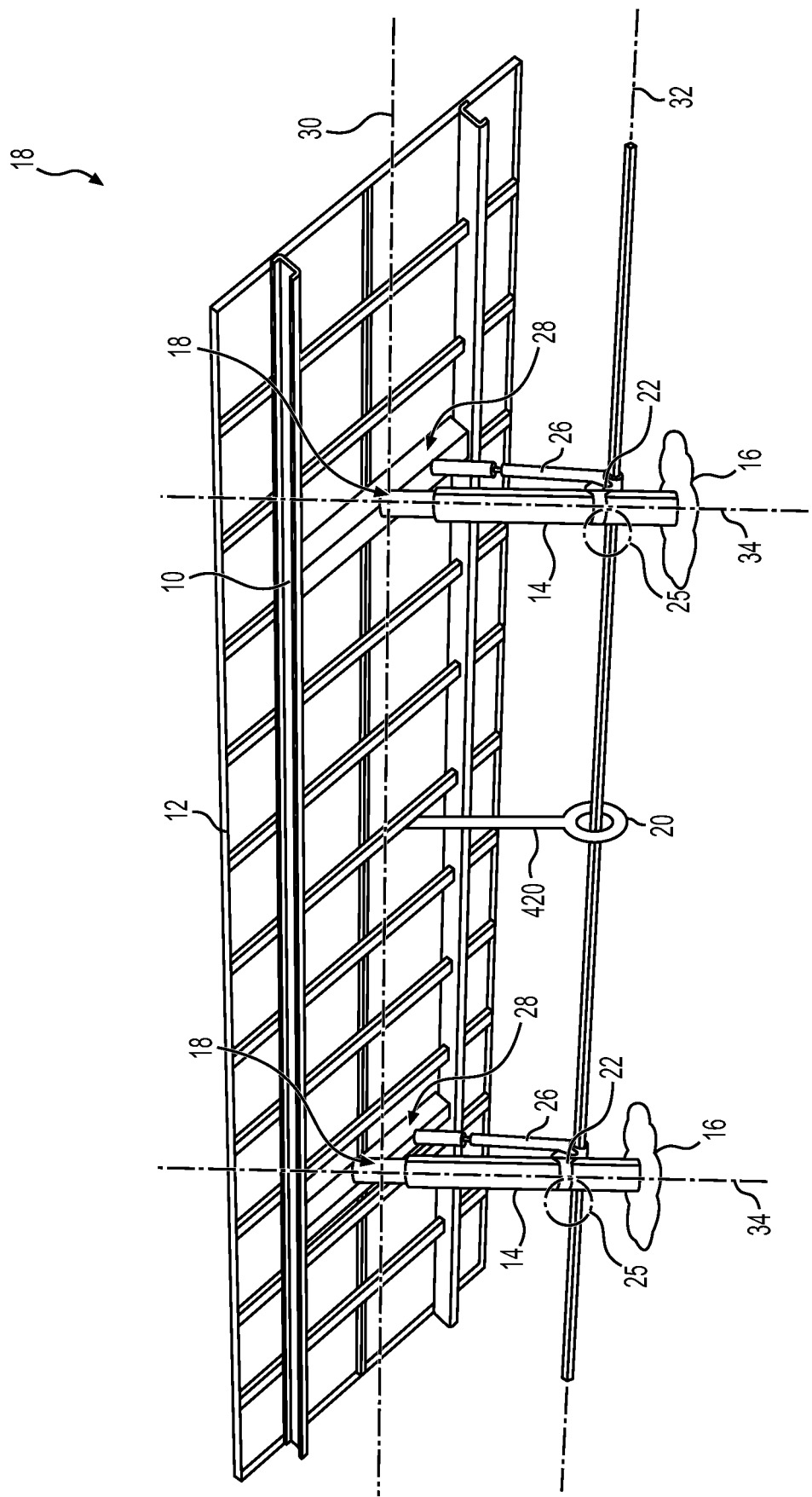
FIGS. 35a and 35b show examples of a driveshaft support structure for the system of FIG. 26.
Figure 35B:
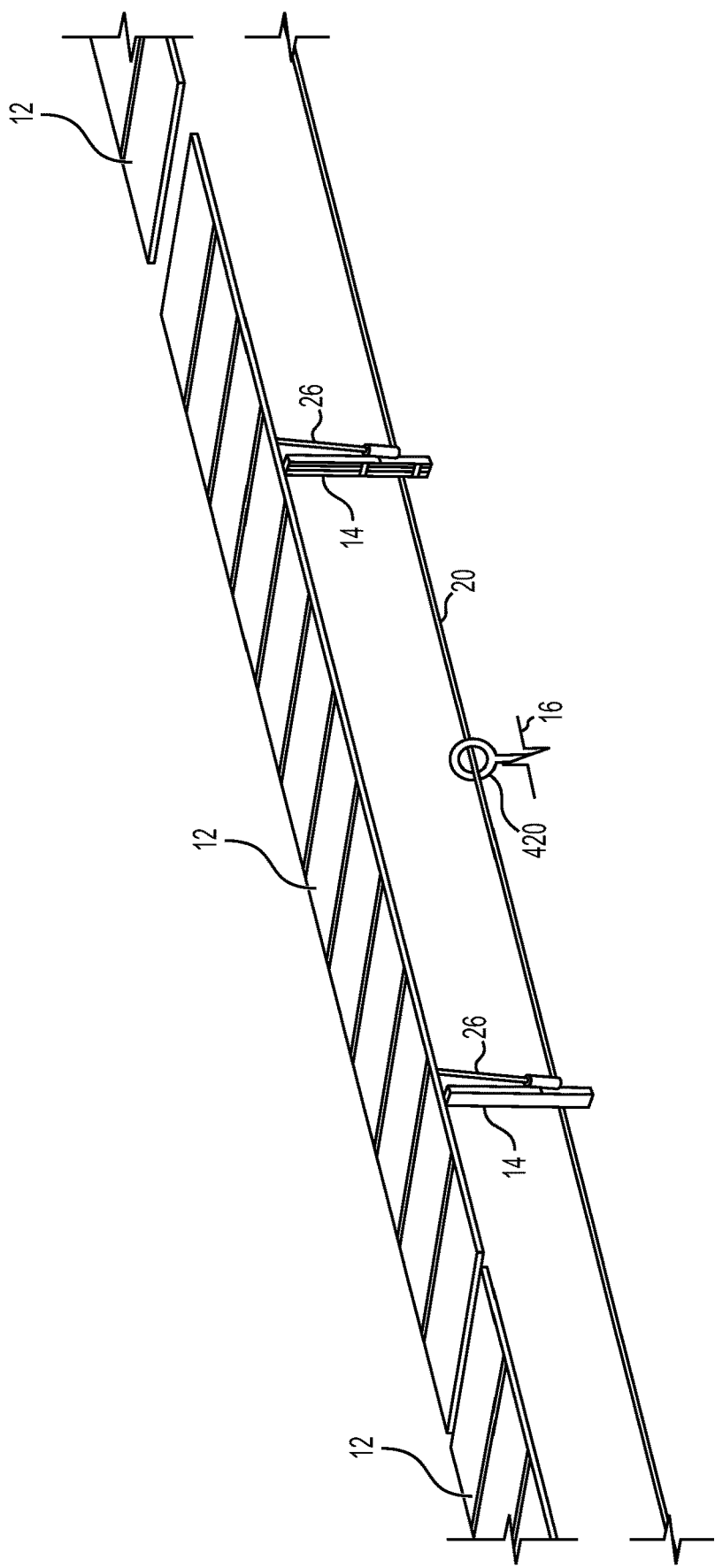

Referring to FIGS. 35*a*,*b*, shown is an example drive shaft support 420, in order to support longer flexible drive shaft 20 spans between supports 14, in order to inhibit sag, as it is recognized that over long spans between linear actuators 26 within the same row 400 there can be excessive sag of the drive shaft 20. The drive shaft 20 could be supported from any direction (above as per FIG. 35*a* with the drive shaft support 420 connected to the support table 10, and/or below as per FIG. 35*b* with the drive shaft support 420 connected to the adjacent supporting surface 16, etc.) as long as the sag of the drive shaft 20 is inhibited. Examples of the drive shaft support 420 can be such as but not limited to: designed to reduce friction on the drive shaft 20 (e.g. plastic with a low coefficient of friction or as an integrated bearing); and supporting the drive shaft 20 with a cable supported hanger bearing.

Figure 32:
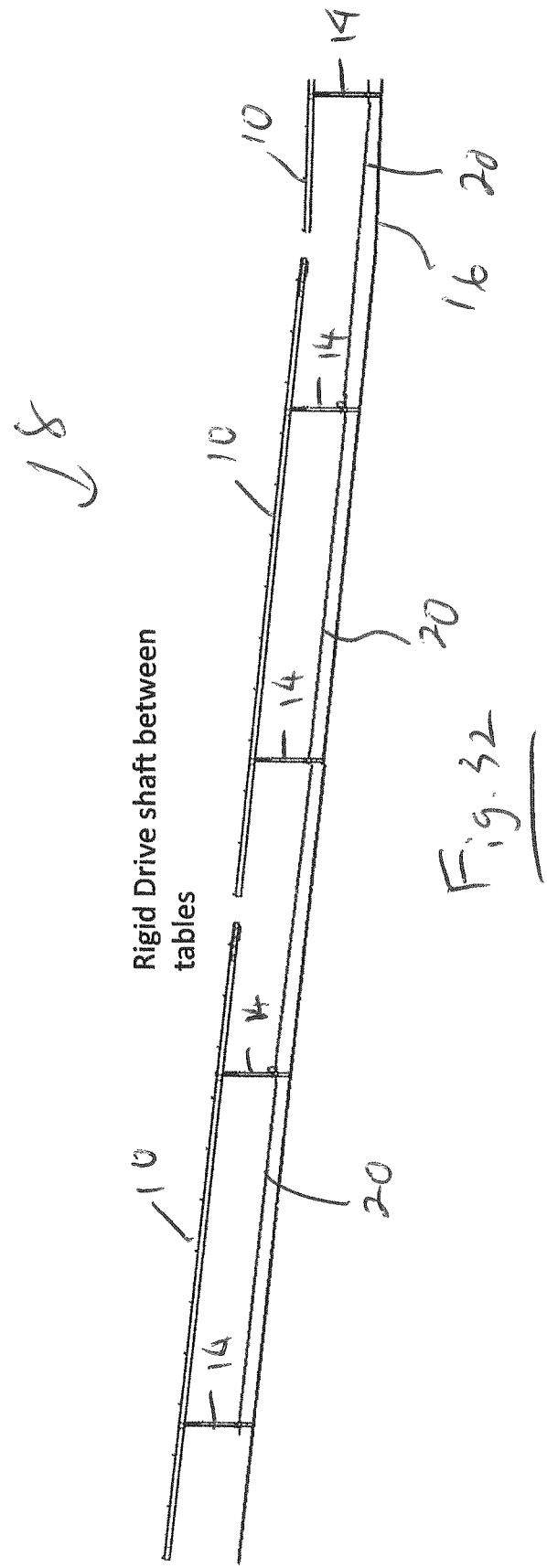
FIG. 32 is a still further embodiment of the system of FIG. 15.
Figure 33:
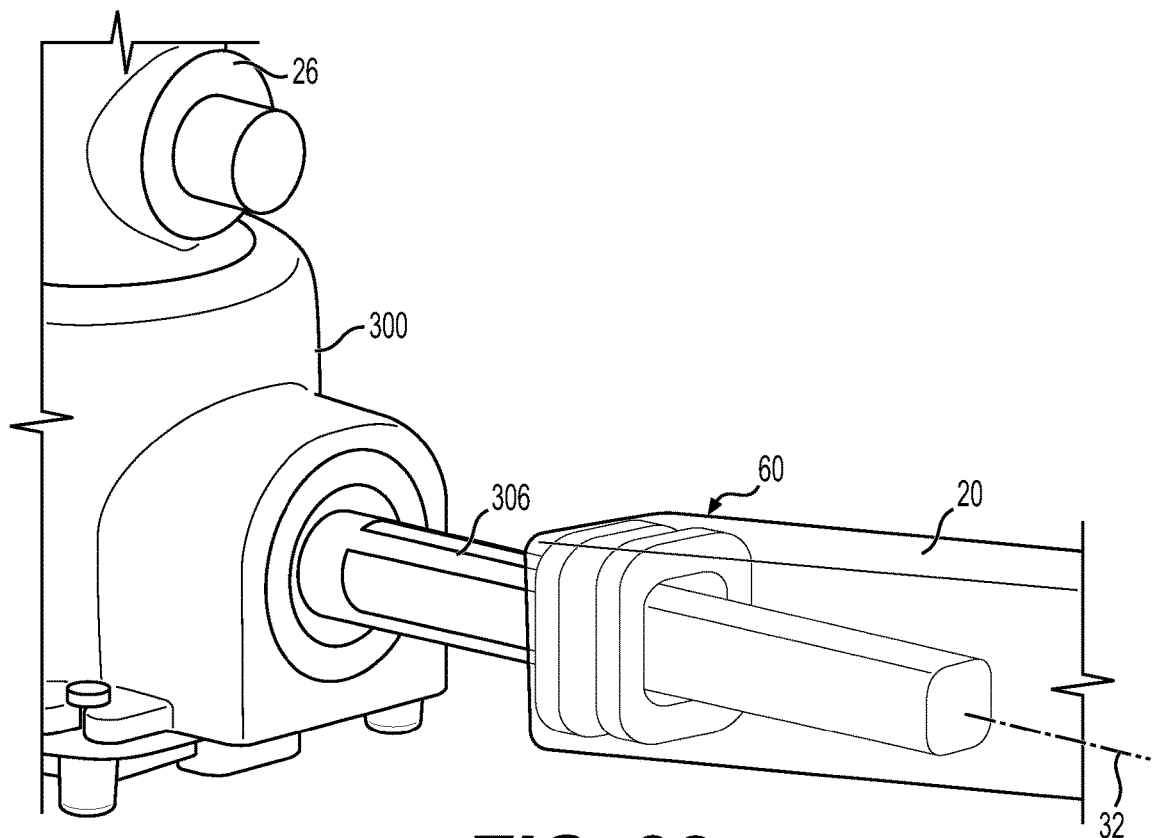
FIG. 33 shows a perspective view of a still further embodiment of the coupling of FIG. 15 for the system of FIG. 32.
Figure 34:
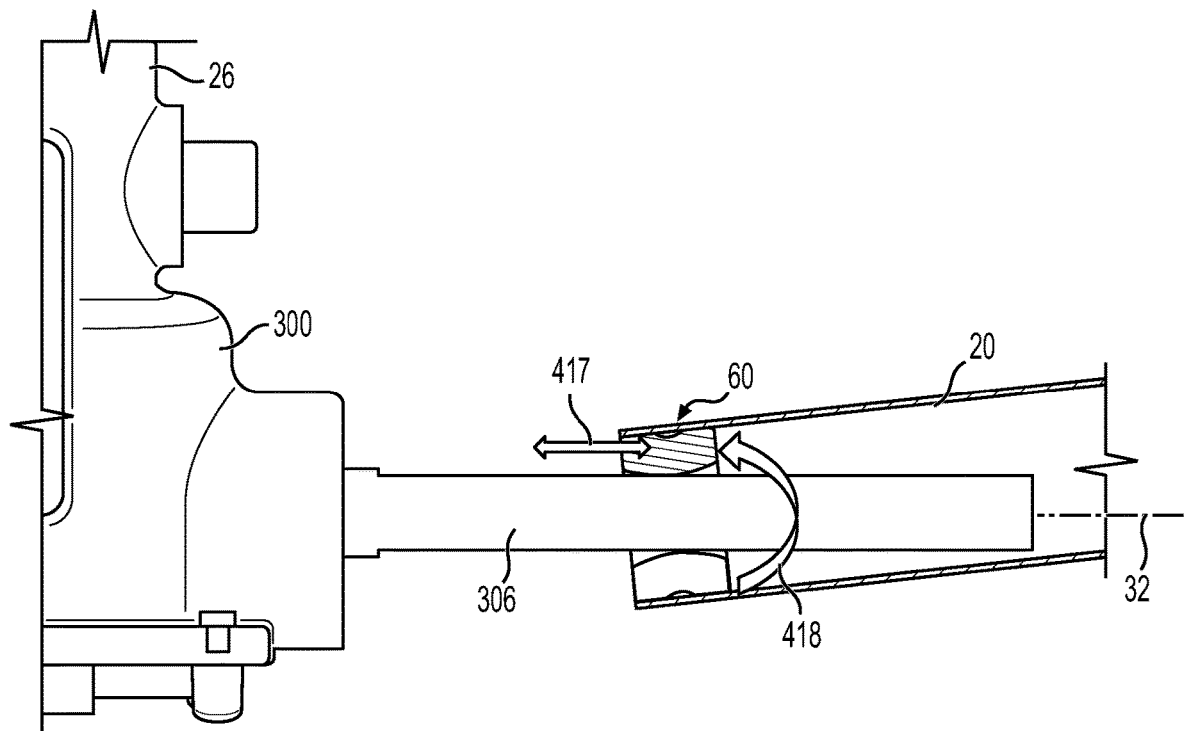
FIG. 34 is a side view of the coupling of FIG. 33.

Referring to FIGS. 32, 33, 34, shown is a further embodiment of the drive shaft 20 of the panel support and drive system 8, such that the drive shaft 20 sections are rigid shafts with sliding connections (e.g. coupling 60—see FIG. 15) there between. For example, the drive shaft 20 is a rigid member (solid or hollow) that has an integrated universal joint 60 at each end for connecting to an adjacent drive shaft 20 section. The cross section of the drive shaft 20 (e.g. shape and area) is sized such that it is able to transmit the required torque for the entire row 400 and resist flexing or sagging of the drive shaft 20 between linear actuators 26 (see FIG. 15). As shown in FIGS. 33, 34, variations in grade between tables and/or misalignment caused by installation can be accommodated for by a connection 60 between the intermediate shaft 306 and drive shaft 20. This connection 60 is able to: 1) slide 417 along the longitudinal drive axis 32 (see FIG. 2) of the drive shaft 20; and 2) pivot 418 about the longitudinal drive axis 32 to facilitate and misalignment in the adjacent shafts 20,306. (e.g. universal joint). For example, in this embodiment, the sliding universal joint 60 is as a connector attached (crimped, riveted, etc.) to the rigid drive shaft 20. However it is also recognized that the connector could be attached to the intermediate shaft 306 and therefore be facilitated to slide and pivot within the rigid drive shaft 20 (e.g. similar to a Ball-End Hex/Allen Wrench).

As discussed above, multiple support tables 10 can be linked together by the drive shafts 20 to form the row 400, such that the support tables 10 move together during operation of the shared/common drive unit 24. The drive shafts 20, when coupled together by couplings 60, are rotated by a motor (i.e. drive unit 24) which can be placed anywhere along the length of the row 400, as desired. As discussed, there can be a variety of potential embodiments in the design for the drive shaft 20; such as but not limited to:

1) Flexible drive shaft 20 with rigid connection via coupling 60, wherein the drive shaft 20 can be sized such that it is strong enough to transmit the torque but still flexible enough to allow for installation tolerances and grade following, recognizing that the drive shafts 20 can be rigidly connected to the intermediate shafts 306 connected to the linear actuator 26;

2) Flexible drive shaft 20 with sliding connection via coupling 60, wherein the drive shaft 20 can be sized such that it is strong enough to transmit the torque but still flexible enough to allow for installation tolerances and grade following, recognizing that the drive shafts 20 can be facilitated to translate (e.g. 1 degree of freedom) relative to the intermediate shafts 306 connected to the linear actuators 26; and 3) Rigid drive shaft 20 with sliding connections via coupling 60, wherein the drive shaft 20 is a rigid member (solid or hollow) that has an integrated connector 60 (e.g. universal joint) at each end. In one version, the integrated connector 60 is able to slide over the intermediate shaft 306. In a second version, the integrated connector 60 is able to slide over the drive shaft 20.

We claim:

1. A solar panel system comprising:
   a photovoltaic solar panel having a panel frame, a photovoltaic cell for absorbing solar energy;
   a panel support apparatus including:
      a support frame for supporting the panel frame and for positioning the panel frame adjacent to a post pivot connection on a longitudinal pivot axis (30) of the support frame;
      a support post pivotally coupled to the support frame at the post pivot connection and anchored to an adjacent supporting surface, the support post for positioning the support frame above the adjacent supporting surface, the support post defining a support axis (34) transverse to the longitudinal pivot axis (30);
      a table bracket mounted on the support post and extending from the support post, such that the post pivot connection is positioned on the table bracket, the post pivot connection including an angular adjustment mechanism having multiple degrees of freedom to facilitate adjustment of an angle (54) between the support axis and the longitudinal pivot axis; and
      a linear actuator including a housing, the linear actuator coupled at a proximal end to the support post by a support pivot connection with the housing, the housing having an extension member operable between an extended state and a retracted state, the linear actuator coupled at a distal end by a frame pivot connection between the extension member and the support frame, the post pivot connection and the frame pivot connection spaced apart from one another on the support frame;
      a drive shaft coupled to the linear actuator, such that rotation of the drive shaft provides for a change in a length of the linear actuator;
      wherein said change in the length of the linear actuator results in pivoting of the support frame about the post pivot connection about the longitudinal pivot axis;
      wherein the drive shaft is flexible along its length to facilitate the drive shaft to follow changes in grading between either side of the support post.

2. The solar panel system of claim 1 further comprising a support bracket connected to the support post adjacent to the supporting surface, such that the support pivot connection is on the support bracket and spaced apart from the support post, the support bracket having a plate having an angled portion, the angled portion providing for angular adjustment of the support pivot connection with the linear actuator.

3. The solar panel system of claim 1, wherein the support pivot connection and the drive shaft are non-concentric with one another.

4. The solar panel system of claim 1 further comprising the linear actuator having the extension member configured for the extension and the retraction in order to provide for said change in the length.

5. The solar panel system of claim 4 further comprising a lead screw coupled to a drive shaft and a threaded travel member connected to the extension member, such that threads of the lead screw and of the threaded travel member are mated with one another.

6. The solar panel system of claim 1, wherein the drive shaft comprises two drive shaft sub-sections, the solar panel support apparatus further comprising a coupling for operatively connecting serially arranged drive shaft ends of the two drive shaft sub-sections together such that rotation of one of the two drive shaft sub-sections imparts a rotation of the other one of the two drive shaft sub-sections.

7. The solar panel system of claim 6, wherein said coupling comprises a tube sized to receive within a tube interior the serially arranged drive shaft ends.

8. The solar panel system of claim 7, wherein the serially arranged drive shaft ends are rigidly connected to the tube.

9. The solar panel system of claim 7, wherein the two drive shaft sub-sections each comprise an exterior drive shaft profile, and the tube interior comprises an inner tube profile configured to mate with the exterior drive shaft profile.

10. The solar panel support apparatus of claim 9, wherein the inner tube profile about a first tube end is configured to be compressibly mated with the exterior drive shaft profile of one of the serially arranged drive shaft ends, and the tube interior at an opposite tube end comprises an inner profile configured to be slideably mated with the exterior drive shaft profile of the other one of the serially arranged drive shaft ends.

11. The solar panel support apparatus of claim 6, wherein one of the serially arranged drive shaft ends comprises an interior section configured to slidably receive the other one of the serially arranged drive shaft ends, and a clamp to secure the other one of the serially arranged drive shaft ends within the interior section.

12. The solar panel support apparatus of claim 6, wherein said coupling comprises a joint comprising a joint interior configured to slideably and pivotally receive one of the serially arranged drive shaft ends and a joint exterior configured to be rigidly received within an interior portion of the other one of the serially arranged drive shaft ends.

13. The solar panel system of claim 1, wherein both the post pivot connection and the frame pivot connection are positioned directly on the support frame, such that both the post pivot connection and the frame pivot connection are spaced apart from one another, wherein the support frame is structurally separate from the panel frame.

14. The solar panel system of claim 13, wherein the panel frame is removable from the support frame while maintaining the frame pivot connection between the linear actuator and the support frame.

15. The solar panel system of claim 13, wherein the support frame further comprises a lateral support member positioned laterally to a longitudinal axis of the support frame, wherein both the post pivot connection and the frame pivot connection are positioned on the lateral support member.

16. The solar panel system of claim 1, wherein the support frame is directly connected to the post pivot connection and provides a planar platform for receiving the panel frame of the photovoltaic solar panel.

17. The solar panel system of claim 1, wherein the support frame further includes a lateral support member positioned laterally to a longitudinal axis of the support frame, wherein the post pivot connection is positioned between opposite ends of the lateral support member and the panel frame is connected to both of the opposite ends of the lateral support member on either side of the post pivot connection.

18. The solar panel system of claim 1, wherein the angular adjustment mechanism is a pivot support coupling having a ball and socket connection.

19. The solar panel system of claim 1, wherein the angular adjustment mechanism is a pivot support coupling as a pin bushing coupling.

20. A solar panel system comprising:
a photovoltaic solar panel having a panel frame, a photovoltaic cell for absorbing solar energy; the
a panel support apparatus including:
   a support frame for supporting the panel frame and for positioning the panel frame adjacent to a post pivot connection on a longitudinal pivot axis (30) of the support frame;
   a support post pivotally coupled to the support frame at the post pivot connection and anchored to an adjacent supporting surface, the support post for positioning the support frame above the adjacent supporting surface, the support post defining a support axis (34) transverse to the longitudinal pivot axis (30);
   a table bracket mounted on the support post and extending from the support post, such that the post pivot connection is positioned on the table bracket, the post pivot connection including an angular adjustment mechanism having multiple degrees of freedom to facilitate adjustment of an angle (54) between the support axis and the longitudinal pivot axis; and
   a linear actuator including a housing, the linear actuator coupled at a proximal end to the support post by a support pivot connection with the housing, the housing having an extension member operable between an extended state and a retracted state, the linear actuator coupled at a distal end by a frame pivot connection between the extension member and the support frame, the post pivot connection and the frame pivot connection spaced apart from one another on the support frame;
   a first gear coupled to a drive shaft and a second gear coupled to the linear actuator, the first gear and the second gear being operatively coupled to one another, such that co-rotation of the first gear and the second gear provide for a change in a length of the linear actuator;
   wherein said change in the length of the linear actuator results in pivoting of the support frame about the post pivot connection about the longitudinal pivot axis;
   wherein the first gear is slidably coupled to the drive shaft to allow the drive shaft to translate relative to the first gear along a longitudinal axis of the drive shaft.

21. The solar panel system of claim 20, wherein the first gear has a surface with a first profile for mating with an exterior surface of the drive shaft, the exterior surface having a second profile matching the first profile.

22. The solar panel support apparatus of claim 21, wherein the first profile and the second profile are square, and the drive shaft is a tube.

\* \* \* \* \*